(12) United States Patent
Kanbe et al.

(10) Patent No.: US 7,292,296 B2
(45) Date of Patent: Nov. 6, 2007

(54) DISPLAY AND DEVICE INCLUDING SAME

(75) Inventors: Makoto Kanbe, Sakurai (JP);
Kazuhiko Tsuda, Ikoma-gun (JP);
Kozo Nakamura, Tenri (JP); Tokio Taguchi, Tenri (JP); Shun Ueki, Nara (JP); Satoru Kishimoto, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 10/509,837

(22) PCT Filed: Oct. 15, 2003

(86) PCT No.: PCT/JP03/13210

§ 371 (c)(1),
(2), (4) Date: Sep. 30, 2004

(87) PCT Pub. No.: WO2004/036300

PCT Pub. Date: Apr. 29, 2004

(65) Prior Publication Data

US 2005/0157224 A1    Jul. 21, 2005

(30) Foreign Application Priority Data

Oct. 17, 2002 (JP) ............................. 2002-303516
Mar. 24, 2003 (JP) ............................. 2003-081422

(51) Int. Cl.
G02F 1/1335 (2006.01)

(52) U.S. Cl. ..................................... 349/114; 349/115

(58) Field of Classification Search ........ 349/114–115, 349/98; 313/517, 521; 359/267
See application file for complete search history.

(56) References Cited

U.S. PATENT DOCUMENTS 6,008,871 A * 12/1999 Okumura ..................... 349/61

(Continued)

FOREIGN PATENT DOCUMENTS

EP    1 152 282 A1    11/2001

(Continued)

OTHER PUBLICATIONS

International Search Report and translation thereof mailed Jan. 27, 2004 in corresponding PCT application No. PCT/JP03/013210.

(Continued)

*Primary Examiner*—Toan Ton
(74) *Attorney, Agent, or Firm*—Nixon & Vanderhye P.C.

(57) ABSTRACT

A double-sided display which can suitable carry out black display both in a well-lighted place and a dark place is provided. The following members are disposed in the B direction: a first polarizing plate (14) which allows only a linearly polarized light component to pass through; a liquid crystal layer (13) which, when a voltage is applied thereto, optically rotates and causes linearly polarized light in one direction to be linearly polarized light in the other direction, while, when no voltage is applied, does not alter the direction of the linearly polarized light; a polarizing selective reflector (16) which reflects the linearly polarized light in one direction while allows the linearly polarized light in the other direction to pass through; and a second polarizing plate (15) which absorbs the light in one direction while allows the light in the other direction to pass through. The polarizing selective reflector (16) is disposed only in the B direction of the liquid crystal layer (13). Double-sided image reproduction is realized by carrying out reflective image reproduction on the side in the A direction and carrying out transmission image reproduction on the side in the B direction.

64 Claims, 50 Drawing Sheets

U.S. PATENT DOCUMENTS

| | | | |
|---|---|---|---|
| 6,124,971 | A | 9/2000 | Ouderkirk et al. |
| 6,674,496 | B2 | 1/2004 | Wei |
| 6,831,711 | B2 * | 12/2004 | Choi et al. ............... 349/74 |
| 7,102,715 | B2 * | 9/2006 | Kim et al. ............... 349/114 |
| 7,139,053 | B2 * | 11/2006 | Yuuki et al. ............. 349/114 |
| 7,142,270 | B2 * | 11/2006 | Yamauchi et al. ........ 349/113 |
| 2003/0003225 | A1 | 1/2003 | Choi et al. |
| 2004/0027513 | A1 | 2/2004 | Yuuki et al. |
| 2004/0189902 | A1 * | 9/2004 | Kim et al. ............... 349/114 |
| 2004/0189906 | A1 * | 9/2004 | Kim ........................ 349/114 |

FOREIGN PATENT DOCUMENTS

| | | |
|---|---|---|
| JP | 9-211493 A | 8/1987 |
| JP | 6-110055 A | 4/1994 |
| JP | 7-218899 A | 8/1995 |
| JP | 7-244267 A | 9/1995 |
| JP | 8-152619 A | 6/1996 |
| JP | 8/184821 A | 7/1996 |
| JP | 11-231303 A | 8/1999 |
| JP | 11-287987 A | 10/1999 |
| JP | 2000-171789 A | 6/2000 |
| JP | 2000-193956 A | 7/2000 |
| JP | 2000-321564 A | 11/2000 |
| JP | 2001-311939 A | 11/2001 |
| JP | 2002-296582 A | 10/2002 |
| JP | 2002-357825 1 | 12/2002 |
| JP | 2003-21836 A | 1/2003 |
| JP | 2004-133392 A | 4/2004 |
| JP | 2004-151217 A | 5/2004 |
| JP | 2004-151218 A | 5/2004 |
| WO | 97/01788 A1 | 1/1997 |
| WO | 03/025662 A1 | 3/2003 |

OTHER PUBLICATIONS

English translation of the International Preliminary Examination Report mailed Sep. 15, 2004 in corresponding PCT Application No. PCT/JP2003/013210.

* cited by examiner

ELLIPTICITY OF POLARIZED LIGHT ON ELLIPTIC
POLARIZING PLATE MADE UP OF POLARIZING
PLATE AND OPTICAL COMPENSATION ELEMENT

561

562

DISPLAY AND DEVICE INCLUDING SAME

This application is the US national phase of international application PCT/JP2003/013210 filed on 15 Oct. 2003, which designated the US and claims priority of JP Application No. 2002-303516 filed 17 Oct. 2002 and IP Application No. 2003-8 1422 filed 24 Mar. 2003. The entire contents of these applications are incorporated herein by reference.

TECHNICAL FIELD

The present invention relates to a display suitably used as a double-sided display having two display screens.

BACKGROUND ART

Among various types of displays, liquid crystal displays (LCDs) adopting liquid crystal have been most commonly used thanks to low power consumption. There have been two types of display modes and driving methods of the liquid crystal displays, namely a passive matrix system and active matrix system. In an age of multimedia, there have been growing demands for the improvements in resolution, contrast, gradation (multicolor, full color), and angle of view of displays. Considering that the passive matrix system is hardly capable of meeting the demands, the active matrix system has been contrived. In this system, a switching element (active element) is provided in each pixel so that the number of scanning electrodes to be driven is increased. In these days, the improvements in resolution, contrast, gradation, and angle of view have been achieved by adopting the active matrix system. An active matrix liquid crystal display is arranged in such a manner that pixel electrodes provided in a matrix manner are electrically connected to scanning lines provided around the pixel electrodes, through the intermediary of active elements. Examples of the active elements includes a two-terminal nonlinear element and three-terminal nonlinear element, and a currently dominating type of the active elements is a three-terminal thin-film transistor (hereinafter, TFT).

In recent times, mobile devices typified by mobile phones are commonly equipped with liquid crystal displays adopting the active element system. Such mobile devices are required to have good visibility both in the open air and in doors. Conventional transmission liquid crystal displays can reproduce images with high quality in doors, but the quality of the images significantly deteriorates when used in intense outside light. To reproduce images with sufficient quality in all kinds of settings both in and outside of doors, a system (front-light system) in which an auxiliary light source is provided in a reflective liquid crystal display and a semi-transmissive liquid crystal display in which each pixel has a reflective display area and transmissive display area have actively been developed.

In the field of mobile devices such as mobile phones, devices having two displays, namely a display for main information and a display for simple information, have become mainstream. The display for main information adopts an active matrix panel in order to display large-sized data such as visual images. The display for simple information has a screen smaller than that of the display for main information and displays small-sized data such as a clock, and thus adopts a passive matrix panel. The double-sided display is realized by disposing these liquid crystal displays in a back-to-back manner. However, the use of two liquid crystal displays has been accompanied with various problems typified by the impediment of the reduction of thickness, weight, and costs.

To overcome these problems, Japanese Laid-Open Patent Application No. 2000-193956 (Tokukai 2000-193956; published on Jul. 14, 2000) discloses a liquid crystal display which realizes double-sided display by incorporating one liquid crystal display with two reflective polarizers.

FIG. 15 shows a liquid crystal display 110 of this patent application. In the liquid crystal display 110, a first reflective polarizer 118 is provided on one side of a liquid crystal cell 122, and a second reflective polarizer 142 is provided on the opposite side of the liquid crystal cell 122. Furthermore, on the outer surface of the first reflective polarizer 118, i.e. on the surface not facing the liquid crystal cell 122, a first absorbing polarizer 114 is disposed. Between the liquid crystal cell 122 and second reflective polarizer 142, a scattering layer 138 is disposed. On the outer surface of the second reflective polarizer 142, a second absorbing polarizer 146 is disposed, and on the outer surface of the second absorbing polarizer 146, a light absorbing layer 150 is disposed in a detachable manner. Further, on the outer surface of the first absorbing polarizer 114, a substantially transparent light guiding plate 152 is provided for emitting light toward the liquid crystal cell 122, and light sources 166 are provided for emitting light towards the light guiding plate 152.

The directions of the following axes are determined as illustrated in FIG. 5: a transmission axis 114T and absorption axis 114A of the first absorbing polarizer 114, a transmission axis 118T and reflection axis 118R of the first reflective polarizer 118, a transmission axis 142T and reflection axis 142R of the second reflective polarizer 142, and a transmission axis 146T and absorption axis 146A of the second absorbing polarizer 146.

With the arrangement above, in a dark place, the liquid crystal display 110 can operate as a reflective display viewed from the outer surface of the light guiding plate 152, by causing the light emitted from the light sources 166 to be reflected on the second reflective polarizer 142. On the contrary, in a dark place, the liquid crystal display 110 can also function as a transmissive display viewed from the outer surface of the second reflective polarizer 142, by causing the light emitted from the light sources 166 to pass through the second reflective polarizer 142 and second absorbing polarizer 146.

However, since the liquid crystal display 110 of Japanese Laid-Open Patent Application No. 2000-193956 performs double-sided display using the reflective polarizers for both the front and back displays, the following problems occur: In a well-lighted place, when the liquid crystal display 110 is used as a transmissive display and viewed from the outer surface of the second reflective polarizer 142, the direction of polarizing the linearly polarized light incident on the liquid crystal cell 122 from the light guiding plate 152 is altered for 90 degrees in the case of the arrangement in FIG. 15, for carrying out black display. In this case, if outside light enters from the outer surface of the second reflective polarizer 142, the light incident on the liquid crystal cell 122 is reflected on the first reflective polarizer 118, so as to return towards the outer surface of the second reflective polarizer 142. For this reason, the black display is not properly carried out so that the quality of displayed images deteriorates.

In this manner, the conventional double-sided liquid crystal display 110 cannot properly carry out black display only either in a dark place or in a well-lighted place.

The present invention is done to solve the above-identified problem. The objective of the present invention is to provide (i) a double-sided display which can properly carry out black display both in a dark place and in a well-lighted place, and (ii) a device including the same.

DISCLOSURE OF INVENTION

To solve the above-mentioned problem, the display of the present invention, including a display medium for controlling a state of passing light, is characterized in that, provided that one direction away from the display medium is termed first direction and the other direction away from the display medium is termed "second direction", the display medium and selective reflecting means for reflecting light in a first state and allowing light in a second state to pass through are disposed in this order in the second direction, and the selective reflective means is disposed only in the second direction of the display medium.

According to this, the display medium controls the light coming from the side in the first direction, when the light passing through the display medium. When the display medium controls the light so as to cause the light to be in the first state, the selective reflecting means reflects the light in the first state, so that the light returns to the side in the first direction. Thus, light-state image reproduction for viewing an image from the side in the first direction is realized. When the display medium controls the light so as to cause the light to be in the second state, the selective reflecting means allows the light in the second state to pass through, so that the light passes away in the second direction. Thus, dark-state image reproduction for viewing an image on the side in the first direction is realized.

The light-state image reproduction using the light coming from the side in the first direction and viewed from the side in the first direction appears as dark-state image reproduction when viewed from the side in the second direction. In the meantime, the dark-state image reproduction using the light coming from the side in the first direction and viewed from the side in the first direction appears as light-state image reproduction when viewed from the side in the second direction. On this account, the display of the present invention carries out reflective image reproduction using the light coming from the side in the first direction, when viewed from the side in the first direction, while carries out transmission image reproduction using the light coming from the side in the first direction, when viewed from the side in the second direction. The light coming from the side in the first direction is light supplied from an arbitrary light source such as a front light provided in the display and the sun.

Meanwhile, when the light coming from the side in the second direction is caused to be in the second state, the light passes through the selective reflecting means. Thus, it is possible to cause this light to pass away in the first direction or to be absorbed before passing away in the first direction, by the control of the display medium. Being different from the conventional arrangement, the selective reflecting means is disposed only in the second direction of the display medium. For this reason, no light is reflected from the side in the first direction of the display medium. Furthermore, since the light coming from the side in the second direction and being in the second state does not include a light component in the first state, no light component is reflected on the selective reflecting means and returns to the side in the second direction.

Thus, when performing dark-state image reproduction which utilizes the light coming from the side in the first direction and is viewed from the side in the second direction, the light entering the display from the side in the second direction is caused not to be reflected and return to the side on the second direction, so that black display is suitably carried out in a well-lighted place as well as in a dark place.

As a result, it is possible to provide a double-sided display which can carry out black display both in a well-lighted place and a dark place.

To solve the above-identified problem, the display of the present invention is characterized in that, the first state and the second state are polarization states, the selective reflecting means is polarizing selective reflecting means which reflects the light in the first polarization state and allows the light in the second polarization state to pass through, and in the second direction, first polarizing means for allowing only a light component in a predetermined polarization state to pass through, the display medium, the polarizing selective reflecting means, and second polarizing means for absorbing a light component in the first state while allowing a light component in the second state to pass through, are disposed in this order.

According to this arrangement, the light coming from the side in the first direction is caused to be in a predetermined polarization state, e.g. the second polarization state, by the first polarizing means. The display medium controls the polarization state of this passing light. When the light is controlled and caused to be in the first polarization state, the polarizing selective reflecting means reflects the light in the first polarization state, the light having been reflected is changed to be in the predetermined polarization state and this passes through the first polarizing means, so that the light returns to the side in the first direction. With this, it is possible to realize light-state image reproduction viewed from the side in the first direction. Meanwhile, when the light is controlled and caused to be in the second polarization state, the polarizing selective reflecting means allows the light in the second polarization state to pass through, and the light then passes through the second polarizing means and away to the side in the second direction of the display.

Furthermore, the light-state image reproduction which utilizes the light coming from the side in the first direction and is viewed from the side in the first direction appears as dark-state image reproduction, when viewed from the side in the second direction. In the meantime, the dark-state image reproduction which utilizes the light coming from the side in the first direction and is viewed from the side in the first direction appears as light-state image reproduction, when viewed from the side in the second direction. In other words, the display of the present invention is arranged such that, reflective image reproduction is carried out when the light coming from the side in the first direction is used and the display is viewed from the side in the first direction, while transmission image reproduction is carried out when the light coming from the side in the first direction is used and the display is viewed from the side in the second direction. The light coming from the side in the first direction is light produced by an arbitrary light source such as a front light provided in the display and the sun.

The light coming from the side in the second direction is, meanwhile, caused to be in the second state by the second polarizing means, so as to become in the second polarization state and pass through the polarizing selective reflecting means. Thus, under the control of the display medium, the light is caused to pass through the first polarizing means and away to the side in the first direction or to be absorbed by the first polarizing means. Being different from the conventional arrangement, the polarizing selective reflecting means is disposed only in the second direction of the display medium. For this reason, no light is reflected from the side in the first direction of the display medium. Furthermore, since the light coming from the side in the second direction and being in the second state does not include a light component in the first state, no light component is reflected on the polarizing selective reflecting means and returns to the side in the second direction.

Thus, when performing dark-state image reproduction which utilizes the light coming from the side in the first direction and is viewed from the side in the second direction, the light entering the display from the side in the second direction is caused not to be reflected and return to the side on the second direction, so that black display is suitably carried out in a well-lighted place as well as in a dark place.

As a result, it is possible to provide a double-sided display which can carry out black display both in a well-lighted place and a dark place.

To solve the above-identified problem, the display of the present invention is characterized in that the predetermined polarization state is a state of linear polarization, the first polarization state is a state of linear polarization in a (1) direction, and the second polarization state is a state of linear polarization in a (2) direction orthogonal to the (1) direction, and the display medium is a 90° twisted liquid crystal layer.

According to this arrangement, when the display medium which is a 90° twisted liquid crystal layer controls and causes the linearly polarized light having passed through the first polarizing means to be the linearly polarized light in the (1) direction, the polarizing selective reflecting means reflects the light. Meanwhile, when the linearly polarized light having passed through the first polarizing means is controlled and caused to be the linearly polarized light in the (2) direction, the polarizing selective reflecting means allows the light to pass through.

To solve the above-identified problem, the display of the present invention is characterized in that the second polarization state is a state of linear polarization, and in the second direction of the second polarizing means, a λ/4 plate is disposed.

According to this arrangement, the linearly polarized light running in the second direction is changed to the circularly polarized light by the λ/4 plate. Thus, even of this light is reflected to the first direction by a reflector, the light enters the λ/4 plate again and becomes the linearly polarized light orthogonal to the above-described linearly polarized light, and hence the light is eventually absorbed by the second polarizing means.

As a result, when reflective image reproduction viewed from the side in the first direction is carried out, it is possible to prevent the light reflected by a reflector from returning to the side in the first direction, in the case of the dark-state image reproduction.

To solve the above-identified problem, the display of the present invention is characterized in that, the first state and the second state are circular polarization states, the selective reflecting means is polarizing selective reflecting means which reflects light in the first circular polarization state, and allowing light in the second circular polarization state, whose rotative direction is opposite to a rotative direction of the circularly polarized light in the first state, to pass through, and in the second direction, polarizing means, which has a first transmission axis, for allowing a linearly polarized light component in a predetermined direction to pass through, a first λ/4 plate, the display medium, the polarizing selective reflecting means, a second λ/4 plate, and polarizing means having a second transmission axis which is orthogonal to the first transmission axis, are provided in this order.

According to this arrangement, the light coming from the side in the first direction is changed to linearly polarized light in a predetermined direction by the polarizing means having the first transmission axis, and then changed to the circularly polarized light as passing through the first λ/4 plate. The display medium controls the polarization state of this passing light. When the light is controlled and caused to be the first circularly polarized light, the polarizing selective reflecting means reflects this first circularly polarized light. The polarization state of this light is controlled by the display means again, so as to become the linearly polarized light in the predetermined direction as passing through the first λ/4 plate and passes through the polarizing means having the first transmission axis, and eventually the light returns to the side in the first direction of the display. Thus, light-state image reproduction viewed from the side in the first direction is realized. When the display medium controls and causes the light to be the second circularly polarized light, the polarizing selective reflecting means allows the second circularly polarized light to pass through. This light is changed to be the linearly polarized light in the direction orthogonal to the above-mentioned predetermined direction by the second λ/4 plate, and passes through the polarizing means having the second transmission axis orthogonal to the first transmission axis. Eventually, the light passes away to the side in the second direction. As a result, dark-state image reproduction viewed from the side in the first direction is realized.

The light-state image reproduction which utilizes the light coming from the side in the first direction and is viewed from the side in the first direction appears as dark-state image reproduction, when viewed from the side in the second direction. In the meantime, the dark-state image reproduction which utilizes the light coming from the side in the first direction and is viewed from the side in the first direction appears as light-state image reproduction, when viewed from the side in the second direction. In other words, the display of the present invention is arranged such that, reflective image reproduction is carried out when the light coming from the side in the first direction is used and the display is viewed from the side in the first direction, while transmission image reproduction is carried out when the light coming from the side in the first direction is used and the display is viewed from the side in the second direction. The light coming from the side in the first direction is light produced by an arbitrary light source such as a front light provided in the display and the sun.

The light coming from the side in the second direction is, meanwhile, changed to the linearly polarized light by the polarizing means having the second transmission axis orthogonal to the first transmission axis, so as to become the second circularly polarizing light as passing through the second λ/4 plate. This light passes through the polarizing selective reflecting means. For this reason, when the light is caused, by the display medium, to be the circularly polarized light whose rotative direction is opposite to that of the circularly polarized light which is produced by changing the light coming form the side in the first direction by the first λ/4 plate, the light is changed to be the linearly polarized light in the predetermined direction, by the λ/4 plate. As a result, this light passes through the first polarizing means and away to the side in the first direction. Alternatively, the display medium may control and cause the light to be in the circularly polarized light which can be changed, by the first λ/4 plate, to the linearly polarized light which is absorbed by the polarizing means having the first transmission axis. Being different from the conventional arrangement, the polarizing selective reflecting means is disposed only in the second direction of the display medium. For this reason, no light is reflected from the side in the first direction of the display medium. On this occasion, moreover, the light reflected coming from the side in the second direction and reflected on members such as metal wiring of the display medium enters the second λ/4 plate again and becomes the linearly polarized light in the direction orthogonal to the second transmission axis of the polarizing means, thereby being absorbed by the polarizing means having the second transmission axis. Note that, the circularly polarized light includes not only light which is completely polarized in a circular manner but also elliptically polarized light whose ellipticity is not less than 0.7. Further, the linearly polarized light includes not only light which is completely polarized in a linear manner but also elliptically polarized light whose ellipticity is not more than 0.3.

Therefore, when dark-state image reproduction using the light coming from the side in the first direction and viewed from the side in the second direction is performed, the light coming from the side in the second direction is caused not to reflect and return to the side in the second direction, so that black display is suitably carried out in a dark place as well as in a well-lighted place.

As a result, it is possible to provide a double-sided display which can carry out black display both in a well-lighted place and a dark place.

To solve the above-identified problem, the display of the present invention is characterized by further comprising a light absorber which absorbs light passing away in the second direction and is able to be inserted into and removed from a light path.

According to this arrangement, since the light absorber is inserted when the reflective image reproduction viewed from the side in the first direction is carried out, it is possible to eliminate the reflection of the light having passed through in the second direction, and hence black display is suitably carried out.

To solve the above-identified problem, the display of the present invention is characterized by further comprising a first color filter disposed in the first direction of the display medium and a second filter disposed in the second direction of the selective reflecting means.

According to this arrangement, when reflective image reproduction viewed from the side in the first direction is carried out, the light passes through only the first filter twice, while when transmission image reproduction viewed from the side in the second direction is carried out, the light passes through the first color filter once and the second color filter once. Thus, it is possible to suitably arrange the luminance and color reproducibility in the reflective image reproduction on the side of the first direction and also in the transmission image reproduction on the side in the second direction, and hence it is possible to provide a double-sided display which realizes suitable luminance and color reproducibility both in the reflective image reproduction on the side in the first direction and the transmission image reproduction on the side in the second direction.

To solve the above-identified problem, the display of the present invention is characterized by further comprising a color filter in the first direction of the display medium, wherein, the color filter has a plurality of transmittance areas in each pixel of the display medium.

On the occasion that the color filter is provided only on the side in the first direction, the light passes through the color filter twice when reflective image reproduction is carried out as light-state image reproduction viewed from the side in the first direction, while the light passes through the color filter only once when transmission image reproduction is carried out as light-state image reproduction viewed from the side in the second direction. Thus, a quantity of the light in the case of viewing from the side in the first direction is fewer than that of the case of viewing from the side in the second direction.

According to the arrangement above, one color filter having more than one types of transmittance areas is disposed on the side in the first direction. Thus, when there is a difference between the amounts of the light as above, different types of the transmittance areas are suitably combined and the light passes therethrough, so that suitable color reproducibility and luminance are realized both in the reflective image reproduction on the side in the first direction and the transmission image reproduction on the side in the second direction.

To solve the above-identified problem, the display of the present invention is characterized in that, the transmittance areas are divided into (i) a high-transmittance area which has a high transmittance and provided, in the first direction, on a non-transmitting area which does not allow light moving in the second direction to pass through, when transmission image reproduction is performed on a side in the second direction, and (ii) a low-transmittance area which has a transmittance lower than the transmittance of the high-transmittance area and is disposed on a transmitting area which allows the light to pass through.

According to this arrangement, when reflective image reproduction is carried out as light-state image reproduction viewed from the side in the first direction, the light passes through the low-transmittance area twice. Thus, a quantity of the light passing through the low-transmittance area in this case is fewer than that of transmission image reproduction carried out as light-state image reproduction viewed from the side in the second direction, in which case the light passes through the low-transmittance area only once. However, the low-transmittance area does not contribute to transmission image reproduction. Since the light passing through the high-transmittance area facing, on the side in the first direction, the non-transmitting area can be utilized for reflective image reproduction, color reproducibility and luminance are suitably set both in the reflective image reproduction on the side in the first direction and the transmission image reproduction on the side in the second direction.

To solve the above-identified problem, the display of the present invention is characterized by further comprising a light absorbing layer in the second direction of a driver wiring for driving the display medium.

According to this arrangement, the light coming from the side in the second direction and running towards the driver wiring is absorbed by the light absorbing layer, so that the reflection on the driving wiring can be eliminated.

To solve the above-identified problem, the display of the present invention is characterized in that a driver wiring for driving the display medium is made of a low-reflecting material which restrains reflection of light to be not more than a predetermined value.

According to this arrangement, a quantity of the light coming from the side in the second direction and running towards the driver wiring is restrained to be not more than a predetermined amount, so that the influence of the reflection on the driving wiring can be eliminated.

To solve the above-identified problem, the display of the present invention is characterized in that, tones of an image reproduced from display data are reversed when reflective image reproduction on a side in the first direction is changed to a transmission image reproduction on a side in the second direction, and when the transmission image reproduction on the side in the second direction is changed to the reflective image reproduction on the side in the first direction.

According to this arrangement, the tones are always consistent both in the case of the reflective image reproduction viewed from the side in the first direction and in the case of the transmission image reproduction viewed from the side in the second direction.

To solve the above-identified problem, the display of the present invention is characterized in that, an image reproduced from display data is laterally reversed when reflective image reproduction on a side in the first direction is changed to a transmission image reproduction on a side in the second direction, and when the transmission image reproduction on the side in the second direction is changed to the reflective image reproduction on the side in the first direction.

According to this arrangement, it is possible to always reproduce identically-oriented images even if the display carrying out the image reproduction is laterally switched to/from the image reproduction surface on the side in the first direction from/to the image reproduction surface on the side in the second direction.

To solve the above-identified problem, the display of the present invention is characterized in that, an image reproduced from display data is turned upside down when reflective image reproduction on a side in the first direction is changed to a transmission image reproduction on a side in the second direction, and when the transmission image reproduction on the side in the second direction is changed to the reflective image reproduction on the side in the first direction.

According to this arrangement, it is possible to always reproduce identically-oriented images even if the display carrying out the image reproduction is vertically switched to/from the image reproduction surface on the side in the first direction from/to the image reproduction surface on the side in the second direction.

To solve the above-identified problem, the display of the present invention is characterized in that, a non-transmitting area which does not allow light to pass through is provided in the second direction of the display medium, and between at least a part of the non-transmitting area and the display medium, light reflecting means for causing light passing through the display medium in the second direction to be reflected is provided.

According to this arrangement, the non-transmitting area is disposed in the second direction of the display medium. The selective reflecting means is disposed in the second direction of the non-transmitting area, while the reflecting means is provided between at least a part of the non-transmitting area and the display medium, so that the display medium reflects the light passing through in the second direction. Thus, when the reflective image reproduction is viewed from the side in the first direction, the light shielded by the non-transmitting area and hence not reaching to the selective reflecting means is reflected on the reflecting means, so that bright image reproduction can be realized.

To solve the above-identified problem, the display of the present invention is characterized in that, the first state and the second state are polarization states, the selective reflecting means is polarizing selective reflecting means for reflecting the light in the first polarization state while allowing the light in the second polarization state to pass through, in the second direction, first polarizing means for allowing only a light component in a predetermined polarization state to pass through, the display medium, the polarizing selective reflecting means, and second polarizing means for absorbing a light component in the first polarization state and allowing a light component in the second polarization state to pass through, are provided a pair of transparent substrate sandwiching the display medium are provided, the polarizing selective reflective means is provided in the second direction of one of the pair of transparent substrate, said one of the pair of transparent substrates being provided in the second direction with respect to the other one of the pair of transparent substrates, and between the display medium and the transparent substrate in the second direction with respect to the other transparent substrate, the non-transmitting area is provided.

According to this arrangement, the polarizing selective reflecting means is provided in the second direction of said one of the pair of transparent substrates being provided in the second direction. Thus, comparing to a case that the polarizing selective reflecting means is provided between the pair of transparent substrates, the reliability of the product the manufacturing process are improved. Furthermore, the non-transmitting area is provided between the display medium and said one of the pair of transparent substrates being provided in the second direction. Thus, although the polarizing selective reflecting means is disposed as above, the reflecting means reflects the light passing through the display medium in the second direction. For this reason, when reflective image reproduction is viewed from the side in the first direction, the light shielded by the non-transmitting area so as not to reach the polarizing selective reflecting means is reflected on the reflecting means, and hence bright image reproduction is realized.

To solve the above-identified problem, the display of the present invention is characterized in that, the display medium controls a polarization state of passing light so that: in a case of light-state image reproduction viewed from a side in the first direction, light being incident from a side in the first direction of the first polarizing means and reflected on the reflecting means and light being incident from the side in the first direction of the first polarizing means and reflected on the polarizing selective reflecting means pass through the first polarizing means again; and in a case of dark-state image reproduction viewed from the side in the first direction, the light being incident from a side in the first direction of the first polarizing means and reflected on the reflecting means and the light being incident from the side in the first direction of the first polarizing means and reflected on the polarizing selective reflecting means are caused not to pass through the first polarizing means again.

According to this arrangement, in the case of the light-state image reproduction viewed from the side in the first direction, the polarization state of the passing light is controlled by the display medium in such a manner that the light being incident from the side in the first direction of the first polarizing means and reflected on the reflecting means and the light being incident from the side in the first direction of the first polarizing means and reflected on the polarizing selective reflecting means are caused to pass through the first polarizing means again. Thus, the light reflected on the reflecting means and the light reflected on the polarizing selective reflecting means both contribute to carry out bright image reproduction. For this reason, it is possible to carry out bright reflective image reproduction.

In the case of the dark-state image reproduction viewed from the side in the first direction, the polarization state of the passing light is controlled by the display medium in such a manner that the light being incident from the side in the first direction of the first polarizing means and reflected on the reflecting means and the light being incident from the side in the first direction of the first polarizing means and reflected on the polarizing selective reflecting means are caused not to pass through the first polarizing means again. Thus, the light reflected on the reflecting means and the light reflected on the polarizing selective reflecting means both contribute to carry out black display. Thus, the dark-state image reproduction is suitably realized.

To solve the above-identified problem, the display of the present invention is characterized in that, the first polarization state is a state of linear polarization in a (1) direction, and the second polarization state is a state of linear polarization in a (2) direction orthogonal to the (1) direction, the predetermined polarization state is the first polarization state, and the display medium controls a polarization state of passing light so that, with respect to light came from a side in the first direction of the first polarizing means and has passed through the first polarizing means, the polarization state of the light is substantially unchanged in the case of light-state image reproduction, and in the case of dark-state image reproduction, provided that a phase difference between orthogonal axes of polarized light on a plane in parallel to the transparent substrate is 0 in a case of the first polarization state, a phase difference of light having just passed through the display medium and heading for the reflecting means is substantially $\pi/2$, a phase difference of light having just passed through the display medium and heading for the first polarizing means is substantially $\pi$, and a phase difference of light having just passed through the display medium and heading for the polarizing selective reflecting means is substantially $\pi$.

According to this arrangement, the light passing through the first polarizing means from the side in the first direction becomes the linearly polarized light in the (1) direction. In the case of the light-state image reproduction, the display medium does not substantially change the polarization state of the linearly polarized light in the (1) direction, so that the light arrived at the polarizing selective reflecting means is reflected, and in conjunction with the light reflected on the reflecting means, passes through the first polarizing means again.

In the case of the dark-state image reproduction, the display medium carries out the control in such a manner that, provided that the phase difference between orthogonal axes of polarized light on a plane in parallel to the transparent substrate is 0 in a case of the first polarization state, the phase difference in the case of the light having just passed through the display medium and heading for the reflecting means is substantially $\pi/2$. Thus, the light becomes the circularly polarized light and reaches the reflecting means. The light is then reflected on the reflecting means and becomes the reverse-circularly polarized light whose rotative direction is opposite to that of the above-mentioned circularly polarized light. Thus, the display medium carries out such a control that the phase difference is caused to be substantially $\pi$ when the light has passed through the display medium and heads for the first polarizing means, so that the light reaches the first polarizing means as the linearly polarized light in the (2) direction orthogonal to the (1) direction, i.e. the light in the second polarization state. For this reason, the light does not pass through the first polarizing means. The display medium, furthermore, carries out such a control that the phase difference is caused to be substantially $\pi$ when the light has passed through the first polarizing means and heads for the polarizing selective reflecting means, so that the light reaches the polarizing selective reflecting means as the light in the second polarization state, thereby passing through the polarizing selective reflecting means.

With this, it is possible to carry out reflective image reproduction as light-state image reproduction with a suitable brightness, and also suitably realize dark-state image reproduction.

To solve the above-identified problem, the display of the present invention is characterized in that, a thickness of a part of the display medium between the first polarizing means and the reflecting means is substantially half as much as a thickness of a part of the display medium between the first polarizing means and the polarizing selective reflecting means not facing the reflecting means, in the first/second direction.

According to this arrangement, in the first/second direction, the thickness of a part of the display medium between the first polarizing means and the reflecting means is substantially half as much as the thickness of a part of the display medium between the first polarizing means and the polarizing selective reflecting means not facing the reflecting means. Thus, only by differentiating the thicknesses, the control of the polarization state can be carried out in consideration of the round trips of the lights in both parts, so that the both parts of the display medium can be made of the same material such as ECB liquid crystal. Note that, ideally speaking, the thickness of the former part is substantially half as much as the latter part. However, as long as the ratio between these parts is not less than 3:10 and not more than 7:10, the light paths in these parts are matched with each other so that the rate of utilization of the light is improved and hence the quality of reproduced images is improved.

To solve the above-identified problem, the display of the present invention is characterized in that, in a case of normally image reproduction, the polarizing selective reflecting means allow most of light coming from a side in the first direction to pass through, the first polarizing means absorbs most of light being reflected on the reflecting means and reaching the first polarizing means, and the second polarizing means allows most of light coming from a side in the first direction to pass through; in a case of maximum-drive image reproduction, the polarizing selective reflecting means reflects most of light coming from the side in the first direction, and the first polarizing means allows most of light reflected on the reflecting means to pass through.

According to this arrangement, in the case of the normally image reproduction where no voltage is applied to the liquid crystal or a low voltage is applied to the liquid crystal, the polarizing selective reflecting means allows most of the light coming from the side in the first direction, the first polarizing means absorbs most of the light having been reflected on the reflecting means and having reached the first polarizing means, and the second polarizing means allows most of the light coming form the side in the first direction to pass through. Meanwhile, in the case of the maximum-drive image reproduction, the polarizing selective reflecting means reflects most of the light coming from the side in the first direction, and the first polarizing means allows the light having been reflected on the reflecting means and has reached the first polarizing means to pass through.

Thus, since the reflective image reproduction viewed from the side in the first direction is normally black while the transmission image reproduction viewed from the side in the second direction is normally white, black display by the transmission image reproduction is carried out as the maximum-drive image reproduction, so that the black display by the transmission image reproduction does not depends on the manufacturing process so as to have a sufficient quality, and this makes it possible to improve the contrast.

In the meantime, in the case of the reflective image reproduction, the area utilizing the reflecting means and the area utilizing the polarizing selective reflecting means both carry out black display as the normally image reproduction, and also both carry out white display as the maximum-drive image reproduction. Thus, even if one pixel includes both of these areas, both of these areas concurrently carry out either the black display or white display so that image reproduction is suitably carried out.

To solve the above-identified problem, the display of the present invention is characterized in that, an area for display on the display medium is divided into (i) a first area in which a transmission operation to allow light incident on the display area from a side in the first direction to pass through in the second direction and a reflection operation to reflect light incident on the display area from the side in the first direction to the first direction are carried out and (ii) a second area in which the reflection operation to reflect light incident on the display area from the side in the first direction to the first direction is carried out, reflecting means for reflecting light passing through the display medium in the second direction is provided in the second direction of the display medium, the reflection operation is carried out in the second area using the reflecting means, and the display being able to carry out: transmission image reproduction arranged in such a manner that, by means of the transmission operation in the first area, light incident on the first area from the side in the first direction is controlled to be in the second state and allowed to pass through the selective reflecting means, so as to be utilized for image reproduction on a side in the second direction of the display medium; first reflective image reproduction arranged in such a manner that, by means of the reflection operation in the first area, light incident on the first area from the side in the first direction is controlled to be in the first state and reflected on the selective reflecting means, so as to be utilized for image reproduction on the side in the first direction of the display medium; and second reflective image reproduction arranged in such a manner that, by means of the reflection operation in the second area, light incident on the second area from the side in the first direction is utilized for image reproduction on the side in the first direction of the display medium.

According to this arrangement, the display carries out transmission image reproduction using the first area, when viewed from the side in the second direction, and carries out reflective image reproduction using both the first and second areas, when viewed from the side in the first direction.

To solve the above-identified problem, the display of the present invention is characterized in that, in a case of the first reflective image reproduction, light-state image reproduction is carried out such that light incident on the first area from the side in the first direction is controlled to be in the first state so as to be reflected on the selective reflecting means, while dark-state image reproduction is carried out such that light incident on the first area from the side in the first direction is controlled to be in the second state so as to pass through the selective reflecting means, in a case of the second reflective image reproduction, light-state image reproduction is carried out such that light reflected on the reflecting means is allowed to reach eyes of a viewer on the side in the first direction of the display medium, while dark-state image reproduction is carried out such that light reflected on the reflecting means is caused not to reach the eyes of the viewer on the side in the first direction of the display medium, and thus the first reflective image reproduction corresponds to the second reflective image reproduction, since the first reflective image reproduction and the second reflective image reproduction are both light-state image reproduction or both dark-state image reproduction.

According to this arrangement, the first and second reflective image productions are simultaneously either the dark-state image reproduction or the light-state image reproduction. Thus, the resultant image reproduction as the combination of these image reproductions is good in quality, since the image reproductions do not cancel out each other. Furthermore, as a result of providing the non-transmitting area in the second area of the display, the reflective image reproduction viewed from the side in the first direction is performed as the combination of the first reflective image reproduction using the first area and the second reflective image reproduction using the second area, so that the rate of utilization of the light is improved.

To solve the above-identified problem, the display of the present invention is characterized in that, in the transmission image reproduction, dark-state image reproduction is carried out such that light incident on the first area from the side in the first direction is controlled to be in the first state so as to be reflected on the selective reflecting means, while light-state image reproduction is carried out such that light incident on the first area from the side in the first direction is controlled to be in the second state so as to pass through the selective reflecting means.

According to this arrangement, the transmission image reproduction as the light-state image reproduction viewed from the side in the second direction appears as reflective image reproduction when viewed from the side in the first direction, while the transmission image reproduction as the dark-state image reproduction viewed from the side in the second direction appears as reflective light-state image reproduction when viewed from the side in the first direction.

To solve the above-identified problem, the display of the present invention is characterized in that, first polarizing means which only allows a light component in a predetermined polarization state to pass through is provided in the first direction of the display medium.

This arrangement makes it possible to produce an image with a high contrast.

To solve the above-identified problem, the display of the present invention is characterized in that, the predetermined polarization state is a state of linear polarization, the first polarization state is a state of linear polarization in a (1) direction, while the second polarization state is a state of linear polarization in a (2) direction orthogonal to the (1) direction, a transmission axis of the first polarizing means is orthogonal to a transmission axis of the polarizing selective reflecting means, and when a lowest voltage among drive voltages is applied to the display medium, light incident on the first area from the side in the first direction becomes, on the polarizing selective reflecting means, either elliptically polarized light or linearly polarized light having a major axis in parallel to the transmission axis of the polarizing selective reflecting means, and light incident on the second area from the side in the second direction becomes, on the reflecting means, either elliptically polarized light or circularly polarized light.

According to this arrangement, in the reflective image reproduction using both the first and second areas, i.e. in the reflective image reproduction as the combination of the first reflective image reproduction and the second image reproduction, high-quality black display is realized by precisely causing these areas to carry out identical black display.

To solve the above-identified problem, the display of the present invention is characterized in that, the predetermined polarization state is a state of linear polarization, the first polarization state is a state of linear polarization in a (1) direction, while the second polarization state is a state of linear polarization in a (2) direction orthogonal to the (1) direction, a transmission axis of the first polarizing means is orthogonal to a transmission axis of the polarizing selective reflecting means, when a highest voltage among drive voltages is applied to the display medium, light incident on the first area from the side in the first direction becomes, on the polarizing selective reflecting means, either elliptically polarized light or linearly polarized light having a major axis in parallel to the transmission axis of the polarizing selective reflecting means, and light incident on the second area from the side in the first direction becomes, on the reflecting means, either elliptically polarized light or circularly polarized light.

According to this arrangement, in the reflective image reproduction using both the first and second areas, i.e. in the reflective image reproduction as the combination of the first reflective image reproduction and the second image reproduction, high-quality black display is realized by precisely causing these areas to carry out identical black display.

To solve the above-identified problem, the display of the present invention is characterized in that, the elliptically polarized light or the linearly polarized light on the polarizing selective reflecting means is elliptically polarized light in which ellipticity is not more than 0.3, and the elliptically polarized light or the linearly polarized light on the reflecting means is elliptically polarized light in which ellipticity is not less than 0.7.

According to this arrangement, both in the first and second reflective image reproductions, the light after being reflected hardly returns to the side in the first direction of the first polarizing means, when performing black display.

To solve the above-identified problem, the display of the present invention is characterized in that, the elliptically polarized light or the linearly polarized light on the polarizing selective reflecting means is elliptically polarized light in which ellipticity is not more than 0.22.

According to this arrangement, it is possible to further ensure that the light after being reflected hardly returns to the side in the first direction of the first polarizing means, when performing black display.

To solve the above-identified problem, the display of the present invention is characterized in that, the elliptically polarized light or the linearly polarized light on the reflecting means is elliptically polarized light in which ellipticity is not less than 0.78.

According to this arrangement, it is possible to further ensure that the light after being reflected hardly returns to the side in the first direction of the first polarizing means, when performing black display.

To solve the above-identified problem, the display of the present invention is characterized in that, optical compensation means having retardation is provided at least in the first direction of the display medium.

This arrangement facilitates the control of the polarization state for causing the light after being reflected to hardly return to the side in the first direction of the first polarizing means, when performing black display.

To solve the above-identified problem, the display of the present invention is characterized in that, optical compensation means having retardation is provided in the second direction of the display medium.

According to this arrangement, in the case of the transmission image reproduction, the control of the polarization state by the optical compensation element provided in the second direction of the display medium can be performed in accordance with the control of the polarization state by the optical compensation element provided in the first direction of the display medium.

To solve the above-identified problem, the display of the present invention is characterized in that, the optical compensation means is made up of a plurality of optical compensation elements.

This arrangement makes it possible to obtain a desired polarization state in a wider range in the visible range.

To solve the above-identified problem, the display of the present invention is characterized in that, the display medium in the second area is a 90° twisted nematic liquid crystal layer whose retardation is in a range of not less than 150 nm and not more than 340 nm.

According to this arrangement, when the 90° twisted nematic liquid crystal layer is adopted as the display medium, elliptically polarized light having an ellipticity not less than 0.7 is obtained on the reflecting means, on the occasion of performing black display by means of reflective image reproduction.

To solve the above-identified problem, the display of the present invention is characterized in that, the display medium in the first area is a 90° twisted nematic liquid crystal layer whose retardation is not less than 400 nm.

According to this arrangement, when the 90° twisted nematic liquid crystal layer is adopted as the display medium, the transmittance of the liquid crystal layer on the occasion of performing the reflective image reproduction is improved.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy $-175\,\text{nm} \leq (Rr-R1) \leq -105\,\text{nm}$, the director of the liquid crystal molecules is substantially in parallel to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy 190 nm≦(Rt−R1+R2)≦300 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy −175 nm≦(Rr−R1)≦−105 nm, the director of the liquid crystal molecules is substantially in parallel to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy 190 nm≦(Rt−R1+R2)≦300 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy −175 nm≦(Rr−R1)≦−105 nm, and when the lowest voltage is applied, in the first area, a value of retardation Rt of the liquid crystal layer, the value of retardation R1 of the first optical compensation means, and a value of retardation R2 of the second optical compensation element satisfy either (i) 25 nm≦(Rt−R1+R2)≦50 nm on a occasion that the director of the liquid crystal molecules is substantially in parallel to a lagging axis of the second optical compensation means, or (ii) −50 nm≦(Rt−R1−R2) ≦25 nm on a occasion that the director of the liquid crystal molecules is substantially orthogonal to the lagging axis of the second optical compensation element.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy −175 nm≦(Rr−R1)≦−105 nm, the director of the liquid crystal molecules is substantially in parallel to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation element satisfy either (i) 25 nm≦(Rt−R1+R2)≦50 nm on a occasion that the director of the liquid crystal molecules is substantially in parallel to a lagging axis of the second optical compensation means, or (ii) −50 nm≦(Rt−R1−R2) ≦25 nm on a occasion that the director of the liquid crystal molecules is substantially orthogonal to the lagging axis of the second optical compensation element.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy 190 nm≦(Rt−R1−R2)≦300 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy 190 nm≦(Rt−R1−R2)≦300 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially parallel to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy −50 nm≦(Rt−R1−R2)≦50 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy −50 nm≦(Rt−R1−R2)≦50 nm.

With this arrangement, the reflectance not less than 8% and the ratio of contrast not less than 5 are obtained in the case of the reflective image reproduction, and the reflectance not less than 8% and the ratio of contrast not less than 10 are obtained in the case of the transmission image reproduction.

To solve the above-identified problem, the display of the present invention is characterized in that, in the first direction of the display medium, light-scattering means having a light-scattering function is provided.

According to this arrangement, in the case of the transmission image reproduction, when the ambient light enters the display from the side in the first direction, it is possible to cause the overlapping of patterns due to the ambient light not to be viewed.

To solve the above-identified problem, the display of the present invention is characterized in that, an overall haze of the display is not less than 50 and not more than 95.

This arrangement makes it possible to restrain both the overlapping of patterns due to the ambient light and the decrease of the contrast ratio.

To solve the above-identified problem, the display of the present invention is characterized in that, a transmission axis of the first polarizing means is substantially in conformity to a horizontal direction with respect to a posture of the display in use.

With this arrangement, the rate of utilization of the light is improved in accordance with such a circumstance that there are a lot of polarized light components whose electric field oscillate in a horizontal direction.

To solve the above-identified problem, the display of the present invention is characterized by further comprising light modulation means for switching a traveling direction of predetermined incoming or outgoing light in a predetermined manner, the light modulation means being provided at least either on the side in the first direction or on the side in the second direction of the display.

According to this arrangement, it is possible to avoid such problems that an image is displayed on the side opposite to the side where image reproduction for the viewer is performed, when the state of the light passing through the display is switched by the light modulation means so that the light proceeds without modification, and the image reproduction is not properly carried out.

To solve the above-identified problem, the display of the present invention is characterized in that, the light modulation means switches a traveling direction of the outgoing light exiting from the display, between a transmission direction with respect to the light modulation means and a scattering direction with respect to the light modulating means.

According to this arrangement, the traveling direction is switched to the scattering direction so that no image is properly displayed on the side opposite to the side where image reproduction for the viewer is performed.

To solve the above-identified problem, the display of the present invention is characterized by further comprising light irradiation means for irradiating light for image reproduction by the display, as the incoming light, and the light modulating means is disposed between the light irradiation means and the display medium, and when the traveling direction is set to be the scattering direction, the light modulating means causes light irradiated from the light irradiation means to be in the scattering direction with respect to the light modulation means.

According to this arrangement, when the transmissive image reproduction is performed using the light from the light irradiation means, the traveling direction is switched to the scattering direction so that no image is properly displayed on the side opposite to the side where image reproduction for the viewer is performed. In this traveling direction, since the light emitted from the light irradiation means is changed to the scattering state by the light modulation means and then used as incoming light to the display, it is possible to prevent the decrease of the quality of the image reproduction, even if the light emitted from the light irradiation means is irregular in a contrast.

To solve the above-identified problem, the display of the present invention is characterized in that, the light modulation means switches a traveling direction of the outgoing light exiting the display, between a transmission direction with respect to the light modulation means and a scattering direction with respect to the light modulating means.

According to this arrangement, the traveling direction is switched to the reflective direction so that no image is properly displayed on the side opposite to the side where image reproduction for the viewer is performed.

To solve the above-identified problem, the display of the present invention is characterized in that, the light modulation means switches the traveling direction between a direction that both of two types of polarized light orthogonal to each other are transmissive with, respect to the light modulating means and a direction that one type of the polarized light is reflected on the light modulation means while the other type of the polarized light is transmissive with respect to the light modulation means.

According to this arrangement, the outgoing light exiting from the display is set as one type of the polarized light, so that no image is properly displayed on the side opposite to the side where image reproduction for the viewer is performed, when the traveling direction is arranged such that one type of polarized light is reflective while the other type polarized light is transmissive. In this traveling direction, moreover, said one type of the polarized light of the incoming light running towards the display is reflective so that this reflected light also makes it possible to cause an image displayed on the side opposite to the side where image reproduction for the viewer not to be viewable.

To solve the above-identified problem, the display of the present invention is characterized in that, the light modulation means switches the traveling direction of the outgoing light exiting the display, between a direction that a light path which does not change the traveling direction is set in the light modulating means and a direction that a light path which changes the traveling direction is set in the light modulating means.

According to this arrangement, it is possible to cause an image displayed on the side opposite to the side where image reproduction for the viewer not to be viewable, by carrying out the switching to the traveling direction in which the light path which changes the traveling direction is set in the light modulation means. Thus, it is possible to cause an image displayed on the side opposite to the side where image reproduction for the viewer not to be viewable.

To solve the above-identified problem, the display of the present invention is characterized in that, the light modulating means switches the traveling direction of the outgoing light exiting the display, between a transmissive direction with which the light passes through the light modulation means and an absorbing direction with which the light is absorbed by the light modulation means.

According to this arrangement, the traveling direction is changed to the absorbing direction so that an image displayed on the side opposite to the side where image reproduction for the viewer is caused not to be viewable.

To solve the above-identified problem, the display of the present invention is characterized by further comprising light irradiation means for irradiating light for image reproduction by the display, the light modulating means also functioning as a protective cover of the light irradiation means.

According to this arrangement, it is possible to cause the light irradiation means to be dust-proof and stain-proof without additionally providing a protective cover, i.e. without increasing the overall thickness of the display.

To solve the above-identified problem, the display of the present invention is characterized in that, the light modulation means switches the traveling direction, in accordance with a switching between image reproduction on the side in the first direction of the display and image reproduction on the side in the second direction of the display.

According to this arrangement, when the image reproduction to be viewed is selected, the switching of the light modulation means is performed in conjunction with the selection. Thus, it is unnecessary to carry out the operation to instruct the switching.

To solve the above-identified problem, the display of the present invention is characterized in that, the device being foldable in such a manner that an image reproduction surface on the side in the first direction of the display comes on an outside of the display, while an image reproduction surface on the side in the second direction of the display comes on an inside of the display.

According to this arrangement, when the display is folded, one can view the image reproduction surface in the first direction, on which reflective image reproduction utilizing the selective reflecting means is performed, while, when the display is unfolded, one can view the image reproduction surface in the second direction, on which transmission image reproduction utilizing the selective reflecting means is performed.

To solve the above-identified problem, the display of the present invention is characterized in that, a member facing the image reproduction surface on the side in the second direction of the display when the devise is folded is a light-absorbing member.

According to this arrangement, in order to view the image reproduction surface on the side in the first direction when the display is folded, the member facing the image reproduction surface on the side in the second direction absorbs light, so that the light coming from the side in the second direction does not reach the side in the first direction of the display, and hence it is possible to prevent the dark-state image reproduction from appearing whitish.

To solve the above-identified problem, the display of the present invention is characterized by further comprising an operating button for instructing reversal of tones of an image displayed on the side in the first direction of the display and reversal of tones of an image displayed on the side in the second direction.

According to this arrangement, when the tones of the image reproduction on the side in the first direction are in contrast to the tones of the image reproduction in the side in the second direction, it is possible to suitably carry out both the image reproduction on the side in the first direction and the image reproduction in the side in the second direction, using the operating button.

To solve the above-identified problem, the display of the present invention is characterized in that, the operating button is an automatic operating button which is automatically operated and instructs the reversal, in accordance with opening and closing motions of the device.

According to this arrangement, when an image to be viewed is reversed to/from the side in the first direction of the display from/to the side in the second direction, in accordance with the opening and closing of the display, it is possible to automatically obtain a suitable quality of image reproduction, using the automatic operating button.

To solve the above-identified problem, the display of the present invention is characterized in that, the display is defined in any one of claims 1, 2, 3, 4, 15, 21, and 46, and a light-absorbing member which can be disposed so as to face an image reproduction surface on the side in the second direction of the display.

According to this arrangement, when viewing the image reproduction surface on the side in the first direction, a light-absorbing member is provided so as to face the image reproduction surface on the side in the second direction, so that the light coming from the side in the second direction does not reach the side in the first direction of the display, and hence it is possible to prevent the dark-state image reproduction from appearing whitish.

For a fuller understanding of the nature and advantages of the invention, reference should be made to the ensuing detailed description taken in conjunction with the accompanying drawings.

BRIEF DESCRIPTION OF DRAWINGS

FIG. 6(*b*) illustrates how the mobile phone terminal in FIG. 5 is used.

BEST MODE FOR CARRYING OUT THE INVENTION

With reference to embodiments, the following will describe the present invention more specifically. Note that, the scope of the present invention is not limited by the embodiments below.

First Embodiment

Figure 1:
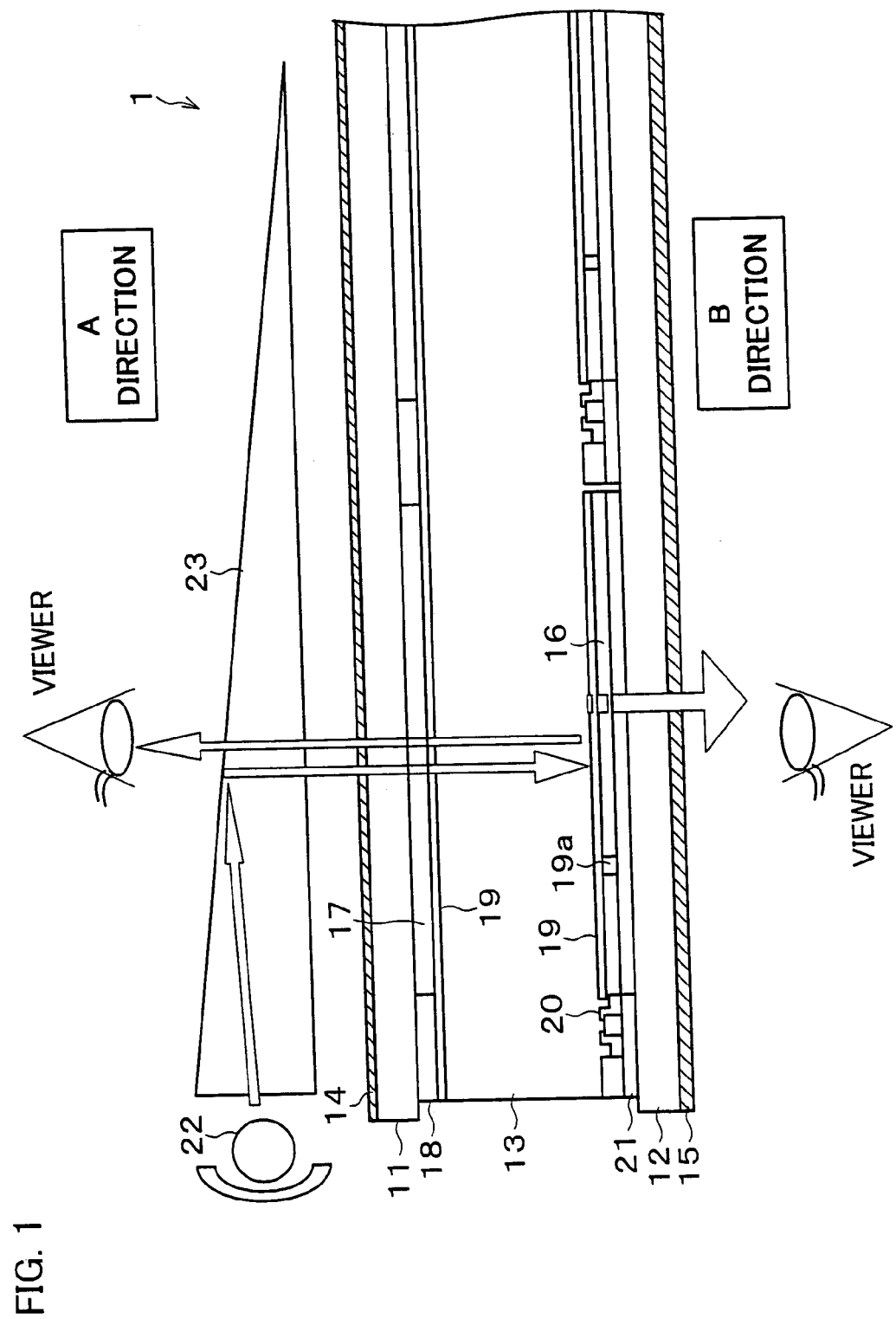
FIG. 1 is a cross section, illustrating a display of First Embodiment of the present invention.
Figure 4:
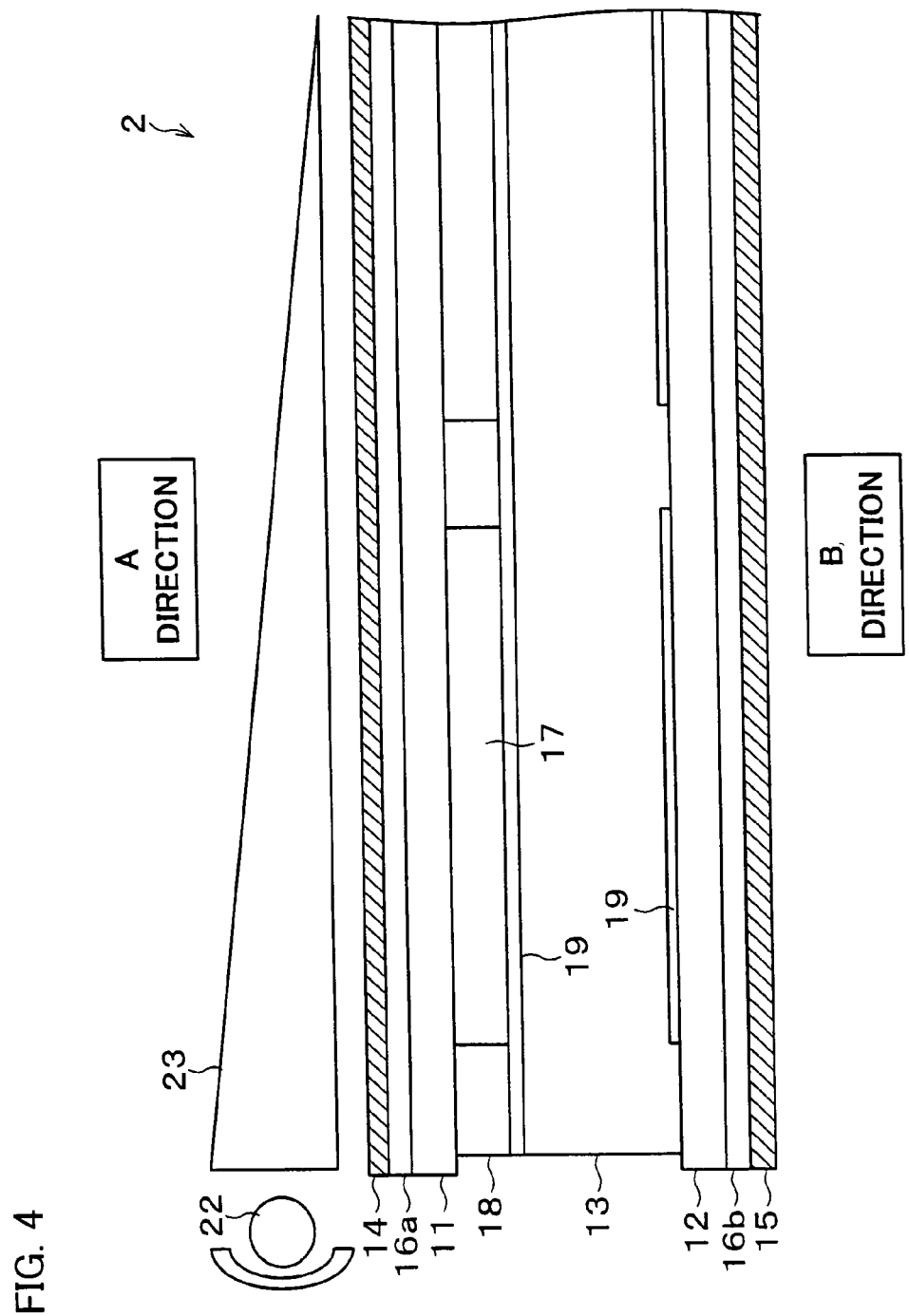
FIG. 4 is a cross section, illustrating a display for comparison with the display in FIG. 1.
Figure 5:
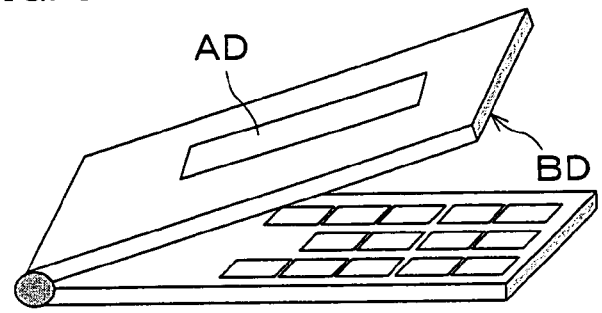
FIG. 5 is an outside drawing of a mobile phone terminal which is a device including a display of Second Embodiment.
Figure 10:
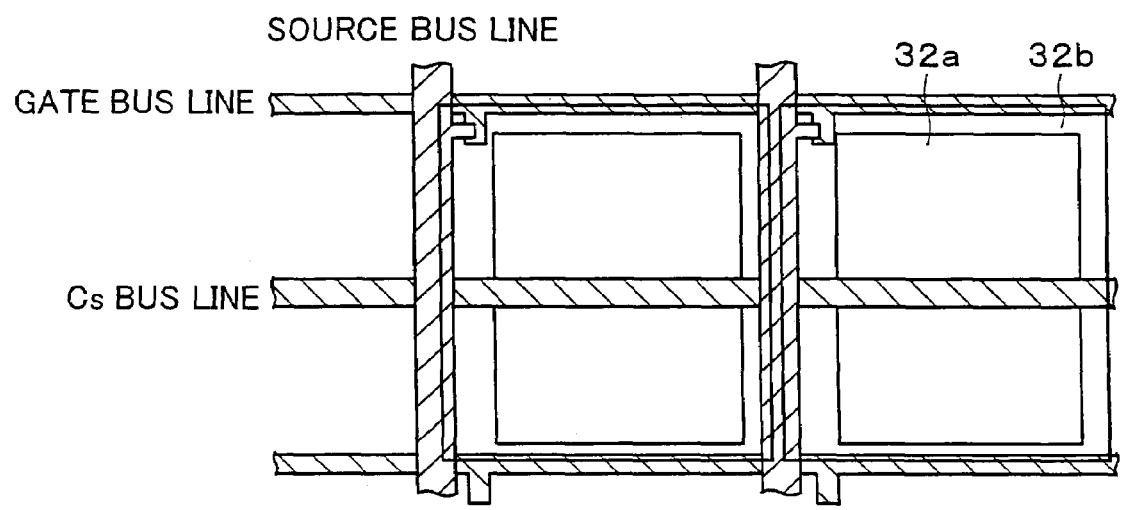
FIG. 10 is a plan view of the display in FIG. 9.

The following will describe one embodiment of the present invention with reference to FIGS. 1, 4, and 10.

FIG. 1 shows a cross section of a liquid crystal display (display) 1 of the present embodiment.

The liquid crystal display 1 includes a first glass substrate 11, second glass substrate 12, liquid crystal layer 13, first polarizing plate 14, second polarizing plate 15, polarizing selective reflector 16, color filters 17, shading film 18, transparent electrodes 19, switching element 20, light absorbing layer 21, light source 22, and light guiding plate 23. This liquid crystal display 1 is arranged so that the liquid crystal layer 13 is sandwiched between the first and second glass substrates 11 and 12 which are a pair of transparent substrates, and the direction from the liquid crystal layer 13 towards the first glass substrate 11 is termed "A direction" (first direction), whereas the direction from the liquid crystal layer 13 towards the second glass substrate 12 is termed "B direction" (second direction).

The light source 22 and light guiding plate 23 constitute a front light. This front light is that member of the liquid crystal display 1 which is provided at the farthest in the A direction, and the light guiding plate 23 causes the light emitted from the light source 22 to head for the B direction. The liquid crystal layer (display medium) 13 is, for instance, TN (Twisted Nematic) liquid crystal, and causes, when a voltage is not applied, linearly polarized light incident on and passing through the same to change the polarizing direction of the light for 90 degrees, whereas causes, when a voltage is applied, the linearly polarized light not to change the polarizing direction thereof.

The first polarizing plate (first polarizing means) 14 is provided on the A-oriented surface of the first glass substrate 11. This first polarizing plate 14 has a transmission axis provided in a predetermined direction, and allows only a light component which is the linearly polarized light in the direction parallel to the transmission axis to pass through. When unpolarized light emitted from the front light enters the first polarizing plate 14, the light is changed to linearly polarized light in parallel to the direction of the transmission axis of the first polarizing plate 14, and then passes through the first polarizing plate 14. The first polarizing plate 14 in this case is manufactured in such a manner that a polymer resin film to which absorber such as iodine and dichroic dye is mixed is stretched so that the absorber is aligned. Aside from this, any kinds of materials may be used for manufacturing the first polarizing plate 14, as long as the unpolarized light is changed to the linearly polarized light. The second polarizing plate (second polarizing means) 15 is provided on the B-oriented surface of the second glass substrate 12, and has a transmission axis provided in the direction identical with the transmission axis of the first polarizing plate 14.

The polarizing selective reflector (selective reflecting means, polarizing selective reflecting means) 16 is provided on the A-oriented surface of the second glass substrate 12. This polarizing selective reflector 16 is arranged in such a manner that, when the polarizing direction of the linearly polarized light incident on the polarizing selective reflector 16 is in parallel to the reflection axis, the polarizing selective reflector 16 reflects the linearly polarized light as light in the first polarization state (first state, the linearly polarized light in (1) direction), and when the polarizing direction of the linearly polarized light incident on the polarizing selective reflector 16 is in parallel to the transmission axis, the polarizing selective reflector 16 allows the linearly polarized light to pass through as light in the second polarization state (second state, the linearly polarized light in (2) direction. The reflection axis and transmission axis of the polarizing selective reflector 16 are orthogonal to each other. The reflection axis of the polarizing selective reflector 16 is orthogonal to the transmission axis of the first polarizing plate 14, and the transmission axis of the polarizing selective reflector 16 is in parallel to the transmission axis of the first polarizing plate 14 and the transmission axis of the second polarizing plate 15. In the present embodiment, a known polarizing selective reflector manufactured by depositing polymer membranes is adopted. Note that, as long as linear polarized light running in one direction passes through and linear polarized light running in another direction is reflected, any kinds of polarizing selective filters can be adopted.

The color filters 17 corresponding to R, G, and B colors are provided on the B-oriented surface of the first glass substrate 11. The polarizing selective reflector 16 is disposed so as to face these color filters 17. Being adjacent to the color filters 17, the shading film 18 is provided so as to face the switching element 20 and other wirings. This shading film 18 interrupts the light running in the B direction.

The transparent electrodes 19 are provided on the B-oriented surfaces of the color filters 17 and shading film 18 on the first glass substrate 11, and also provided on the A-oriented surface of the polarizing selective reflector 16 on the second glass substrate 12. These transparent electrodes 19 in the present embodiment are made of ITO (alloy of indium oxide and tin oxide), but other kinds of transparent conductive metal films can be adopted. Furthermore, although the present embodiment adopts metal transparent electrode materials, transparent materials such as resin and semiconductor may be adopted instead of metal materials. If necessary, a contact section 19a for wiring may be provided.

The switching element 20 is an active element such as a TFT for carrying out switching in order to drive a pixel and is provided on the A-oriented surface of the second glass substrate 12. Between the switching element 20 and second glass substrate 12, the light absorbing layer 21 is provided.

The liquid crystal display 1 in FIG. 1 is a double-sided display which can be watched both in the A and B directions and in all sorts of environments. When viewing images from the side of the A direction in FIG. 1, the front light is not turned on in a well-lighted place with intense outside light, so that images are reproduced by reflecting the outside light by the polarizing selective reflector 16. Meanwhile, in a place with weak outside light, the front light is turned on and the light from the front light is reflected on the polarizing selective reflector 16 so that images are reproduced. When viewing images from the side in the B direction in FIG. 1, the front light is not turned on in a well-lighted place so that images are reproduced by the assistance of the outside light passing through the polarizing selective reflector 16. Meanwhile, in a dark place, the front light is turned on so that the light from the front light passes through the polarizing selective reflector 16 so that images are reproduced.

Figure 2:
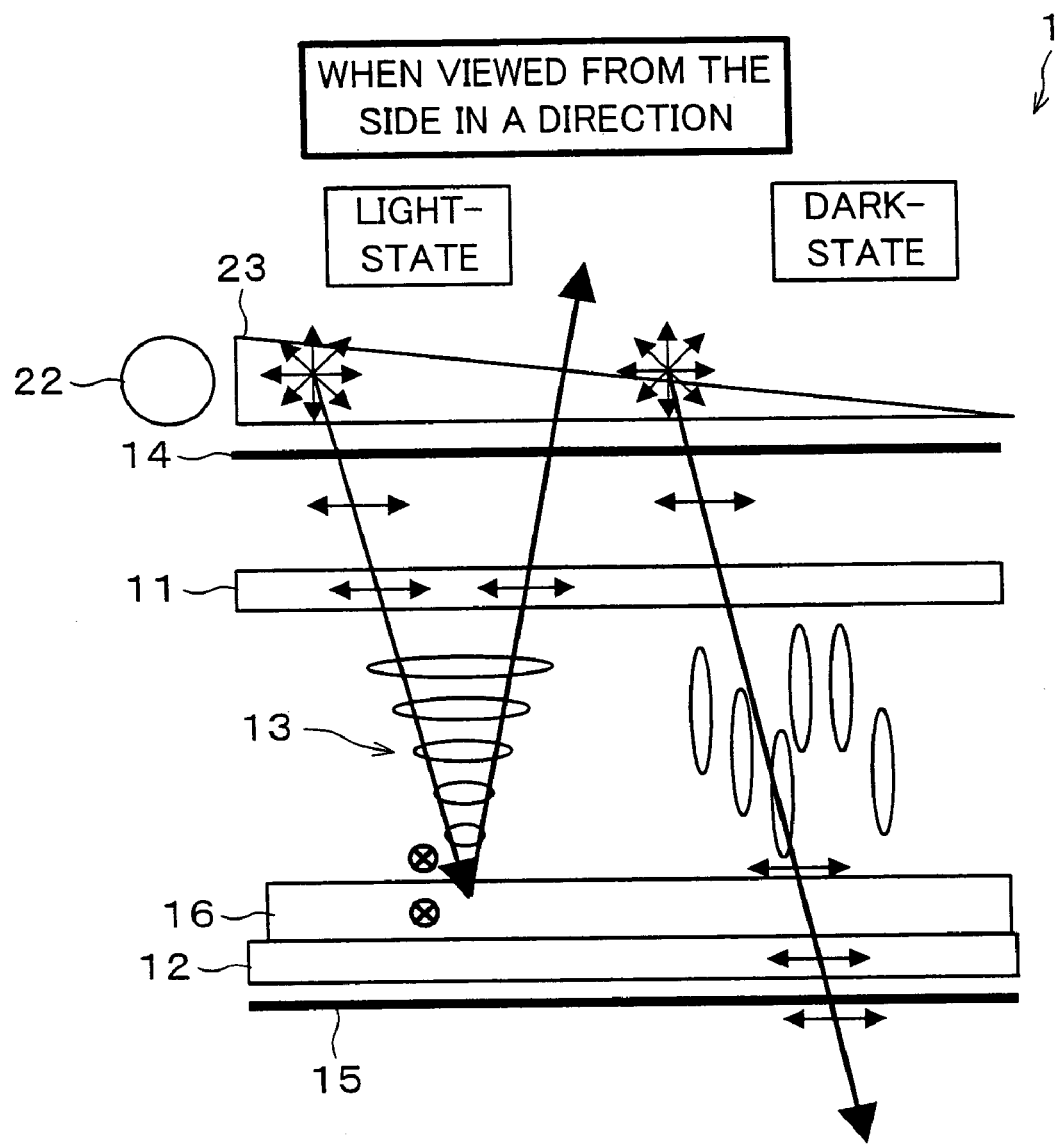
FIG. 2 is a drawing, illustrating a first operation of the display in FIG. 1.
Figure 3:
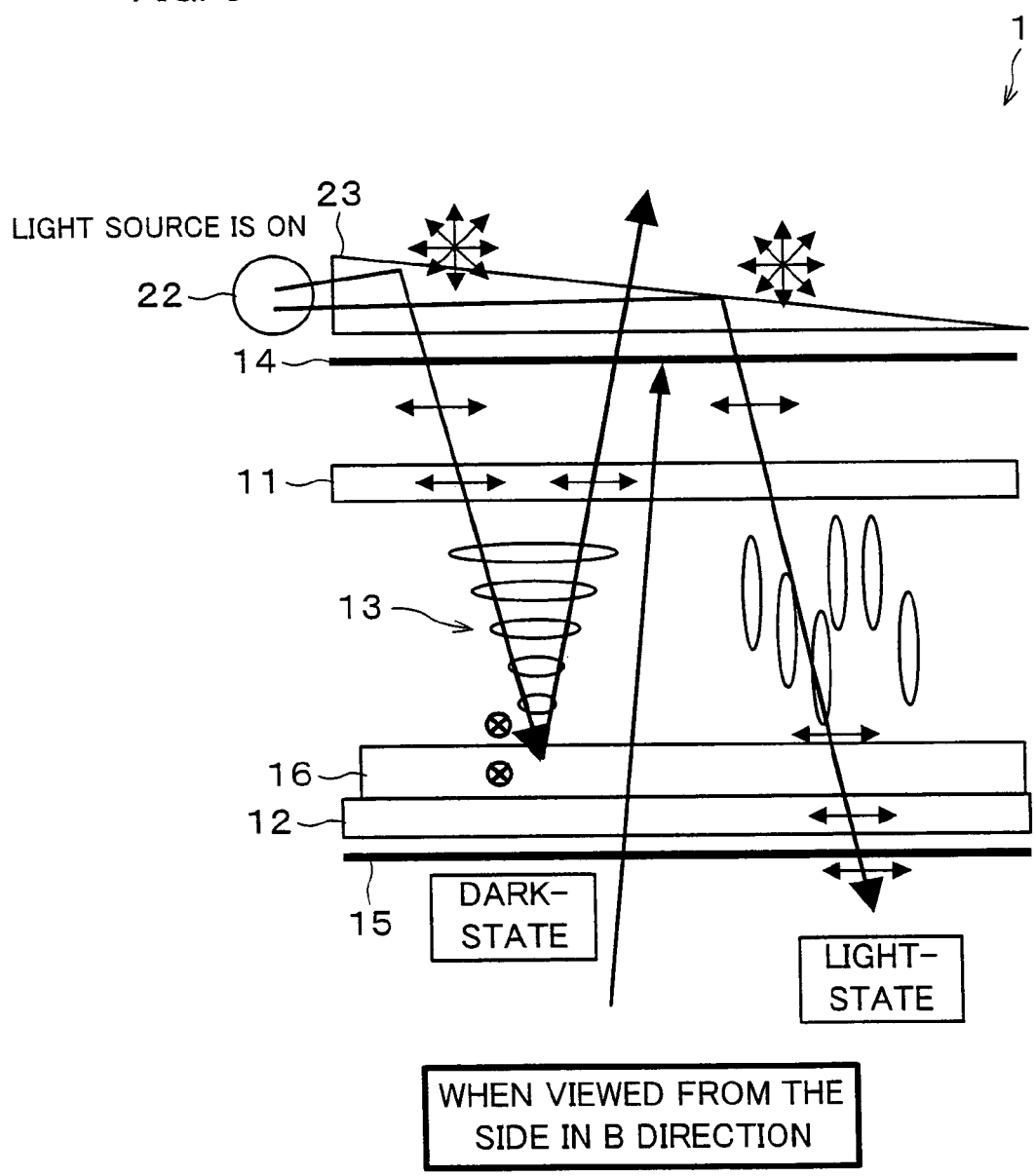
FIG. 3 is a drawing, illustrating a second operation of the display in FIG. 1.

Next, with reference to FIGS. 2 and 3, the following will specifically describe the displaying method when the liquid crystal layer 13 is a TN layer.

First, referring to FIG. 2, a case of viewing from the side in the A direction is described. The unpolarized light which is the outside light or light from the front light passes through the first polarizing plate 14 so as to be changed to linearly polarized light. The first polarizing plate 14 in FIG. 2 lets the linearly polarized light in the lateral (horizontal with respect to the figure) direction pass through. The linearly polarized light then optically rotates and twists for 90 degrees when passing through the liquid crystal layer 13, so as to become vertical (orthogonal to the figure). When the transmission axis of the first polarizing plate 14 and the transmission axis of the polarizing selective reflector 16 are disposed to be in parallel with each other, the linearly polarized light twists for 90 degrees in the liquid crystal layer 13, and is incident on the transmission axis of the first polarizing selective reflector 16, in an orthogonal manner. Thus, the linearly polarized light is incident on the polarizing selective reflector 16, in a manner parallel to the reflection axis thereof. The linearly polarizing light being incident in parallel to the reflection axis is reflected, twists again for 90 in the liquid crystal layer 13 so as to become identical with the original linearly polarized light, and passes thorough the first polarizing plate 14. In this manner, the light returns in the A direction so that the light-state image reproduction is realized.

When a voltage is applied to the liquid crystal layer 13, the twisted liquid crystal layer 13 is straightened so that liquid crystal molecules become vertical with respect to the first and second glass substrate 11 and 12. The outside light or light from the front light is changed to linearly polarized light as passing through the first polarizing plate 14. This linearly polarized light passes through the liquid crystal layer 13 without any changes, since the liquid crystal molecules are vertically aligned. The transmission axis of the first polarizing plate 14 is in parallel to the transmission axis of the polarizing selective reflector 16, so that the linearly polarized light passes through the polarizing selective reflector 16. Then, since the transmission axis of the second polarizing plate 15 is in parallel to the transmission axis of the polarizing selective reflector 16, the linearly polarized light passes through the second polarizing plate 15 and consequently passes over the liquid crystal display 1 in the B direction. In this manner, the light is caused not to return in the A direction, so that the dark-state image reproduction is realized.

Now, referring to FIG. 3, a case of viewing from the side in the B direction is described. Unpolarized light which is the outside light or light from the front light is changed to linearly polarized light as passing through the first polarizing plate 14. The axes in FIG. 3 are disposed in a manner identical with those in FIG. 2, and the linearly polarized light in the lateral direction (i.e. in parallel to the figure) passes through the first polarizing plate 14. This linearly polarized light optically rotates and twists for 90 degrees by passing through the liquid crystal layer 13, so as to become linearly polarized light in the longitudinal direction (i.e. vertical to the figure). When the transmission axis of the first polarizing plate 14 is disposed to be in parallel to the transmission axis of the polarizing selective reflector 16, the linearly polarized light twists for 90 degrees in the liquid crystal layer 13, and is incident on the polarizing selective reflector 16, in a manner parallel to the reflection axis thereof. This linearly polarized light being incident in parallel to the reflection axis is reflected, again twists for 90 degrees in the liquid crystal layer 13 so as to become identical with the original linearly polarized light, and passes through the first polarizing plate 14. In this manner, the light is caused not to pass in the B direction, so that the dark-state image reproduction is realized.

In this case, moreover, if there is light incident in the B direction, this light is changed to the linearly polarized light by the second polarizing plate 15, and passes through the polarizing selective reflector 16. Then this linearly polarized light twists for 90 degrees in the liquid crystal layer 13 and becomes orthogonal to the transmission axis of the first polarizing plate 14, and is consequently absorbed by the first polarizing plate 14. In this wise, being different from conventional art, the polarizing selective reflector 16 is provided only on the B-oriented surface of the liquid crystal layer 13. For this reason, no light is reflected to the liquid crystal layer 13 in the direction opposite to the A direction. In this case, moreover, the light being incident from the side in the B direction and passing through the second polarizing plate 15 does not include the linearly polarized light orthogonal to the transmission axis of the second polarizing plate 15, because of the absorption by the second polarizing plate 15. For this reason, no light is reflected in the B direction by the polarizing selective reflector 16.

Thus, in the case of the dark-state image reproduction viewed from the side in the B direction using the light incident in the A direction, the light incident in the B direction is caused not to be reflected and return, the quality of the black display is improved in a dark place as well as in a well-lighted place. As a result, the liquid crystal display 1 can properly perform the black display both in a well-lighted place and in a dark place.

Now, when a voltage is applied to the liquid crystal layer 13, the twisted liquid crystal layer 13 is straightened so that liquid crystal molecules are vertical to the first and second glass substrates 11 and 12. The outside light or light from the front light is changed to be linearly polarized light as passing through the first polarizing plate 14. Since the liquid crystal molecules are vertically aligned, the linearly polarized light passes through the liquid crystal layer 13 without any changes. The transmission axis of the first polarizing plate 14 is in parallel to the transmission axis of the polarizing selective reflector 16, so that the linearly polarized light passes through the polarizing selective reflector 16. Then since the transmission axis of the second polarizing plate 15 is in parallel to the transmission axis of the polarizing selective reflector 16, the linearly polarized light further passes through the second polarizing plate 15 and consequently passes over the liquid crystal display 1 in the B direction. In this manner, the light-state image reproduction is realized.

Since the liquid crystal display 1 includes the light absorbing layer 21, the light running in the B direction towards driver wiring is absorbed by the light absorbing layer 21. This makes it possible to eliminate the reflection on metal wirings such as the driver wiring and thus prevent the dark-state image reproduction from appearing whitish. The light absorbing layer 21 may be provided not only on the B-oriented surface of the switching element 20 but also on the B-oriented surface of the driver wiring of the pixel. As indicated by oblique lines in FIG. 10, the light absorbing layer can be provided on the B-oriented surfaces of the switching element 20 and the driver wiring such as a gate bus line, source bus line, and Cs bus line.

As another antireflection measure, the driver wiring such as the bus line may be made of a low-reflecting material which restrains the light reflection to be not higher than a predetermined level, irrespective of the existence of the light absorbing layer 21. With this, the reflection of the light incident from the side in the B direction and running towards the driver wiring is restrained to be equal to or lower than the predetermined level, so that the influence of the reflection from the driver wiring can be eliminated.

Now, a comparative example in which the polarizing selective reflectors 16 are provided both to the A direction and B direction of the liquid crystal layer 13 will be described with reference to FIG. 4.

A liquid crystal display 2 shown in FIG. 4 includes an additional polarizing selective reflector 16a between the first glass substrate 11 and first polarizing plate 14. A polarizing selective reflector 16b corresponding to the polarizing selective reflector 16 in FIG. 1 is disposed between the second glass substrate 12 and second polarizing plate 15. The polarizing selective reflectors 16a and 16b are identical to each other. Provided that the axes of the polarizing plates and polarizing selective reflectors are arranged in a manner identical with those in FIGS. 2 and 3, in the case of the dark-state image reproduction, the light being incident from the side in the B direction is changed to be linearly polarized light as passing through the second polarizing plate 15 and then passes through the polarizing selective reflector 16b. The linearly polarized light then optically rotates for 90 degrees in the liquid crystal layer 13, and is reflected on the polarizing selective reflector 16a. The reflected light again optically rotates for 90 degrees in the liquid crystal layer 13, and goes back in the B direction through the polarizing selective reflector 16b and second polarizing plate 15.

Thanks to the above-described displaying method, the liquid crystal display 1 can be viewed from both of the sides in the A and B directions, and in all sorts of circumstances. In the above, moreover, the image reproduction viewed from the side in the A direction realizes the light-state image reproduction without the voltage application to the liquid crystal layer 13, and realizes the dark-state image reproduction with the voltage application to the liquid crystal layer 13. The image reproduction viewed from the side in the B direction realizes, on the contrary to the image reproduction viewed from the side in the A direction, the dark-image reproduction without the voltage application to the liquid crystal layer 13, and realizes the light-state image reproduction with the voltage application to the liquid crystal layer 13. One can understand that, with no modification, the tones of the image reproduction viewed from the side in the A direction are in contrast to the tones of the image reproduction viewed from the side in the B direction, with respect to identical display data.

Thus, driver circuits in the present embodiment are arranged so as to cause the tones of the display data on the A-oriented screen and the tones of the display data on the B-oriented screen to be both inverted. With this, the tones are always consistent both in the case of the image reproduction viewed from the side in the A direction and in the case of the image reproduction viewed from the side in the B direction.

In the liquid crystal display 1 of the present embodiment, the polarized selective reflector 16 is disposed on the A-oriented surface of the second glass substrate 12 (i.e. inward of the liquid crystal panel). However, similar effects can be obtained when, as in the liquid crystal display 2 shown in FIG. 4, the polarizing selective reflector 16 is disposed on the B-oriented surface of the second glass substrate 12 (i.e. outward of the liquid crystal panel). In this case, if a parallax error occurs due to the thickness of the second glass substrate 12, it is possible to eliminate the error by causing the thickness of the second glass substrate 12 to be thinner (preferably not more than 0.3 mmt).

Second Embodiment

The following will describe another embodiment of the present invention with reference to FIGS. 5-7 and 53-61B. By the way, members having the same functions as those described in First Embodiment are given the same numbers, so that the descriptions are omitted for the sake of convenience.

In the present embodiment, devices including a display, namely a double-sided liquid crystal display, will be discussed.

First, an example when the device is a mobile phone is discussed.

There are two types of mobile phone terminals, namely a "straight" type and "folding" type. Folding mobile phone terminals have become mainstream because of growing popularity of exchanging graphic images and the increase of the size of a data display screen. Such a folding mobile phone terminal is unfolded when talking or data processing is carried out, while, as in FIG. 5, the terminal is folded during standby. To check information such as a clock and a signal of incoming call in the folded state, a back display AD is provided for reproducing simple information. In this state, a front display BD is disposed inside the folded terminal.

Figure 6:
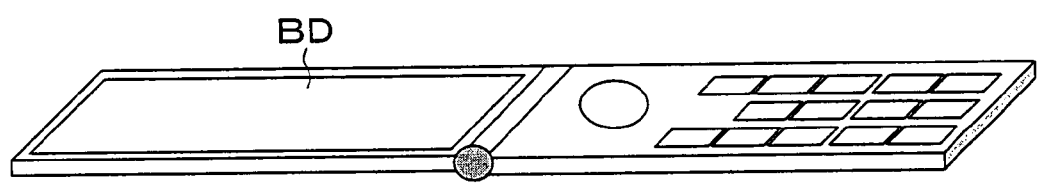
FIG. 6(*a*) illustrates how the mobile phone terminal in FIG. 5 is used.
Figure 6:
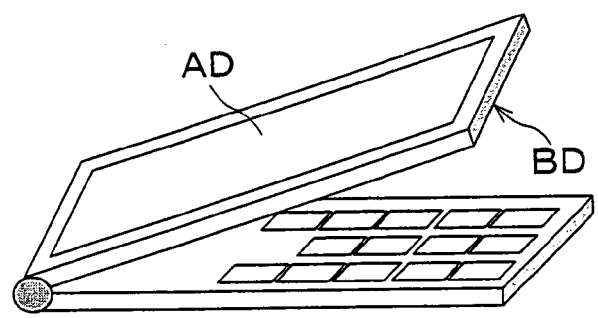
Figure 7:
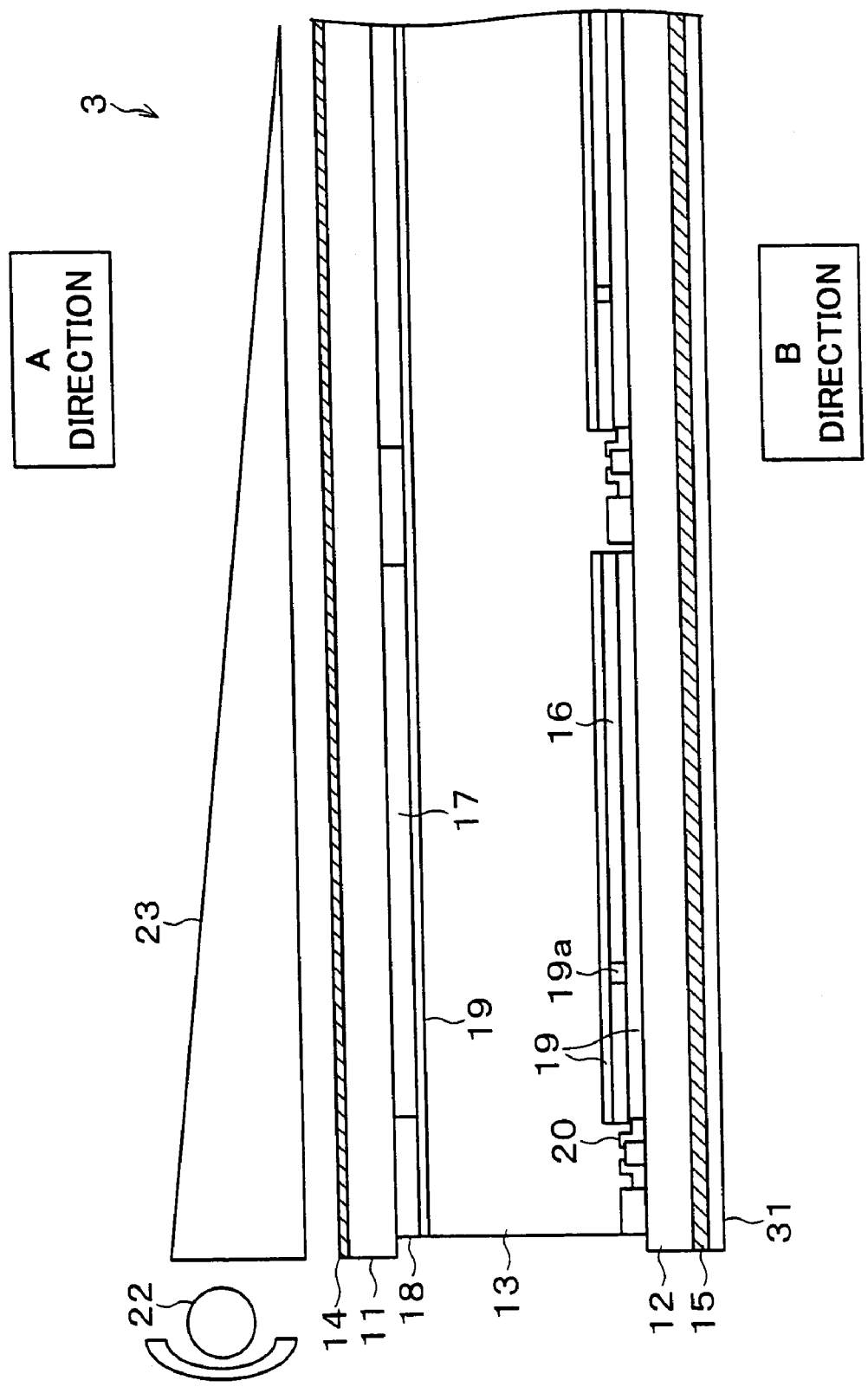
FIG. 7 is a cross section, illustrating a display of Second Embodiment of the present invention.

FIGS. 6(*a*) and 6(*b*) show a mobile phone terminal adopting a liquid crystal display (display) 3 which is a double-sided display of the present embodiment, and FIG. 7 shows a cross section of the liquid crystal display 3.

As in FIG. 6(*a*), main information regarding talking and data processing is reproduced on the front display BD. To view images reproduced on the front display BD, the viewing is performed from the side in the B direction in FIG. 7. When performing this in intense outside light, the image reproduction is carried out by letting outside light pass through without turning the front light on, or by letting the light from the front light pass through with the front light being turned on. When viewing in weak outside light, the image reproduction is carried out by letting the light from the front light pass through with the front light being turned on. The switching between the light-state image reproduction and dark-state image reproduction is performed by controlling a voltage applied to the liquid crystal layer 13.

As in FIG. 6(*b*), as to the mobile phone terminal being folded, images on the back display AD are viewed. In this case, the viewing is performed from the side in the A direction in FIG. 7. In intense outside light, the front light is not turned on so that the image reproduction is carried out by causing the outside light to be reflected on the polarizing selective reflector 16. In weak outside light, the front light is turned on so that the image reproduction is carried out by causing the light from the front light to be reflected on the polarizing selective reflector 16. The switching between the light-state image reproduction and dark-state image reproduction is performed by controlling a voltage applied to the liquid crystal layer 13.

To carry out the light-state image reproduction (in a normally-white image reproduction mode), the incident light is reflected on the polarizing selective reflector 16 so that the light-state image reproduction is realized. Meanwhile, to carry out the dark-state image reproduction (in the normally white image reproduction mode), the polarizing selective reflector 16 lets the light pass through but causes the light not to return, so that the dark-state image reproduction is realized. When using the mobile phone terminal being folded, the light having passed through the polarizing selective reflector 16 is reflected on, for instance, an operation face on the back side and returns. This could cause the black display in the dark-state image reproduction to appear whitish, thereby inducing the decrease of the contrast. Further, this whitish black display also occurs when light such as the outside light returns to the side in the A direction through the liquid crystal display 3, owing to reasons such as the above-mentioned reflection on the back side.

To solve this problem, as shown in FIG. 7, the liquid crystal display 3 is provided with a retardation film 31 on the B-oriented surface of the second polarizing plate 15. This retardation film 31 is a $\lambda/4$ film ($\lambda/4$ plate). Thanks to the existence of this retardation film 31, the linearly polarized light having passed through the second polarizing plate 15 becomes circularly polarized light. This circularly polarized light is reflected on, e.g. the operating face and again passes through the retardation film 31, and consequently linearly polarized light orthogonal to the transmission axis of the second polarizing plate 15 is obtained. Since this linearly polarized light is incident on the second polarizing plate 15, the light is in parallel to the absorption axis so as to be absorbed, and hence it is possible to keep proper dark-state image reproduction with no return of the light.

In the present embodiment, the retardation film 31 is disposed on the B-oriented surface of the second polarizing plate 15, in order to prevent the dark-state image reproduction from appearing whitish because of the reflection on the back side such as the operating face. However, the operating face, etc. may be made of light-absorbing materials. This light absorber is disposed for absorbing the light having passed over in the B direction and can be inserted to and removed from the light path. With this, it is possible to properly carry out the black display by preventing the dark-state image reproduction from appearing whitish. Alternatively, it is possible to subject the operating face, etc. to antireflection processing.

The following will describe a method of preventing the dark-state image reproduction from appearing whitish when the mobile phone terminal is used in the folded state. As in FIG. 53, when the mobile phone terminal is used in the folded state, the polarizing selective reflector 16 lets the light pass through but causes the light not to return, so that the dark-state image reproduction is realized.

Figure 53:
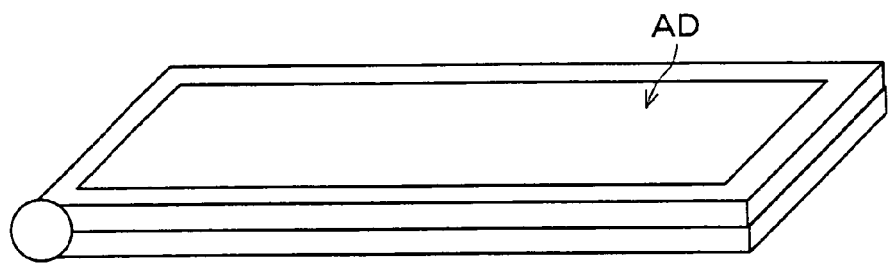
FIG. 53 is an oblique perspective view, showing the mobile phone terminal of Second Embodiment in FIG. 5, which has been folded.
Figure 54:
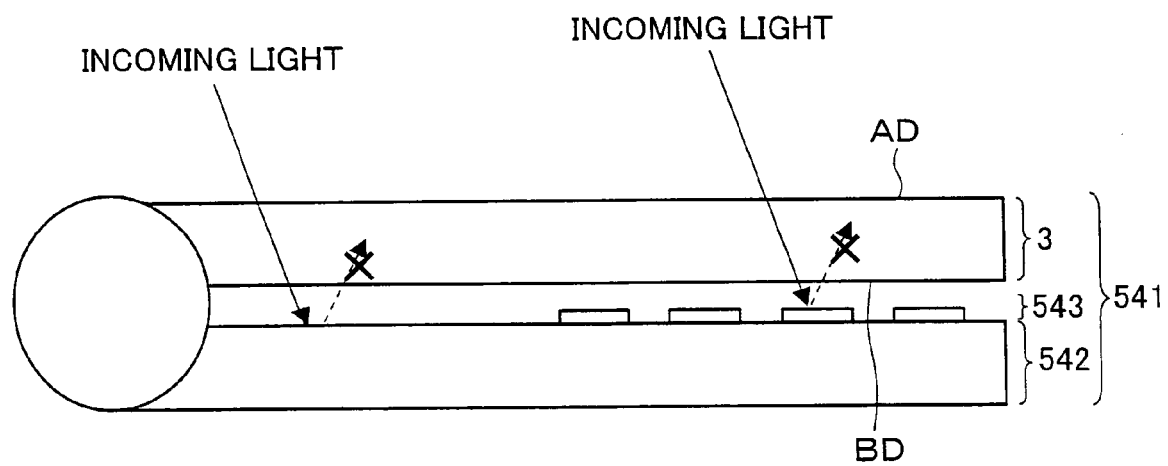
FIG. 54 is a profile of the mobile phone terminal shown in FIG. 53.
Figure 55:
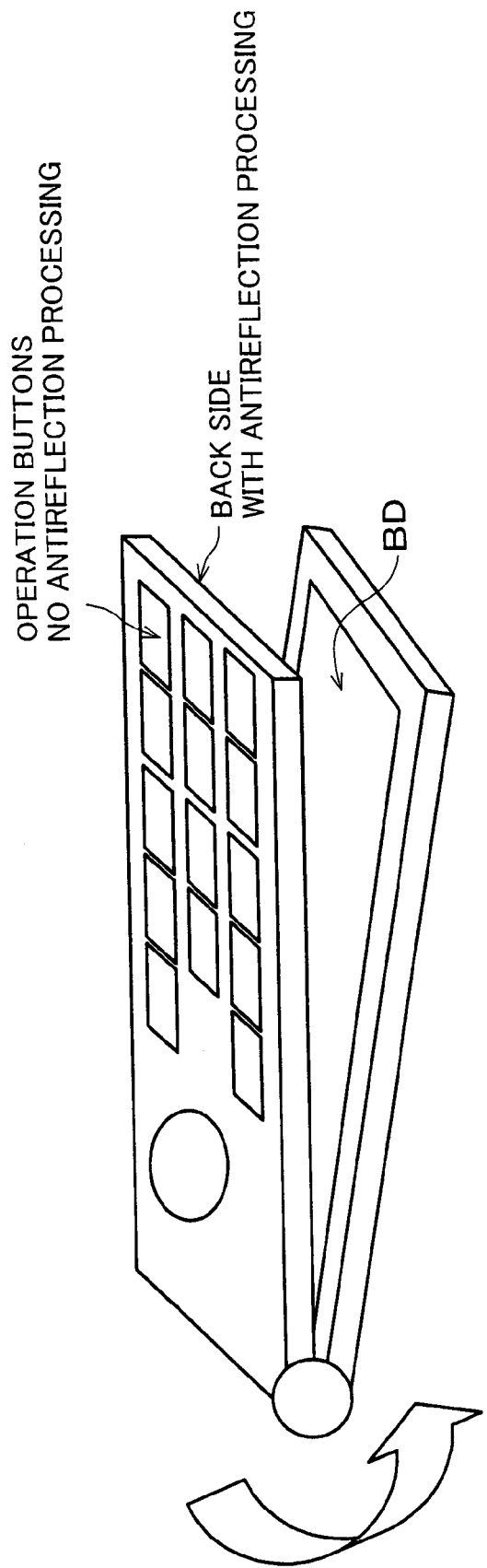
FIG. 55 is an oblique perspective view, showing the mobile phone terminal of Second Embodiment in FIG. 5, which has been folded in the opposite direction.

A cross section of the object in FIG. 53 is shown in FIG. 54. As in this figure, the light having passed through the liquid crystal display 3 reaches an operation-side device 541. This operation-side device 541 is made of up an operation-side substrate 542 on which members such as various operating buttons 543 are provided. Since the operation-side substrate 542 either is a light absorber or has been subjected to light-absorption processing, the light is absorbed by the operation-side substrate 542 so as not to be reflected, thereby not returning to the liquid crystal display 3 side. On this account, the black display can be suitably carried out. Furthermore, the members such as the various operating buttons 543 are also subjected to light-absorption processing or made of light absorber, so that the light does not return and hence the black display can be suitably carried out.

As in the foregoing description, the example with reference to FIG. 54 has described the prevention of the dark-state image reproduction from appearing whitish, by subjecting the devices and display buttons, which are located inside when the operation-side device 541 is covered, to antireflection processing. Furthermore, even if the design of the terminal does not permit the antireflection processing of the members such as the operating buttons 543, the following way of folding the device with a double-sided display makes it possible to prevent the dark-state image reproduction from appearing whitish.

As described above, when the viewing is performed from the A-oriented side (AD), the surface facing the side opposite to the A-oriented side is preferably arranged not to return, e.g. reflect, the light to the A-oriented side. However, if it is impossible to carry out the antireflection processing with respect to the members such as the operating buttons 543 in FIG. 54, the folding is, as in FIG. 55, performed in the following manner: That surface of the operation-side substrate 542, which is opposite to the surface on which the members such as the operating buttons 543 are provided, is subjected to the antireflection processing, and the B-oriented side (BD) of the double-sided display is caused to move towards the above-mentioned opposite surface. With this arrangement, it is possible to prevent the whitish appearance of the dark-state image reproduction on the A-oriented side.

In the mobile phone terminal shown in FIGS. 6(*a*) and 6(*b*), the front display BD and back display AD are reversed when viewing the other display. Thus, images reproduced from the display data are laterally reversed by the drive circuits, when the display carrying out the image reproduction is switched to/from the back display AD from/to the front display BD. With this, it is possible to always reproduce identically-oriented images even if the display carrying out the image reproduction is laterally switched to/from the back display AD from/to the front display BD. Alternatively, images reproduced from the display data are turned upside down by the drive circuits, when the display carrying out the image reproduction is switched to/from the back display AD from/to the front display BD. With this, it is possible to always reproduce identically-oriented images even if the display carrying out the image reproduction is vertically switched to/from the back display AD from/to the front display BD.

Next, an example when the device including the double-sided liquid crystal display 3 is a personal computer (hereinafter, PC) is discussed.

Figure 56:
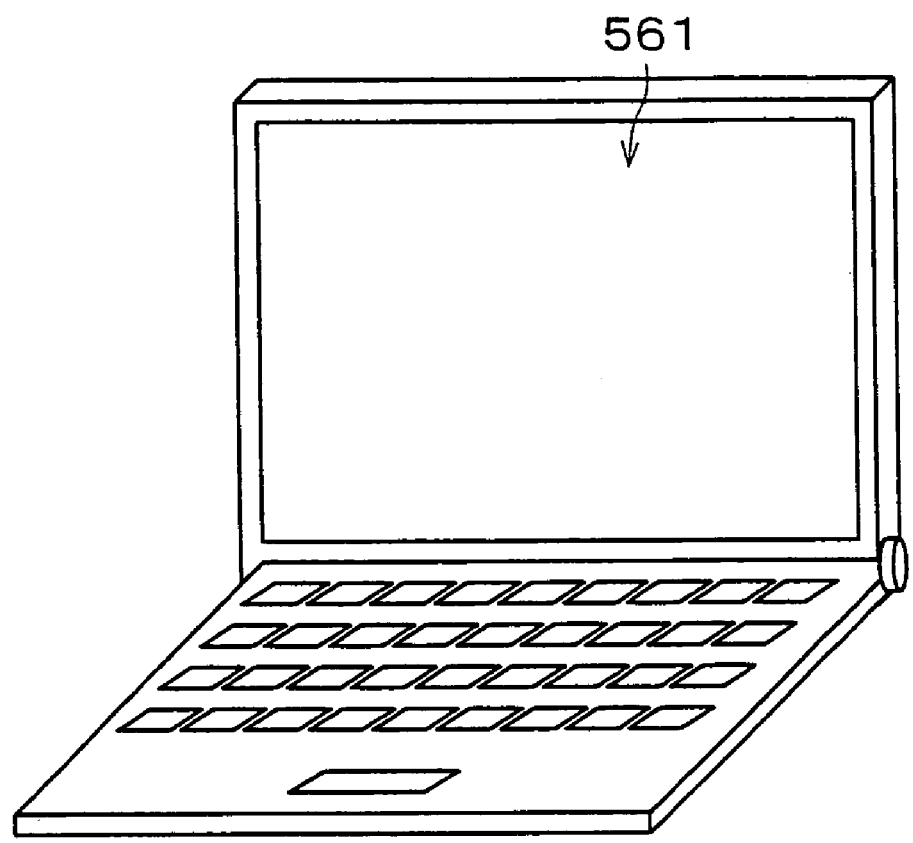
FIG. 56(a) is an oblique perspective view, showing a note PC which is a device including the display of Second Embodiment of the present invention.
FIG. 56(b) is an oblique perspective view, showing the note PC which is a device including the display of Second Embodiment of the present invention.
Figure 56:
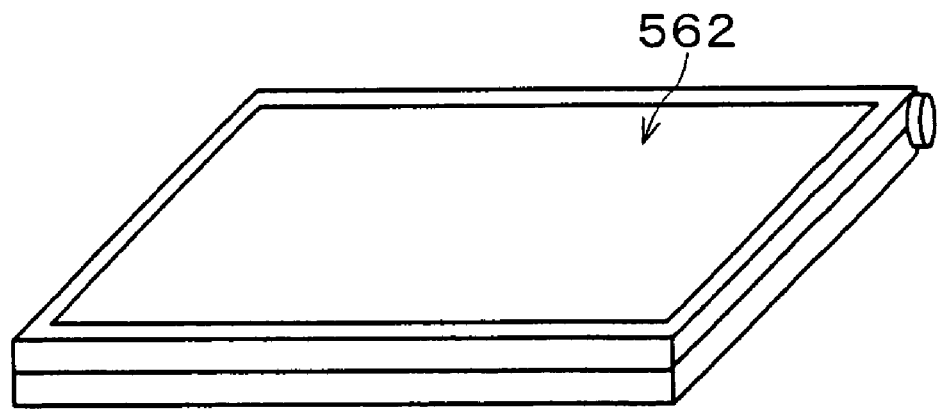

There are two types of PCs, namely desktop PCs and notebook PCs. In terms of the weight and portability, the notebook PCs are often carried around. FIG. 56 shows an example when the double-sided liquid crystal display 3 is adopted to a notebook PC. The input of, for instance, characters using a keyboard is, as in FIG. 56(*a*), carried out in the unfolded PC. During standby or when the input using the keyboard is not carried out, meanwhile, the PC is folded as in FIG. 56(*b*). When the input of, for instance, characters using a keyboard is carried out, the image reproduction is carried out on a front display 561, as shown in FIG. 56(*a*). Meanwhile, during standby or when the input using the keyboard is not carried out, the image reproduction is carried out on a back display 562.

When the PC is used in the state shown in FIG. 56(*a*), images are viewed from the side in the B direction in FIG. 7. When viewing on the side in the B direction, in intense outside light, the image reproduction is carried out by letting the outside light pass through without turning the front light on or by letting the light from the front light pass thorough with the front light being turned on. In weak outside light, on the other hand, the image reproduction is carried out by letting the light from the front light pass thorough with the front light being turned on. The switching between the light-state image reproduction and dark-state image reproduction is performed by controlling a voltage applied to the liquid crystal layer 13.

When the PC is used in the folded state as in FIG. 56(*b*), the image reproduction is carried out on the back display 562. In this case, the viewing is carried out from the side in the A direction in FIG. 7. In intense outside light, the front light is not turned on so that the image reproduction is carried out by causing the outside light to be reflected on the polarizing selective reflector 16. In weak outside light, the front light is turned on so that the image reproduction is carried out by causing the light from the front light to be reflected on the polarizing selective reflector 16. The switching between the light-state image reproduction and dark-state image reproduction is performed by controlling a voltage applied to the liquid crystal layer 13.

In the PC shown in FIGS. 56(*a*) and 56(*b*), the front display 561 and back display 562 are reversed when viewing the other display. Thus, images reproduced from the display data are laterally reversed by the drive circuits, when the display carrying out the image reproduction is switched to/from the back display 562 from/to the front display 561. With this, it is possible to always reproduce identically-oriented images even if the display carrying out the image reproduction is laterally switched to/from the back display 562 from/to the front display 561.

Alternatively, the tones of images reproduced from the display data are reversed by the drive circuits in order to reproduce desired images, when the display carrying out the image reproduction is switched to/from the back display 562 from/to the front display 561. With this, it is possible to always reproduce identically-toned images irrespective of the displays being used.

Furthermore, images reproduced from the display data are turned upside down by the drive circuits, when the display carrying out the image reproduction is switched to/from the back display 562 from/to the front display 561. With this, it is possible to always reproduce identically-oriented images even if the display carrying out the image reproduction is vertically switched to/from the back display 562 from/to the front display 561.

In the example concerning FIGS. 56(*a*) and 56(*b*), two types of reversal, namely the reversal of the tones of images and the lateral reversal of images, are carried out. For this reason, an automatic operation button is provided for supplying a signal indicating image reversal on the occasion of opening/closing the PC. Since the automatic operation button is pushed in sync with the action of opening/closing the PC, desired images are reproduced both in the state in FIG. 56(*a*) and in the state shown in FIG. 56(*b*).

Apart from the occasion of opening/closing the PC, the reversal of images reproduced from the display data may be performed by purposely pushing an operating button such as a switch.

In the example shown in FIG. 56, all of the components including members constituting the keyboard and key switches are light absorbers or subjected to light-absorption processing. Thus, the whitish appearance of the dark-state image reproduction on the back display 562 is prevented so that proper image reproduction can be performed.

There is another method of preventing the whitish appearance of the dark-state image reproduction on the back display 562. That is, in the liquid crystal display 3 which is a panel in FIG. 7, the retardation film 31 is disposed on the B-oriented surface of the second polarizing plate 15, so that the whitish appearance of the dark-state image reproduction due to the back-side reflection on, for instance, the operating face can be prevented. The whitish appearance of the dark-state image reproduction also can be prevented by disposing a display (not illustrated), which can switch the phase difference between 0 and $\lambda/2$, between the second polarizing plate 15 and second glass substrate 12 of the liquid crystal display 3.

Figure 57:
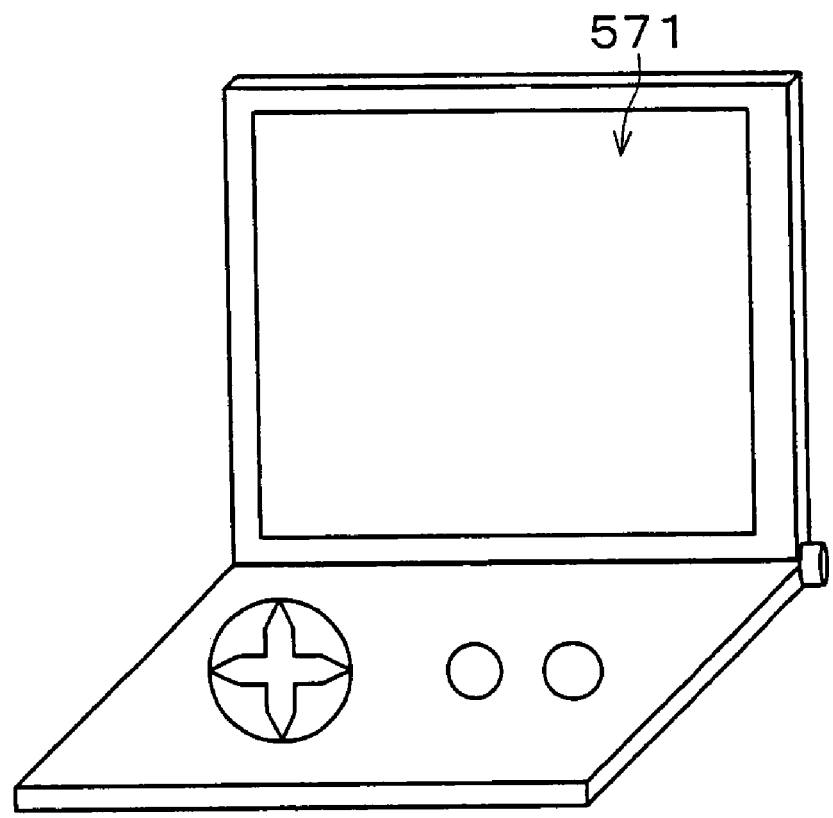
FIG. 57(a) is an oblique perspective view, showing a mobile phone terminal which is a device including the display of Second Embodiment of the present invention.
FIG. 57(b) is an oblique perspective view, showing the mobile phone terminal which is a device including the display of Second Embodiment of the present invention.
Figure 57:
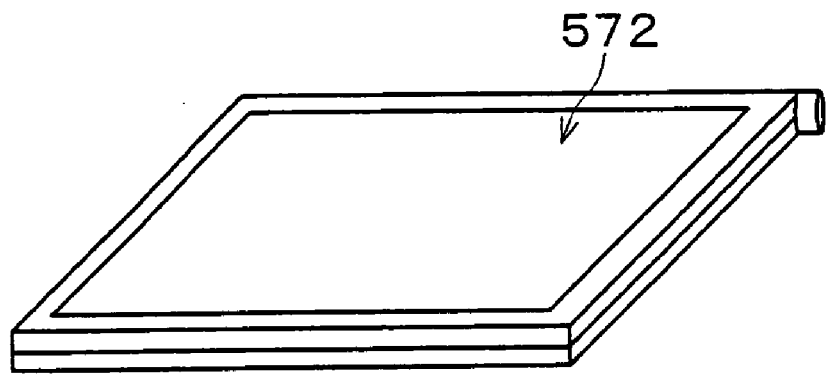

Next, an example when the device including the double-sided liquid crystal display 3 is a mobile terminal (e.g. a PDA and mobile game console) is discussed. FIG. 57 shows an example of adopting the double-sided liquid crystal display 3 to a mobile terminal.

When the mobile terminal is operated using, for instance, buttons, the mobile terminal is in the unfolded state as in FIG. 57(*a*). Meanwhile, during standby or when the buttons are not used, the mobile terminal is in the folded state as in FIG. 57(*b*). When operations are carried out using buttons as in FIG. 57(*a*), the image reproduction is carried out on a front display 571. On the other hand, during standby or when the buttons are not used, the image reproduction is carried out on a back display 572.

When the mobile terminal is used in the unfolded state as in FIG. 57(*a*), the viewing is carried out from the side in the B direction in FIG. 7. Provided that the viewing is carried out from the side in the B direction, in intense outside light, the front light is not turned on so that the image reproduction is carried out by causing the outside light to pass through, or the front light is turned on so that the image reproduction is carried out by causing the light from the front light to pass through. In weak outside light, meanwhile, the front light is turned on so that the image reproduction is carried out by causing the light from the front light to pass through. The switching between the light-state image reproduction and dark-state image reproduction is performed by controlling a voltage applied to the liquid crystal layer 13.

When the mobile terminal is used in the folded state as in FIG. 57(*b*), images on the back display 572 are viewed. In this case, the viewing is carried out from the side in the A direction in FIG. 7. In intense outside light, the front light is not turned on so that the image reproduction is carried out by causing the outside light to be reflected on the polarizing selective reflector 16. In weak outside light, the front light is turned on so that the image reproduction is carried out by causing the light from the front light to be reflected on the polarizing selective reflector 16. The switching between the light-state image reproduction and dark-state image reproduction is performed by controlling a voltage applied to the liquid crystal layer 13.

In the mobile terminal shown in FIGS. 57(*a*) and 57(*b*), the front display 571 and back display 572 are reversed when viewing the other display. Thus, images reproduced from the display data are laterally reversed by the drive circuits, when the display carrying out the image reproduction is switched to/from the back display 572 from/to the front display 571. With this, it is possible to always reproduce identically-oriented images even if the display carrying out the image reproduction is laterally switched to/from the back display 572 from/to the front display 571.

Alternatively, the tones of images reproduced from the display data are reversed by the drive circuits, when the display carrying out the image reproduction is switched to/from the back display 572 from/to the front display 571. With this, it is possible to always reproduce identically-toned images irrespective of the displays being used.

Furthermore, images reproduced from the display data are turned upside down by the drive circuits, when the display carrying out the image reproduction is switched to/from the back display 572 from/to the front display 571. With this, it is possible to always reproduce identically-oriented images even if the display carrying out the image reproduction is vertically switched to/from the back display 572 from/to the front display 571.

In the example concerning FIGS. 56(*a*) and 56(*b*), two types of reversal, namely the reversal of the tones of images and the lateral reversal of images, are carried out. For this reason, an automatic operation button is provided for supplying a signal indicating image reversal on the occasion of opening/closing the mobile terminal. Since the automatic operation button is pushed in sync with the action of opening/closing the mobile terminal, desired images are reproduced both in the state in FIG. 57(*a*) and in the state shown in FIG. 57(*b*).

Apart from the occasion of opening/closing the mobile terminal, the reversal of images reproduced from the display data may be performed by purposely pushing an operating button such as a switch.

In the example shown in FIG. 57, all of the components including members constituting the buttons and key switches are light absorbers or subjected to light-absorption processing. Thus, the whitish appearance of the dark-state image reproduction on the back display 572 is prevented so that proper image reproduction can be performed.

There is another method of preventing the whitish appearance of the dark-state image reproduction on the back display 572. That is, in the liquid crystal display 3 which is a panel in FIG. 7, the retardation film 31 is disposed on the B-oriented surface of the second polarizing plate 15, so that the whitish appearance of the dark-state image reproduction due to the back-side reflection on, for instance, the operating face can be prevented. The whitish appearance of the dark-state image reproduction also can be prevented by disposing a display (not illustrated), which can switch the phase difference between 0 and $\lambda/2$, between the second polarizing plate 15 and second glass substrate 12 of the liquid crystal display 3.

Figure 58:
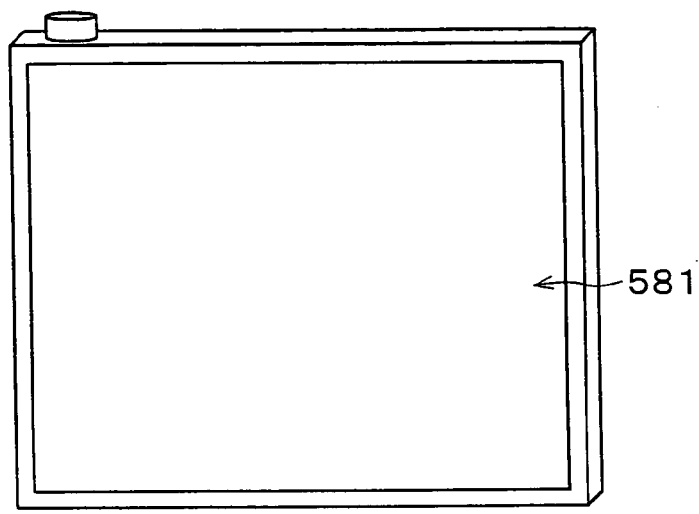
FIG. 58(a) is an oblique perspective view, showing a television which is a device including the display of Second Embodiment of the present invention.
FIG. 58(b) is an oblique perspective view, showing the television which is a device including the display of Second Embodiment of the present invention.
Figure 58:
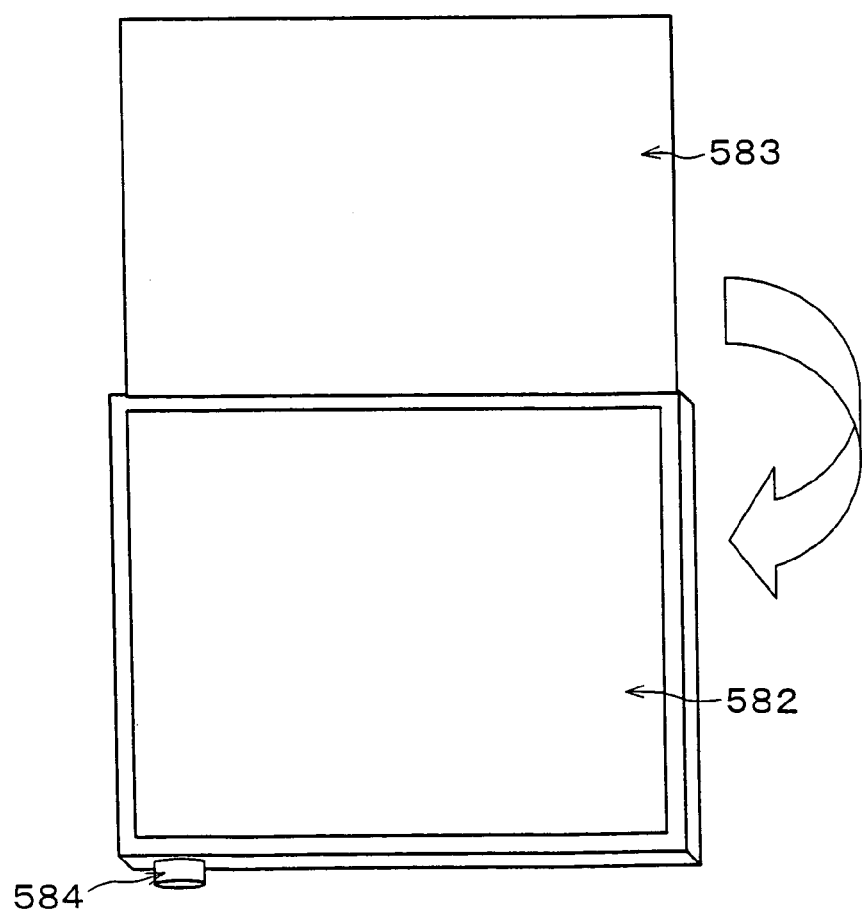

Next, an example when the device including the double-sided liquid crystal display 3 is an image display such as a television and display monitor is discussed. FIG. 58 shows an example of adopting the double-sided liquid crystal display 3 to a television.

As in FIG. 58(*a*), when images on a front display 581 are viewed, the viewing is carried out from the side in the B direction in FIG. 7. Provided that the viewing is carried out from the side in the B direction, in intense outside light, the front light is not turned on so that the image reproduction is carried out by causing the outside light to pass through, or the front light is turned on so that the image reproduction is carried out by causing the light from the front light to pass through. In weak outside light, the front light is turned on so that the image reproduction is carried out by causing the light from the front light to pass through. The switching between the light-state image reproduction and dark-state image reproduction is performed by controlling a voltage applied to the liquid crystal layer 13.

Figure 59:
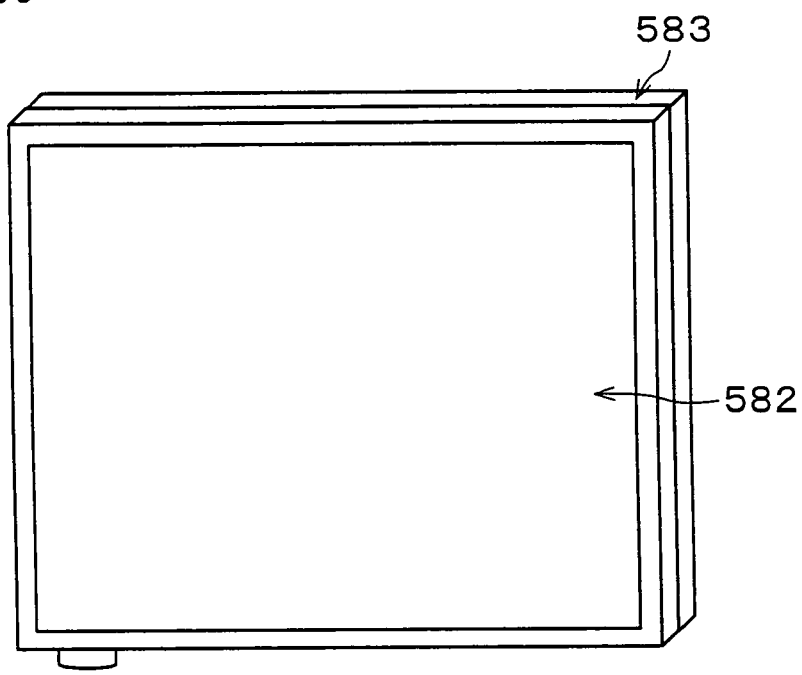
FIG. 59 is an oblique perspective view, showing that the cover of the television in FIG. 58(b) has been closed.
Figure 60:
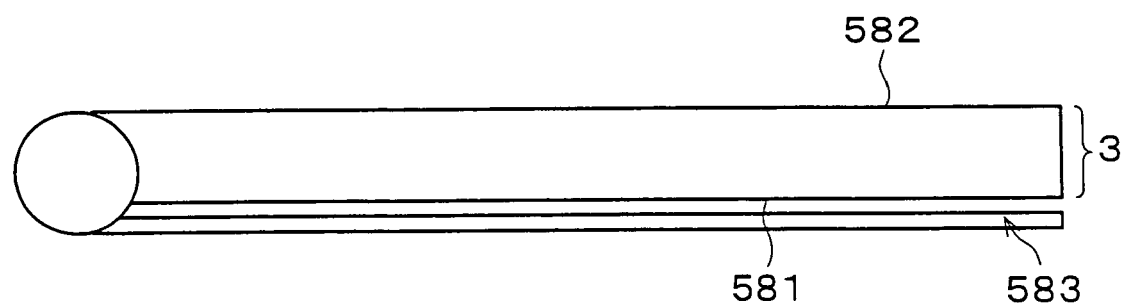
FIG. 60 is a profile of the television in FIG. 59.

When, as in FIG. 58(b), images on a back display 582 are viewed, the viewing is carried out from the side in the A direction in FIG. 7. In intense outside light, the front light is not turned on so that the image reproduction is carried out by causing the outside light to be reflected on the polarizing selective reflector 16. To avoid the whitish appearance of the dark-state image reproduction, a cover 583 is put on the front display 581 so that proper image reproduction without the whitish appearance is achieved even in intense outside light. The cover 583 is made of light-absorbing materials. FIG. 59 illustrates the television on which the cover 583 is put, and FIG. 60 is a profile of this television in FIG. 59. As illustrated in FIG. 60, the cover 583 can rotate about one end of the television.

There is another method of preventing the whitish appearance of the dark-state image reproduction on the back display 582. That is, in the liquid crystal display 3 which is a panel in FIG. 7, the retardation film 31 is disposed on the B-oriented surface of the second polarizing plate 15, so that the whitish appearance of the dark-state image reproduction due to the back-side reflection on, for instance, the operating face can be prevented.

The whitish appearance of the dark-state image reproduction also can be prevented even without putting the cover 583, by disposing a display (not illustrated), which can switch the phase difference between 0 and λ/2, between the second polarizing plate 15 and second glass substrate 12 of the liquid crystal display 3.

In weak outside light, the front light is turned on so that the image reproduction is carried out by causing the light from the front light to be reflected on the polarizing selective reflector 16. The switching between the light-state image reproduction and dark-state image reproduction is performed by controlling a voltage applied to the liquid crystal layer 13.

To view images on the back display 582 in a place with weak outside light such as a dark room or when a non-reflective object (except the panel) is provided in front of the front display 581, the image reproduction can be viewed without closing the cover 583. Thus, the opening and closing of the cover 583 may be carried out in accordance with the intensity of outside light.

In the television shown in FIGS. 58(a) and 58(b), the front display 581 and back display 582 are reversed when viewing the other display. Thus, images reproduced from the display data are laterally reversed by the drive circuits, when the display carrying out the image reproduction is switched to/from the back display 582 from/to the front display 581. With this, it is possible to always reproduce identically-oriented images even if the display carrying out the image reproduction is laterally switched to/from the back display 582 from/to the front display 581.

Alternatively, the tones of images reproduced from the display data are reversed by the drive circuits in order to reproduce desired images, when the display carrying out the image reproduction is switched to/from the back display 582 from/to the front display 581. With this, it is possible to always reproduce identically-toned images irrespective of the displays being used.

Furthermore, images reproduced from the display data are turned upside down by the drive circuits, when the display carrying out the image reproduction is switched to/from the back display 582 from/to the front display 581. With this, it is possible to always reproduce identically-oriented images even if the display carrying out the image reproduction is vertically switched to/from the back display 582 from/to the front display 581.

In the example concerning FIGS. 56(a) and 56(b), the reversal of the tones of images and the lateral reversal of images are carried out. For this reason, to obtain desired image reproduction, the television allows the user to reverse the images reproduced from the display data, using, for instance, a display switching button 584.

Figure 61:
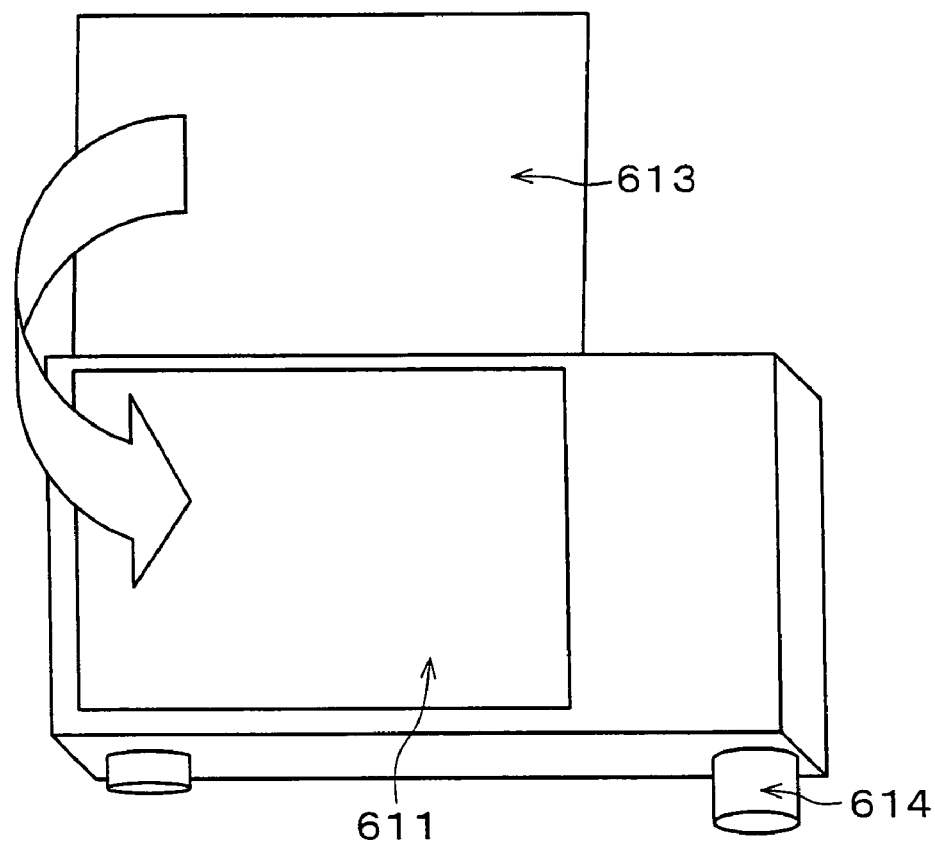
FIG. 61(a) is an oblique perspective view, showing a digital camera which is a device including the display of Second Embodiment of the present invention.
FIG. 61(b) is an oblique perspective view, showing the digital camera which is a device including the display of Second Embodiment of the present invention.
Figure 61:
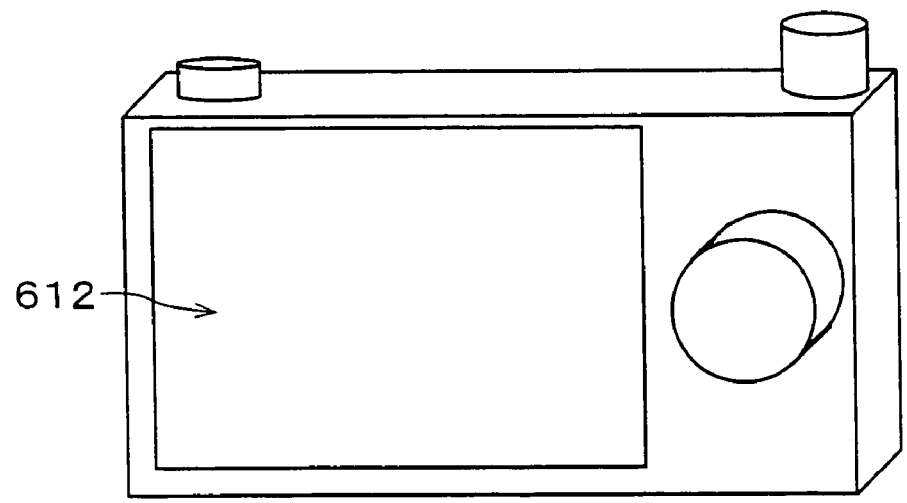

Next, an example when the device including the double-sided liquid crystal display 3 is a mobile image display (shooting/reproduction) device such as a digital camera and camcorder is discussed. FIG. 61 shows an example of adopting the double-sided liquid crystal display 3 to a digital camera.

As in FIG. 61(a), when images on a front display 611 are viewed, the viewing is carried out from the side in the B direction in FIG. 7. Provided that the viewing is carried out from the side in the B direction, in intense outside light, the front light is not turned on so that the image reproduction is carried out by causing the outside light to pass through, or the front light is turned on so that the image reproduction is carried out by causing the light from the front light to pass through. In weak outside light, the front light is turned on so that the image reproduction is carried out by causing the light from the front light to pass through. The switching between the light-state image reproduction and dark-state image reproduction is performed by controlling a voltage applied to the liquid crystal layer 13.

As in FIG. 61(b), when images on a back display 612 are viewed, the viewing is carried out from the side in the A direction in FIG. 7. In intense outside light, the image reproduction is carried out by causing the outside light to be reflected on the polarizing selective reflector 16 without tuning the front light on. To avoid the whitish appearance of the dark-state image reproduction in intense outside light, a cover 613 shown in FIG. 61(a) is put on the front display 611 so that proper image reproduction without the whitish appearance is achieved even in intense outside light. The cover 613 is made of light-absorbing materials.

A method of preventing the whitish appearance of the dark-state image reproduction when the digital camera is used with the cover 613 being put on is described with reference to the above-mentioned FIG. 60. Here, the front display 581, back display 582, and cover 583 in FIG. 60 are regarded as the front display 611, back display 612, and cover 613, respectively. The dark-state image reproduction on the occasion of using the digital camera with the cover 613 being put on as in FIG. 60 is achieved by letting the light pass through the polarizing selective reflector 16 and causing the light not to return.

As in FIG. 60, the light passing through the liquid crystal display 3 from the back display 613 side reaches the cover 613. Since the cover 613 either is a light absorber or has been subjected to light-absorption processing, the light is absorbed by the substrate on the cover side and hence not reflected. Thus, the light does not return to the side of the liquid crystal display 3. With this, it is possible to obtain suitable black display.

There is another method of preventing the whitish appearance of the dark-state image reproduction on the back display 612. That is, in the liquid crystal display 3 which is a panel in FIG. 7, the retardation film 31 is disposed on the B-oriented surface of the second polarizing plate 15, so that the whitish appearance of the dark-state image reproduction, due to the reflection on, for instance, the surface of the cover 613 having been put on, can be prevented.

The whitish appearance of the dark-state image reproduction also can be prevented even without putting the cover 613, by disposing a display (not illustrated), which can switch the phase difference between 0 and λ/2, between the second polarizing plate 15 and second glass substrate 12 of the liquid crystal display 3.

In weak outside light, the front light is turned on so that the image reproduction is carried out by causing the light from the front light to be reflected on the polarizing selective reflector 16. The switching between the light-state image reproduction and dark-state image reproduction is performed by controlling a voltage applied to the liquid crystal layer 13.

To view images on the back display 612 in a place with weak outside light such as a dark room or when a non-reflective object (except the panel) is provided in front of the front display 611, the image reproduction can be viewed without closing the cover 613. Thus, the opening and closing of the cover 613 may be carried out in accordance with the intensity of outside light.

In the digital camera shown in FIGS. 61(*a*) and 61(*b*), the front display 611 and back display 612 are reversed when viewing the other display. Thus, images reproduced from the display data are laterally reversed by the drive circuits, when the display carrying out the image reproduction is switched to/from the back display 612 from/to the front display 611. With this, it is possible to always reproduce identically-oriented images even if the display carrying out the image reproduction is laterally switched to/from the back display 612 from/to the front display 611.

Alternatively, the tones of images reproduced from the display data are reversed by the drive circuits in order to reproduce desired images, when the display carrying out the image reproduction is switched to/from the back display 612 from/to the front display 611. With this, it is possible to always reproduce identically-toned images irrespective of the displays being used.

Furthermore, images reproduced from the display data are turned upside down by the drive circuits, when the display carrying out the image reproduction is switched to/from the back display 612 from/to the front display 611. With this, it is possible to always reproduce identically-oriented images even if the display carrying out the image reproduction is vertically switched to/from the back display 612 from/to the front display 611.

In the example concerning FIGS. 61(*a*) and 61(*b*), the reversal of the tones of images and the lateral reversal of images are carried out. For this reason, to obtain desired image reproduction, the digital camera allows the user to reverse the images reproduced from the display data, using, for instance, a display switching button 614.

The present embodiment has described the examples of adopting the double-sided liquid crystal display 3 to a mobile phone, notebook PC, mobile terminal, television, and digital camera. However, not limited to them, the double-sided liquid crystal display 3 can be adopted to all kinds of devices which include a liquid crystal display.

For instance, the double-sided liquid crystal display 3 can be adopted as a screen of a car navigation system installed in a car, for improving the visibility by reversing the tones of displayed images as the sun rises or goes down. When the double-sided liquid crystal display 3 is adopted to a double-sided television, the television can be inserted into, for instance, a wall dividing two rooms such as a living room and bed room, and used as a television viewed from both rooms. When adopted to a game console, two players on the respective sides of the display can battle with each other, with one display between them. In particular, games like Othello® game and Go can be played irrespective of the reversal of the tones. Furthermore, the double-sided liquid crystal display 3 may be adopted to watches.

Third Embodiment

Figure 8:
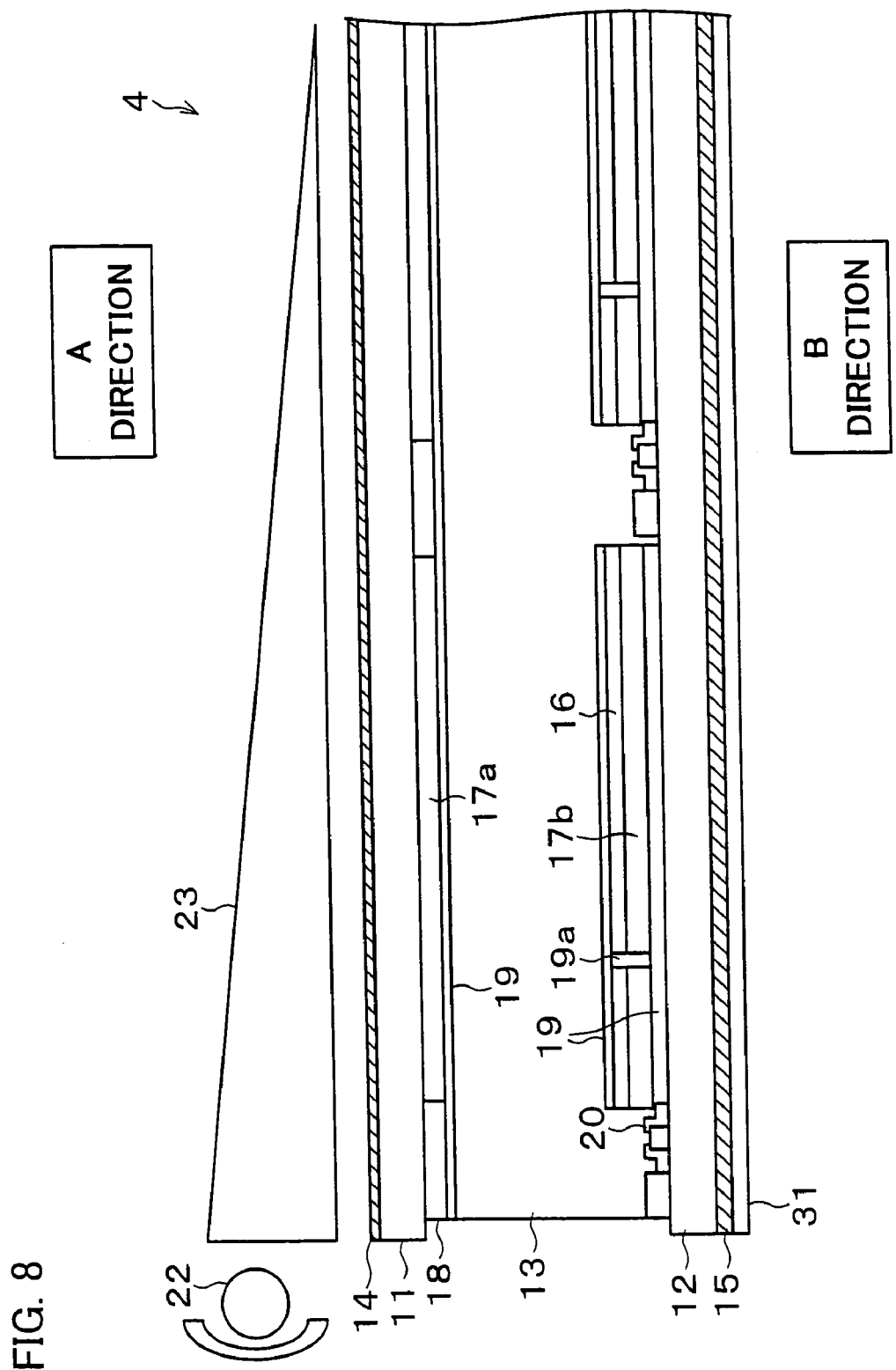
FIG. 8 is a cross section, illustrating a display of Third Embodiment of the present invention.

The following description will discuss a further embodiment of the present invention with reference to FIG. 8. By the way, members having the same functions as those described in First and Second Embodiments are given the same numbers, so that the descriptions are omitted for the sake of convenience.

A cross section of a liquid crystal display (display) 4 of the present embodiment is illustrated in FIG. 4. This liquid crystal display 4 is a double-sided display which can suitably reproduce colors both on the A-oriented screen and B-oriented screen thanks to color filters provided above and below.

The liquid crystal display 4 includes a color filter (second color filter) 17*b* between the second glass substrate 12 and polarizing selective reflector 16, in addition to a color filter (first color filter) 17*a* corresponding to the color filter 17 of the liquid crystal display 3 shown in FIG. 7.

The image reproduction on the A-oriented side of the liquid crystal display 4 is carried out in a reflection manner, utilizing the reflection on the polarizing selective reflector 16. The image reproduction on the B-oriented side of the liquid crystal display 4 is, on the other hand, carried out in a transmission manner, utilizing the first polarizing plate 14, polarizing selective reflector 16, and second polarizing plate 15. In the case of the light-state image reproduction on the A-oriented side in the reflection manner, the light incident from the side in the A direction passes through the first polarizing plate 14, color filter 17*a*, liquid crystal layer 13 in this order and then reaches the polarizing selective reflector 16. Subsequently, the light is reflected on the polarizing selective reflector 16, and exits in the A direction after again passing through the liquid crystal layer 13, color filter 17*a*, and first polarizing plate 14. Since the image reproduction is carried out in the reflection manner, the incident light passes through the color filter 17*a* twice. For this reason, the decrease of luminance and quality of image reproduction is induced because of the thickness of a color filter of a conventionally-adopted transmission liquid crystal display. To prevent this decrease of the quality of image reproduction, the thickness of the color filter 17*a* in FIG. 8 is not more than half as much as the thickness of the color filter of the conventional transmission liquid crystal display. With this, even if the light passes through the color filter 17*a* twice, the color reproducibility and luminance as good as those of the transmission type can be achieved.

Since the image reproduction on the B-oriented side is carried out in the transmission manner, the light incident from the side in the A direction passes through the first polarizing plate 14, color filter 17*a*, liquid crystal layer 13, polarizing selective reflector 16, color filter 17*b*, second polarizing plate 15, and retardation film 31 in this order, and then exits in the B direction. With this, the light-state image reproduction is realized. Since the color filter 17*a* is arranged so as to be thin for the image reproduction in the reflection manner, the range of color reproduction is narrow if the color image reproduction in the transmission manner is carried out sorely using this color filter 17*a*. However, the color filter 17*b* is further provided below the polarizing selective reflector 16, so that the color reproducibility as good as that of a transmission liquid crystal display is realized. The thickness of the color filter 17*b* is not more than half as much as the thickness of a color filter of a transmission liquid crystal display. Thus, the light passes through the color filter 17a on the side in the A direction once and the color filter 17b on the side in the B direction once, so that the color reproducibility as good as that of a transmission liquid crystal display can be realized.

In this manner, the liquid crystal display 4 can suitably set the luminance and color reproducibility in each of the A-oriented image reproduction carried out in the reflection manner and the B-oriented image reproduction carried out in the transmission manner, by separately setting the respective densities of the color filters 17a and 17b.

Fourth Embodiment

Figure 9:
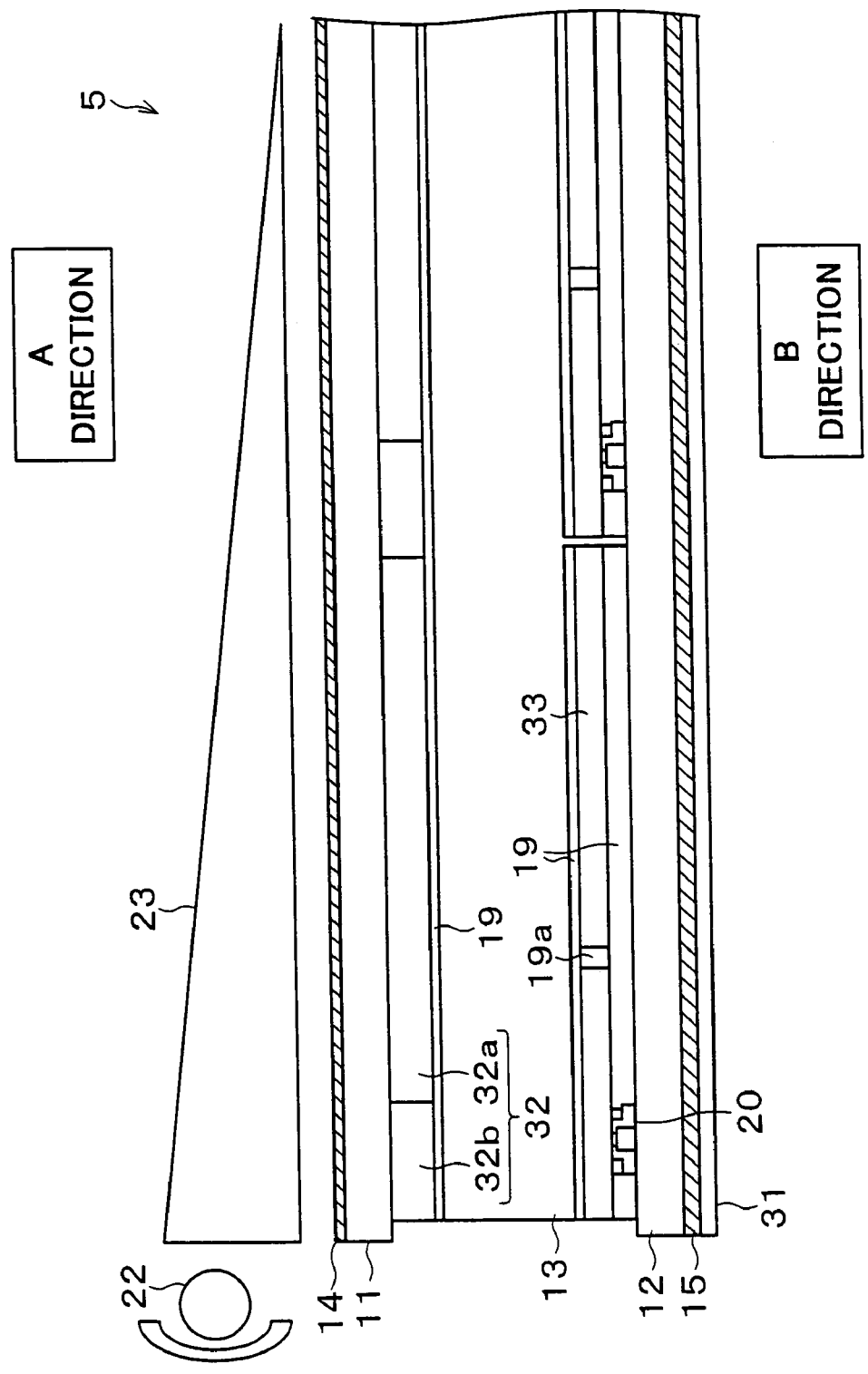
FIG. 9 is a cross section, illustrating a display of Fourth Embodiment of the present invention.

The following description will discuss yet another embodiment of the present invention with reference to FIGS. 9 and 10. By the way, members having the same functions as those described in First through Third Embodiments are given the same numbers, so that the descriptions are omitted for the sake of convenience.

FIG. 9 shows a cross section of a liquid crystal display (display) 5 of the present embodiment. This liquid crystal display 5 is a double-sided display which can realize good color reproducibility with a single color filter.

Compared to the liquid crystal display 3 in FIG. 7, the liquid crystal display 5 additionally includes a color filter 32 in which a first area (low-transmittance area) 32a disposed instead of the color filter 17 in FIG. 7 and a second area (high-transmittance area) 32b disposed instead of the shading film 18 in FIG. 7 are provided with respect to each pixel. FIG. 10 shows a plan view of the color filter 32. The liquid crystal display 3 has only one color filter, i.e. the color filter 32. Further, instead of the polarizing selective reflector 16 in the liquid crystal display 3, the liquid crystal display 5 has a polarizing selective reflector (selective reflecting means, polarizing selective reflecting means) 33 facing the whole surface of the color filter 32. This polarizing selective reflector 33 and the polarizing selective reflector 16 have identical optical properties. However, being structured as above, the polarizing selective reflector 33 is not only provided in the area shown in FIG. 7 but also on the switching element 20 and bus line.

As described in Third Embodiment, provided that only one color filter is provided on the side in the A direction, the light passes through the color filter twice in the case of the light-state image reproduction which is viewed from the side in the A direction and carried out in the reflection manner, while the light passes through the color filter only once in the case of the light-state image reproduction in the transmission manner, which is viewed from the side in the B direction. Thus, the quantity of the light in the case the viewing from the side in the A direction is fewer than the quantity of the light in the case the viewing from the side in the B direction.

On the switching element 20 and bus line, a metal electrode and metal wiring are provided. For this reason, the light cannot pass through the switching element 20 and bus line. Thus, in the present embodiment, this area not contributing to the image reproduction in the transmission manner is utilized as an area for reproducing images viewed from the side in the A direction. The second transmittance area 32b facing this non-transmitting area on the side in the A direction forms a color filter area for the image reproduction in the reflection manner, in which the thickness and density are reduced to improve the transmittance. On this account, the transmittance of this color filter area is higher than that of the first transmittance area 32a. Furthermore, the sizes of the first and second transmittance areas 32a and 32b are determined so as to cause the luminance and color reproducibility of the image reproduction in the transmission manner on the side in the A direction is equal to those of a reflective liquid crystal display. Thus, the transmittance of the color filter 32 is different in each of the areas thereof.

The first transmittance area 32a is a transmissive color filter area in which the thickness and density thereof are set so as to realize the luminance and color reproducibility on the occasion of the viewing from the side in the B direction to be equal to those of a transmissive liquid crystal display. The ratio between the sizes of the first and second transmission areas 32a and 32b is suitably set so that, when viewed from the side in the B direction, it is possible to realize the range of color reproduction and the luminance as good as those of a transmissive liquid crystal display.

In this way, the liquid crystal display 5 of the present embodiment makes it possible to suitably arrange the luminance and color reproducibility in the image reproduction in the reflection manner on the side of the A direction and also in the image reproduction in the transmission manner on the side in the B direction, in the following manner: In one color filter 32, the areas having different transmittances are suitably mixed in accordance with the difference between the quantity of light in the reflection type and the quantity of light in the transmission type. With the present embodiment, it is possible to provide a double-sided display which realizes the color reproducibility and luminance equal to those of a reflective liquid crystal display when viewed from the side in the A direction and the color reproducibility and luminance equal to those of a transmissive liquid crystal display when viewed from the side in the B direction.

Fifth Embodiment

Figure 11:
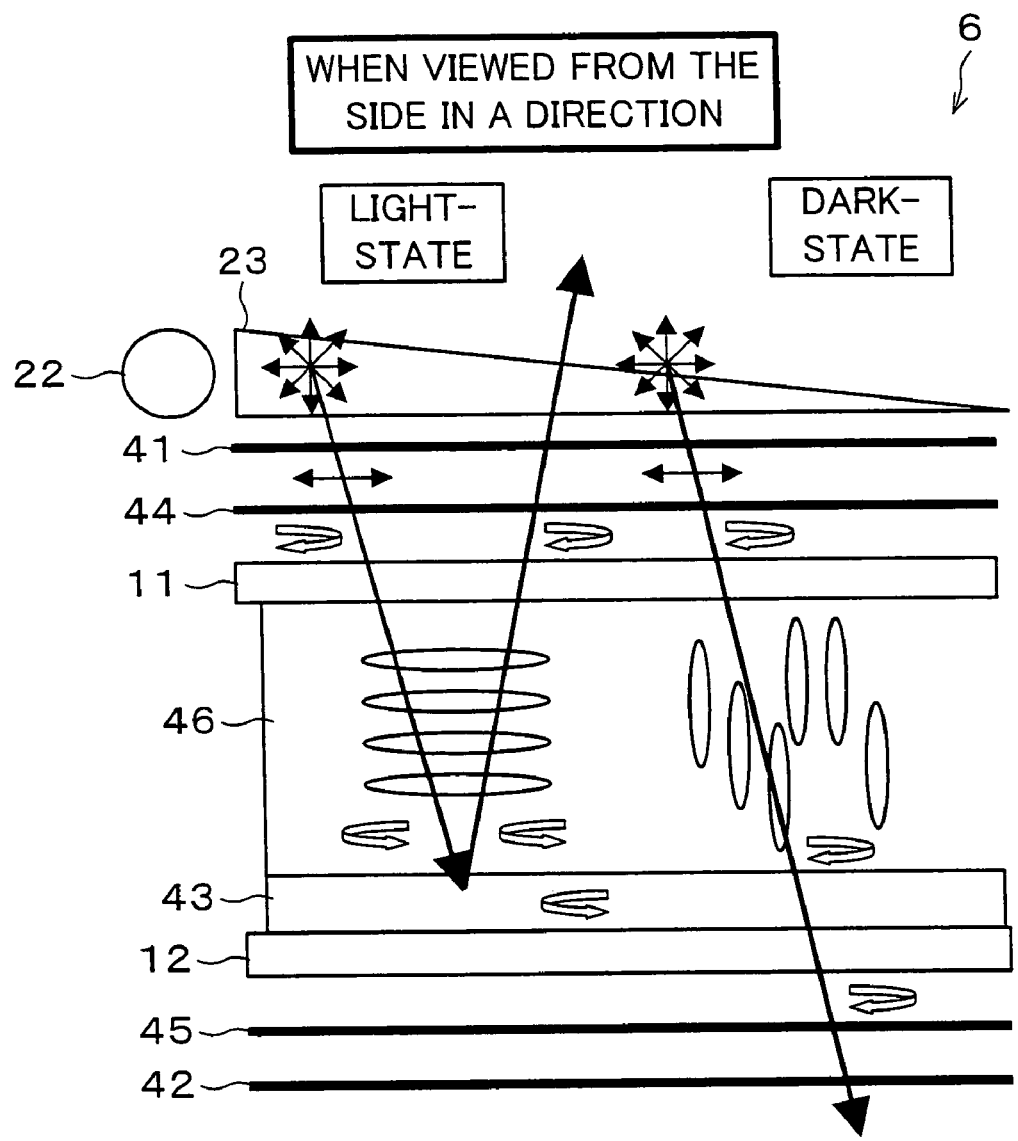
FIG. 11 is a cross section, illustrating a display of Fifth Embodiment of the present invention and a first operation of the same.
Figure 14:
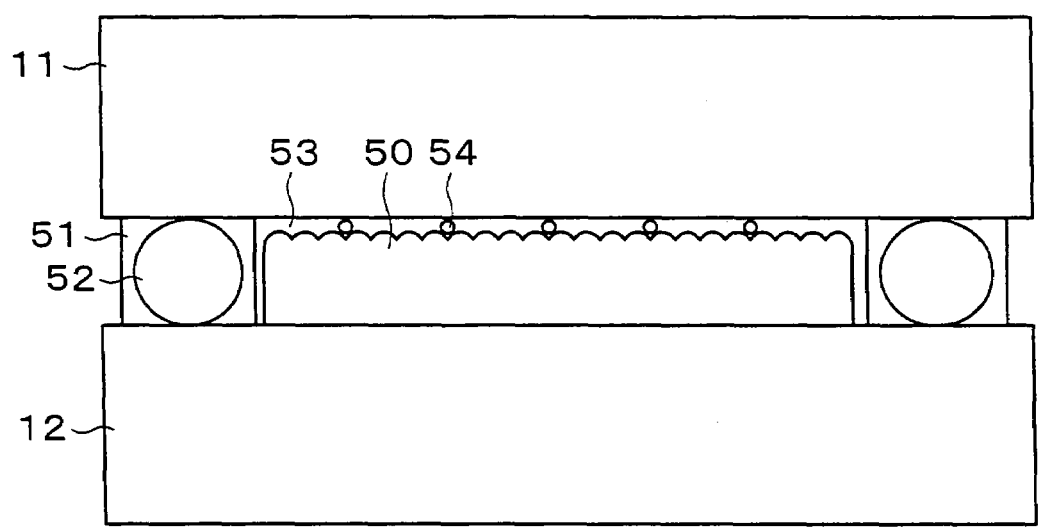
FIG. 14 is a cross section, illustrating the thickness of a polarizing selective reflector and an influence of the thickness.
Figure 15:
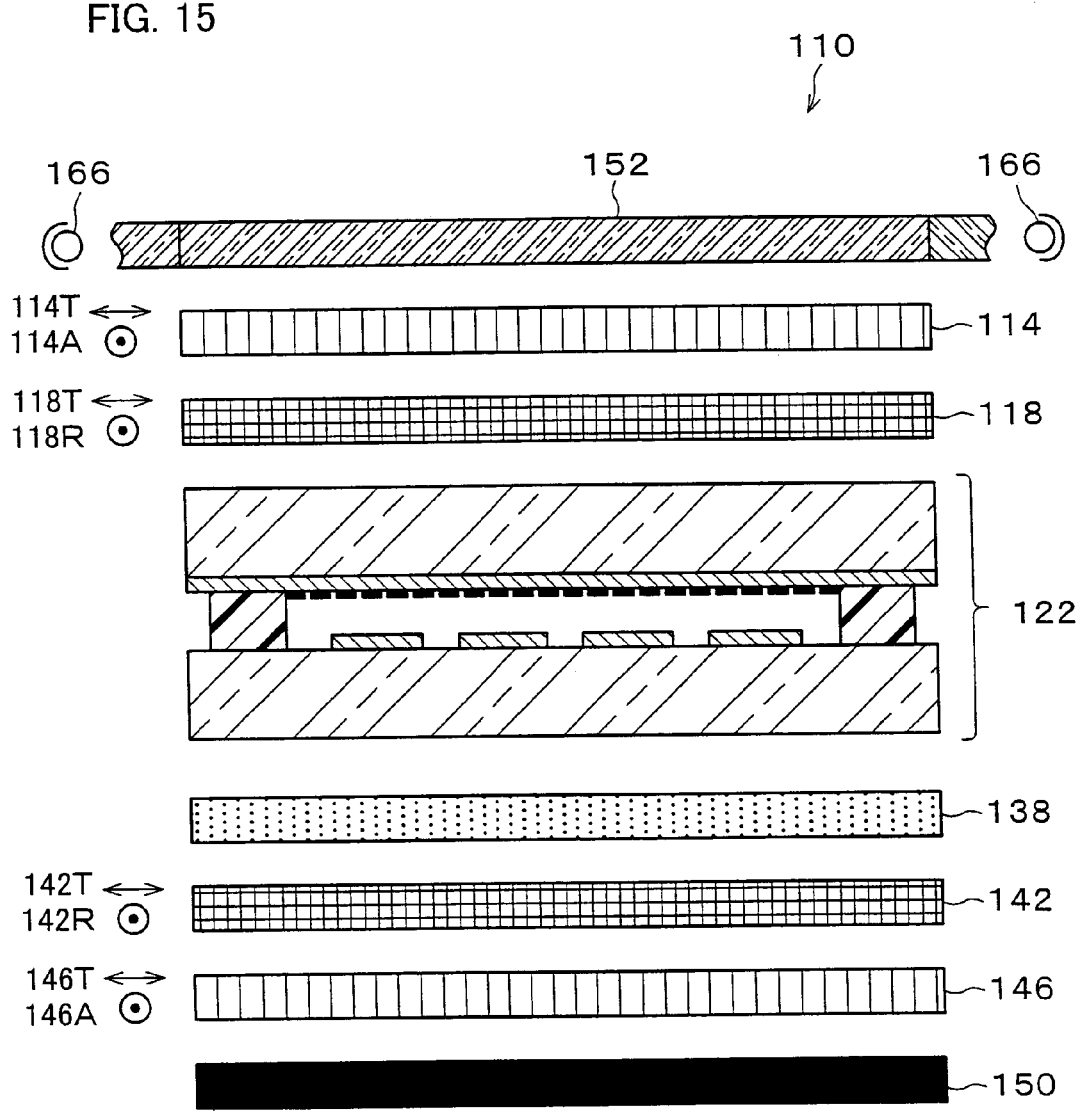
FIG. 15 is a cross section, illustrating a conventional display.

The following description will discuss still another embodiment of the present invention with reference to FIGS. 11 and 14. By the way, members having the same functions as those described in First through Fourth Embodiments are given the same numbers, so that the descriptions are omitted for the sake of convenience.

Although the polarizing selective reflectors 16 and 33 are polymer laminated films in First through Fourth Embodiments, other types of polarizing selective reflectors may be adopted. In the following, a case when cholesteric liquid crystal is used for the polarizing selective reflector will be discussed.

FIG. 11 shows a cross section of a liquid crystal display (display) 6 of the present embodiment.

The liquid crystal display 6, includes a first glass substrate 11, second glass-substrate 12, third polarizing plate 41, fourth polarizing plate 42, polarizing selective reflector 43, first λ/4 plate 44, second λ/4 plate 45, liquid crystal layer 46, light source 22, and light guiding plate 23. This liquid crystal display 6 is arranged so that the liquid crystal layer 46 is sandwiched between the first and second glass substrates 11 and 12 which are a pair of transparent substrates, and the direction from the liquid crystal layer 46 towards the first glass substrate 11 is termed "A direction" (first direction), whereas the direction from the liquid crystal layer 46 towards the second glass substrate 12 is termed "B direction" (second direction). Note that, although not illustrated, the color filter 17, shading film 18, transparent electrodes 9, switching element 20, and light absorbing layer 21 may be provided in the liquid crystal display 6 as the need arises.

A front light made up of the light source 22 and light guiding plate 23 is provided at the farthest in the A direction of the liquid crystal display 6. The liquid crystal layer (display medium) 46 is a parallel aligned nematic liquid crystal layer in which retardation Δnd is λ/2. The liquid crystal layer 46 carries out the following controls: controlling the state of circularly polarized light incident on and passing through the liquid crystal display 6; when no voltage is applied, changing left-circularly polarized light to right-circularly polarized light and right-circularly polarized light to left-circularly polarized light; and causing the direction of circularly polarized light not to change when a voltage is applied.

The third polarizing plate (polarizing means of a first transmission axis) 41 is provided on the A-oriented surface of the first glass substrate 11, has a transmission axis arranged in a predetermined direction, and only lets a light component which is the linearly polarized light in the direction parallel to the transmission axis pass through (the direction of the transmission axis will be specifically described later). This third polarizing plate 41 may be made of materials identical with those of the first polarizing plate 14 and second polarizing plate 15 in FIG. 1. Unpolarized light incident on the third polarizing plate 41 from the front light is changed to linearly polarized light in parallel to the transmission axis of the third polarizing plate 41, thereby passing through the third polarizing plate 41. The fourth polarizing plate (polarizing means of a second transmission axis) 42 is provided on the B-oriented surface of the second glass substrate 12, and has a transmission axis orthogonal to the third polarizing plate 41. This fourth polarizing plate 42 may be made of materials identical with those of the third polarizing plate 41.

The polarizing selective reflector (selective reflective means, polarizing selective reflecting means) 43 is a left-handed cholesteric liquid crystal reflector made up of a cholesteric liquid crystal film, and reflects the left-circularly polarized light being incident thereon. This polarizing selective reflector 43 lets, meanwhile, the right-circularly polarized light pass through. Here, the left-circularly polarized light is termed first-state circularly polarized light (first state, first state of polarization), and the right-circularly polarized light twisted in the direction opposite to the left-circularly polarized light is termed second-state circularly polarized light (second state, second state of polarization).

The first λ/4 plate 44 is disposed between the third polarizing plate 41 and first glass substrate 11, changes the linearly polarizing light coming from the third polarizing plate 41 to circularly polarized light, and also changes the circularly polarized light coming from the liquid crystal layer 46 to the linearly polarized light. The second λ/4 plate 45 is disposed between the second glass substrate 12 and fourth polarizing plate 42, changes the circularly polarizing light coming from the second glass substrate 12 to linearly polarized light, and also changes the linearly polarized light coming from the fourth polarizing plate 42 to the circularly polarized light.

Figure 12:
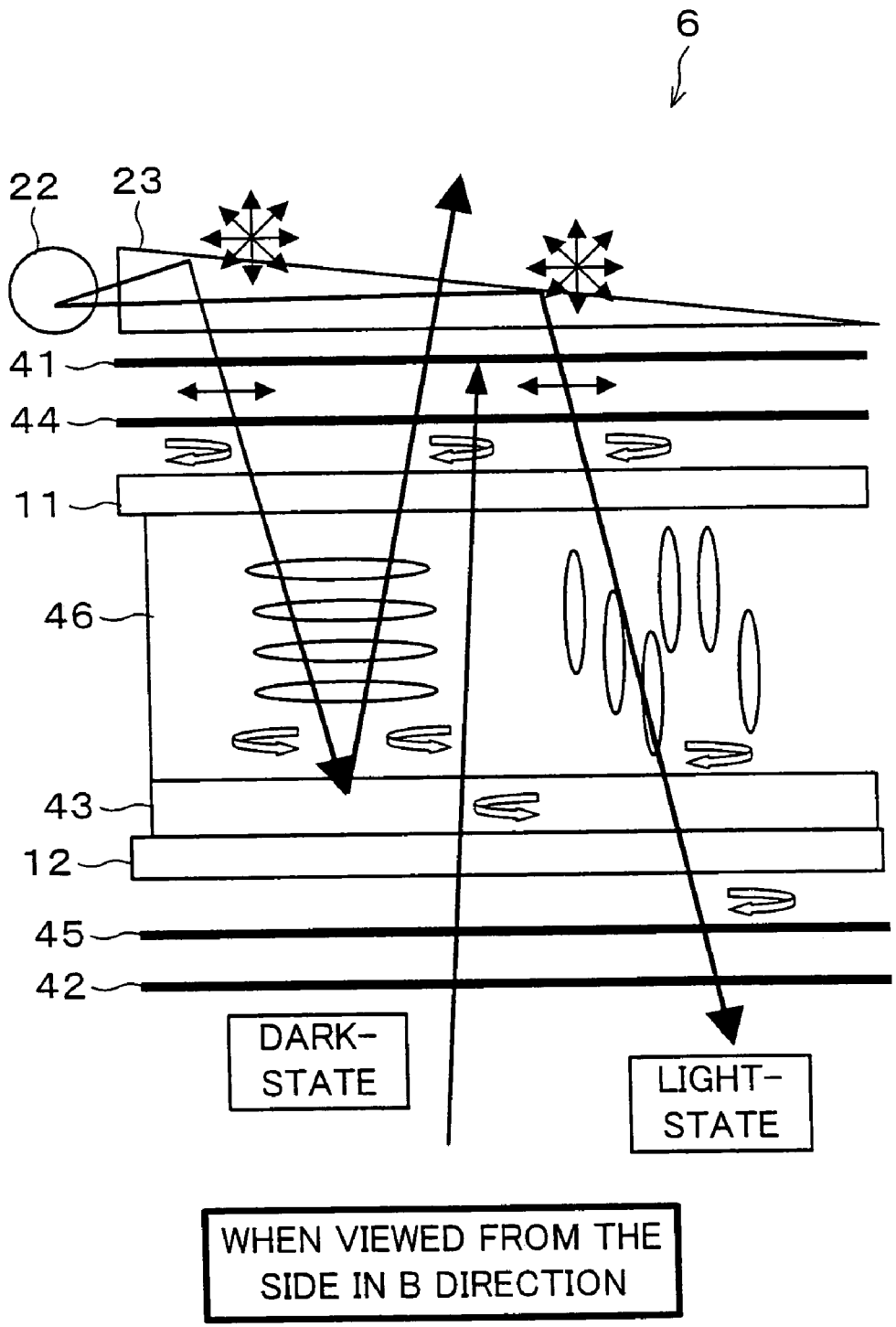
FIG. 12 is a drawing, illustrating a second operation of the display of Fifth Embodiment.

Now, referring to FIGS. 11 and 12, the viewing from the side in the A direction and the viewing from the side in the B direction are discussed below.

Figure 13:
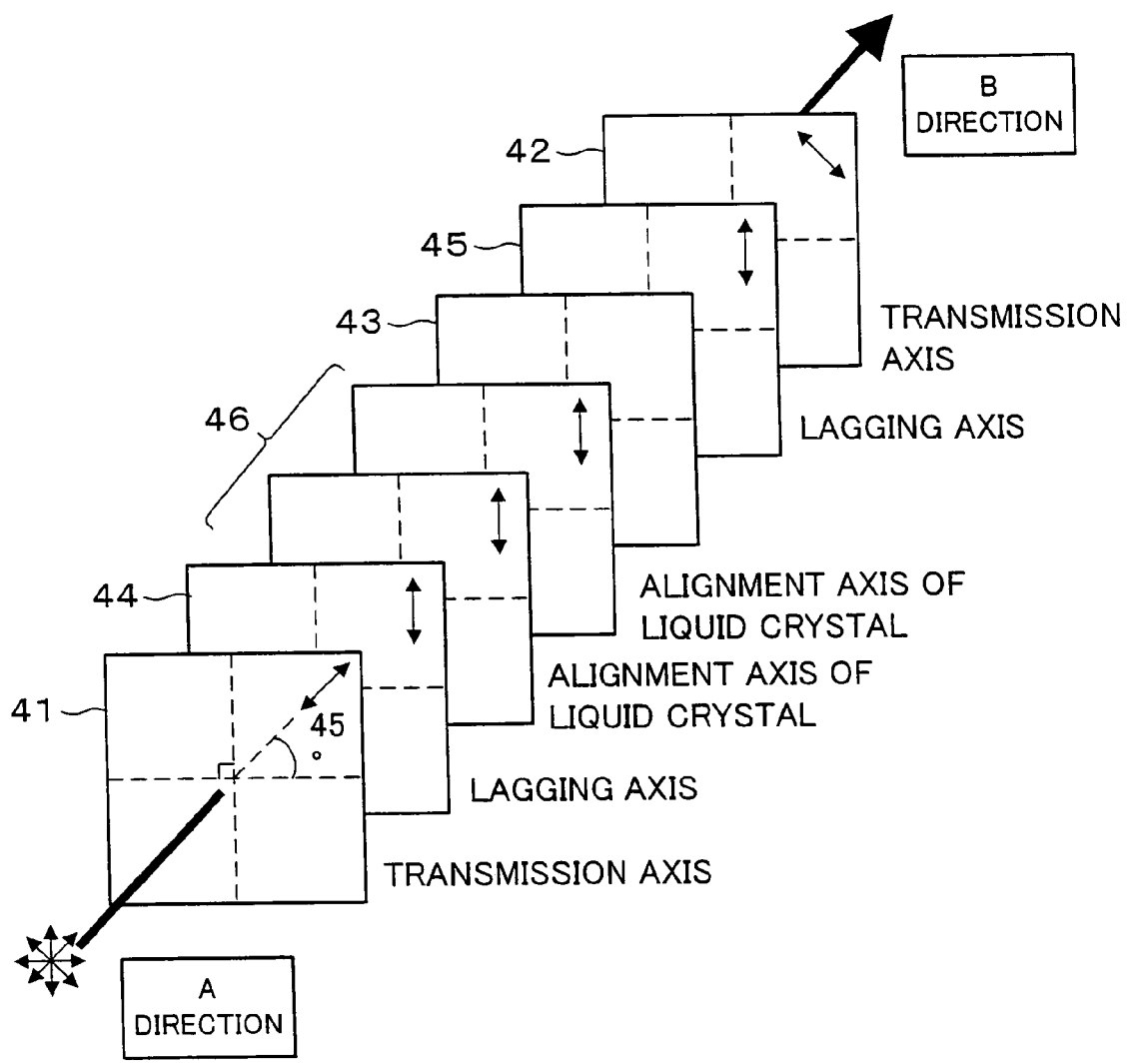
FIG. 13 shows how axes of the displays in FIGS. 11 and 12 are arranged.

First, the viewing from the side in the A direction is discussed with reference to FIG. 11. The unpolarized light, which is either the outside light or the light from the front light, is changed to the linearly polarized light as passing through the third polarizing plate 41. The transmission axis of the third polarizing plate 41 is, as in FIG. 13, set at +45° (12 o'clock position is 0° and "+" indicates clockwise rotation from the 12 o'clock position), so that the light having passed through becomes +45° linearly polarized light. As in FIG. 13, this linearly polarized light is changed to the right-circularly polarized light as passing through the first λ/4 plate 44 having the lagging axis of 0°. Subsequently, the right-circularly polarized light passes through the liquid crystal layer 46 which has an alignment axis of 0° and includes a parallel aligned nematic liquid crystal layer in which Δnd is λ/2, so that, when a voltage is not applied, the right-circularly polarized light is changed to the left-circularly polarized light. The polarizing selective reflector 43 reflects the left-circularly polarized light being incident thereon. The left-circularly polarized light reflected on the polarizing selective reflector 43 is changed to the right-circularly polarized light, as passing through the liquid crystal layer 46 again. This right-circularly polarized light is then changed to the linearly polarized light as passing through the first λ/4 plate 44 again. The linearly polarized light then passes through the third polarizing plate 41, and consequently the light-state image reproduction is realized.

When a voltage is applied to the liquid crystal layer 46, liquid crystal molecules are caused to be vertical with respect to the first glass substrate 11 and second glass substrate 12, and thus Δnd=0. The unpolarized light which is either the outside light or the light from the front light is changed to +45° linearly polarized light as passing through the third polarizing plate 41. This linearly polarized light is changed to the right-circularly polarized light as passing through the first λ/4 plate 44 having the lagging axis of 0°, and this right-circularly polarized light passes through the liquid crystal layer 46 without any changes. The right-circularly polarized light is then changed to +135° linearly polarized light as passing through the second λ/4 plate 45, and this +135° linearly polarized light passes through the fourth polarizing plate 42 having the transmission axis of +135° as in FIG. 13. With this, the light does not return to the side in the A direction, and hence the dark-state image reproduction is realized.

Next, the viewing from the side in the B direction is discussed with reference to FIG. 12. The unpolarized light which is either the outside light or the light from the front light is changed to +45° linearly polarized light as passing through the third polarizing plate 41. This linearly polarized light is changed to the right-circularly polarized light as passing through the first λ/4 plate 44. Subsequently, the right-circularly polarized light passes through the liquid crystal layer 46, so that, when a voltage is not applied, the right-circularly polarized light is changed to the left-circularly polarized light. The polarizing selective reflector 43 reflects the left-circularly polarized light, and the left-circularly polarized light having been reflected is changed to the right-circularly polarized light as passing through the liquid crystal layer 46 again. The right-circularly polarized light is changed to the linearly polarized light as passing through the first λ/4 plate 44 again. The linearly polarized light then passes through the third polarizing plate 41, so that the light does not reach the side in the B direction and the dark-state image reproduction is realized.

If there is light incident from the side in the B direction, this light is changed to +45° linearly polarized light by the fourth polarizing plate 42, and then the linearly polarized light is changed to the light-circularly polarized light by the second λ/2 plate 45. Since this light then passes through the polarizing selective reflector 43, the light is changed to the left-circularly polarized light by the liquid crystal layer 46, and then the left-circularly polarized light is changed to +45° linearly polarized light as passing through the first λ/4 plate 44. Thus, the light is absorbed by the third polarizing plate 41. Note that, +135° linearly polarized light may be generated and caused to pass away in the A direction, in some cases.

Being different from the conventional art, the polarizing selective reflector 43 is disposed only in the B direction of the liquid crystal layer 46. Thus, no light is reflected to the liquid crystal layer 46 from the side in the A direction. Furthermore, the light incident from the side in the B direction and reflected on, for instance, metal wiring for driving the liquid crystal layer 46 enters the second λ/4 plate 45 again so as to become +45° linearly polarized light. Thus, this light is absorbed by the fourth polarizing plate 42.

With this, in the case of the dark-state image reproduction viewed from the side in the B direction and using the light incident from the side in the A direction, the light incident from the side in the B direction is caused not to return. Thus, the black display can be successfully carried out in a dark place as well as a well-lighted place. As a result, the double-sided liquid crystal display 6 can suitably carry out the black display in a dark place as well as a well-lighted place.

When a voltage is applied to the liquid crystal layer 46, the liquid crystal molecules are caused to be vertical with respect to the first glass substrate 11 and second glass substrate 12, and hence Δnd=0. The unpolarized light which is either the outside light or the light from the front light is changed to +45° linearly polarized light as passing through the third polarizing plate 41. Then this linearly polarized light is changed to the right-circularly polarized light as passing through the first λ/4 plate 44. The right-circularly polarized light then passes through the liquid crystal layer 46 without any changes. The polarizing selective reflector 43 also lets the right-circularly polarized light pass through without any changes. Then the right-circularly polarized light is changed to +135° linearly polarized light as passing through the second λ/4 plate 45, and this +135° linearly polarized light passes through the fourth polarizing plate 42. With this, the light is caused not to return to the side in the A direction, and hence the light-state image reproduction is realized.

Next, the following will be discussed with reference to FIG. 14: Adopting the polarizing selective reflector 43 using the above-mentioned cholesteric liquid crystal makes it possible to reduce the thickness of a polymer laminated polarizing selective reflector to be not more than 1/10, thereby realizing easy control of the cell thickness.

As in FIG. 14, when a polarizing selective reflector (selective reflecting means, polarizing selective reflecting means) 50 is made by laminating polymers, the reflector 50 is thick, more specifically, 150 μm-200 μm thick. To control the thickness of the panel layer, a sealing material 51 which is thermosetting resin is applied to the surrounding of the panel, and in this sealing material 51, a spacer 51 is provided in order to cause the panel to have a desired thickness. In the present embodiment, the spacer 51 in the sealing material 51 is glass fiber. After applying the sealing material 51, the upper and lower glass substrates are adhered to each other in such a way as to align the patterns on the glass substrates with each other. Then the glass substrates are pressed and heated, so that the sealing material 51 is cured by heat. On this occasion, if the polarizing selective reflector 50 is surrounded by the sealing materials 51, the sealing material 51 is arranged to be very thick, more specifically, 150 μm-200 μm. Thus, the sealing material 51 extends in the lateral direction when pressed, so that the sealing material 51 extends beyond a desired area and intrudes other areas such as a display area. Also, when, with respect to the polarizing selective reflector 50, the liquid crystal layer (display medium) 53 is very thin, more specifically, about several μm thick, while the sealing material 51 is thick, more specifically, 150 μm-200 μm thick, it is difficult to manufacture the liquid crystal layer 53 having a desired thickness due to the process variation, even if a spacer 54 in cell is provided.

As illustrated in FIG. 14, since that surface of the polarizing selective reflector 50 which faces the liquid crystal layer 53 is not flat, it is extremely difficult to suitably arrange the thickness of the liquid crystal layer when the layer is several μm thick.

Thus, the thickness of the polarizing selective reflector 50 is reduced by adopting cholesteric liquid crystal. This makes it possible to easily control the thickness of the liquid crystal layer 46.

Up to this point First through Fifth Embodiments have been discussed. The liquid crystal display of the present invention realizes suitable viewing from both sides (front side and back side) in all sorts of circumstances, by adopting the polarizing selective reflector and the lighting with the front light. For this reason, the present invention makes it possible to provide a liquid crystal display with various advantages, namely the reduction of thickness, weight, and cost and the increase of a display area of a display for simple information.

Sixth Embodiment

Figure 16:
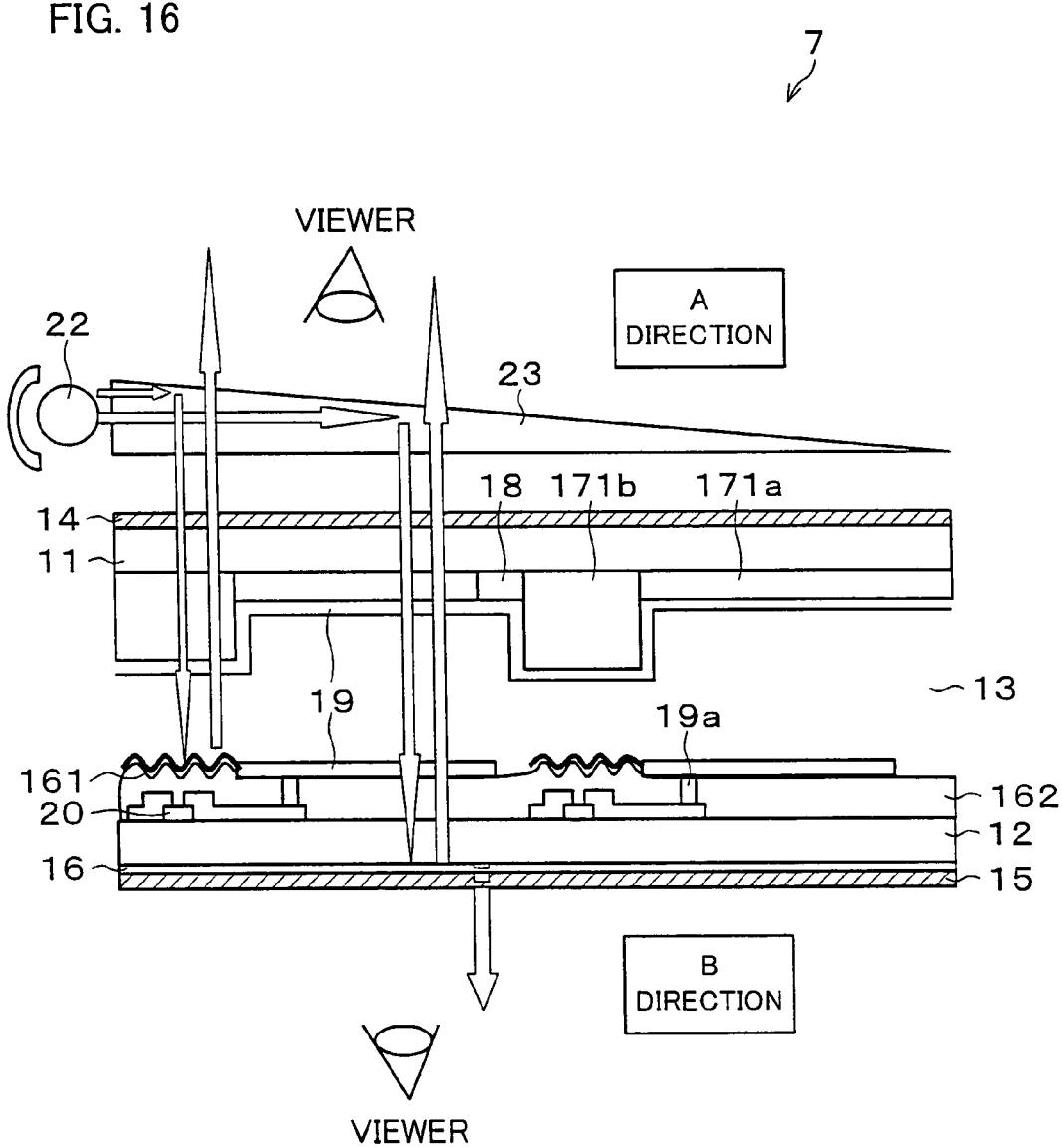
FIG. 16 is a cross section, illustrating a display of Sixth Embodiment of the present invention.
Figure 17:
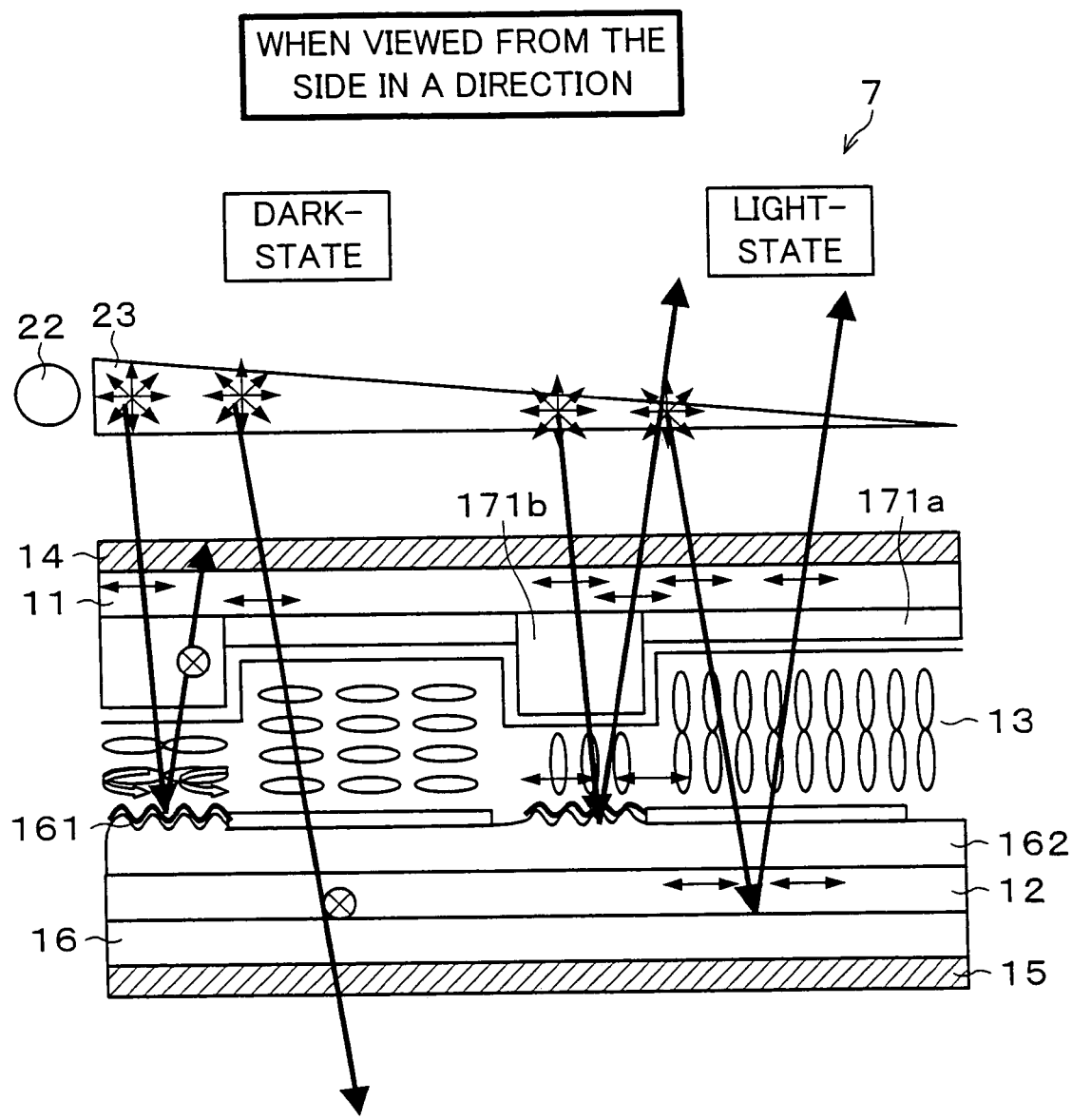
FIG. 17 is a drawing, illustrating a first operation of the display in FIG. 16.
Figure 18:
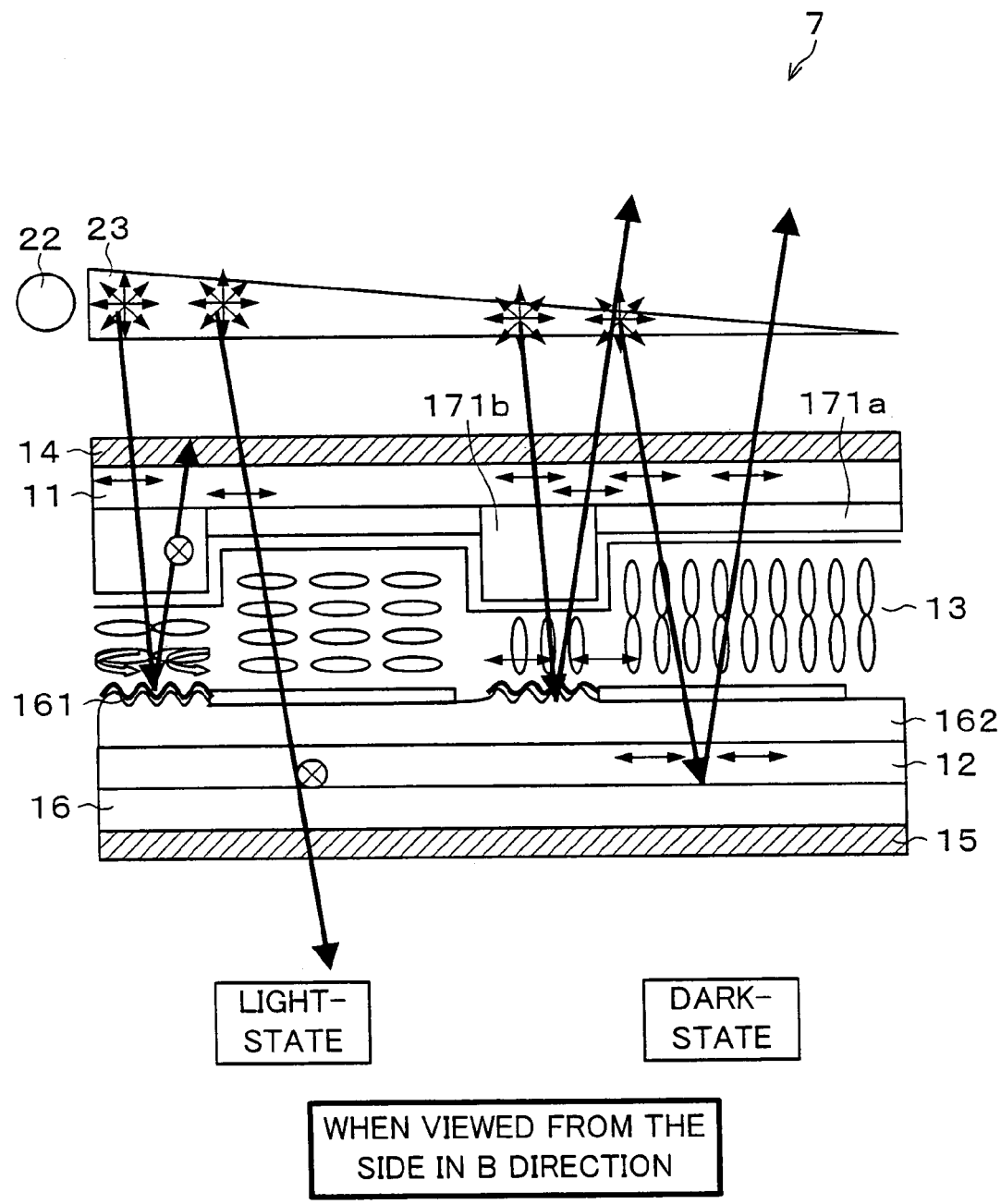
FIG. 18 is a drawing, illustrating a second operation of the display in FIG. 16.

The following description will discuss still another embodiment of the present invention with reference to FIGS. 16 through 18. By the way, members having the same functions as those described in First through Fifth Embodiments are given the same numbers, so that the descriptions are omitted for the sake of convenience.

FIG. 16 shows a cross section of a liquid crystal display (display) 7 of the present embodiment.

The liquid crystal display 7 includes a first glass substrate 11, second glass substrate 12, liquid crystal layer 13, first polarizing plate 14, second polarizing plate 15, polarizing selective reflector 16, color filters 171a and 171b, shading film 18, transparent electrodes 19, switching element 20, light source 22, light guiding plate 23, reflector 161, and insulating resin layer 162. This liquid crystal display 7 is arranged so that the liquid crystal layer 13 is sandwiched between the first and second glass substrates 11 and 12 which are a pair of transparent substrates, and the direction from the liquid crystal layer 13 towards the first glass substrate 11 is termed "A direction" (first direction), whereas the direction from the liquid crystal layer 13 towards the second glass substrate 12 is termed "B direction" (second direction).

The switching element 20 is disposed on the A-oriented surface of the second glass substrate 12, and is an active element such as a TFT for carrying out switching in order to driver pixels.

The reflector (reflecting means) 161 reflects incident light irrespective of the polarization state of the light. In the example shown in FIG. 16, the reflector 161 is provided between (i) the switching element 20 and bus line and (ii) the liquid crystal layer 13, and reflects the light, which passes through the liquid crystal layer 13 in the B direction, to the A direction. An area between the liquid crystal layer 13 and second glass substrate 12, where the switching element 20 and bus line are provided, is a non-transmissive area which does not allow light to pass through. The insulating resin layer 162 is provided on the entire surface of the second glass substrate 12, where the switching element 20 and bus line are provided. The reflector 161 is provided on this insulating resin layer 162 so as to at least partly face the non-transmissive area. To improve the performance of the reflector 161 so as to improve the visibility, the insulating resin layer 162 is caused to have microscopic irregularities thereon. The reflector 161 is deposited on this insulating resin layer 162, and thus the reflector 161 is also caused to have microscopic irregularities corresponding to the irregularities on the insulating resin layer 162.

The reflector 161 is made of, for instance, aluminum, aluminum alloy including titan, silver, silver alloy including palladium, and copper. When, for instance, the reflector 161 is made of aluminum (Al), it is preferable to adopt an Al/Mo structure with which Al is provided on molybdenum (Mo) film, in order to avoid, in the step of developing Al, electric corrosion at the position where AL is directly in contact with ITO. In this structure, Mo (1000 Å) and Al (1000 Å) are alternately deposited for more than once and the Mo and AL are etched by a single etchant. With this, the patterning of the reflector 161 can be carried out.

In the present embodiment, the reflector 161 is adopted as reflecting means. Not limited to this, however, a tabular reflector may be adopted. Furthermore, a member on which a light scatter is disposed in order to impart reflection characteristics identical with those of the reflector 161 thereto may also be adopted.

The light source 22 and light guiding plate 23 constitutes a front light. This front light is provided at the farthest in the A direction of the liquid crystal display 7, and the light emitted from the light source 22 is bended in the B direction by the light guiding plate 23. The liquid crystal layer (display medium) 13 is made of, for instance, ECB (Electricalcontrolledbirefringence) liquid crystal, and controls the phase difference between predetermined orthogonal axes of polarized light on a plane in parallel to the first and second glass substrates, with respect to particular light incident on and passing through the liquid crystal layer 13 itself. In the present case, the control is carried out in the following manner: To the liquid crystal layer, no voltage is applied or a sufficiently low voltage is applied, the phase difference at the timing of the incidence of light from the first polarizing plate 14 is 0, and the phase difference of the light traveling from the first polarizing plate 14 to the reflector 161 is substantially $\pi/2$ when the light has just passed through the liquid crystal layer 13. Further, the phase difference of the light traveling from the reflector 161 to the first polarizing plate 14 is substantially $\pi$ when the light has just passed through the liquid crystal layer 13, and the phase difference of the light traveling from the first polarizing plate 14 to the polarizing selective reflector 16 is substantially $\pi$ when the light has just passed through the liquid crystal layer 13. When a sufficiently high voltage is applied to the liquid crystal layer 13, the control is carried out so that the phase difference of the passing light is not changed, i.e. the state of polarization is not changed. Note that, the word "substantially" is added to the description concerning the phase differences because the rise and/or fall of some molecules in the liquid crystal layer 13 may not follow the application/ cutoff of the voltage.

To carry out the control of the polarization state, the thickness of the liquid crystal layer 13 (hereinafter, area with reflector) between the first polarizing plate 14 and reflector 161 is substantially half as much as the thickness of the liquid crystal layer 13 (hereinafter, area without reflector) between the first polarizing plate 14 and the polarizing selective reflector 16 not facing the reflector 161, in the A/B direction. Note that, hereinafter, the thickness of the display medium (liquid crystal layer) will be referred to as cell thickness. The thickness of the area with reflector is substantially half as much as the thickness of the area without reflector, because, since the reflector 161 in the area with reflector has microscopic irregularities thereon, the variation of the cell thickness due to the irregularities has to be taken into consideration.

The first polarizing plate (first polarizing means) 14 is disposed on the A-oriented surface of the first glass substrate 11, has a transmission axis provided in a predetermined direction, and allows only light component which is linearly polarized light in the direction identical with the transmission axis to pass through. The unpolarized light from the front light is incident on the first polarizing plate 14, and then changed to linearly polarized light which is in parallel to the transmission axis of the first polarizing plate 14 so as to pass through. This first polarizing plate 14 is manufactured in such a manner that a polymer resin film to which absorber such as iodine and dichroic dye is mixed is stretched so that the absorber is aligned. Aside from this, any kinds of materials may be used for manufacturing the first polarizing plate 14, as long as the unpolarized light is changed to the linearly polarized light. The second polarizing plate (second polarizing plate) 15 is disposed on the B-oriented surface of the second glass substrate 12, and has a transmission axis orthogonal to the first polarizing plate 14.

The polarizing selective reflector (selective reflecting means, polarizing selective reflecting means) 16 is, in the present embodiment, disposed between the B-oriented surface of the second glass substrate 12 and the second polarizing plate 15. This polarizing selective reflector 16 is arranged in such a manner that, when the polarizing direction of the linearly polarized light incident on the polarizing selective reflector 16 is in parallel to the reflection axis, the polarizing selective reflector 16 reflects the linearly polarized light as light in the first polarization state (first state, the linearly polarized light in (1) direction), and when the polarizing direction of the linearly polarized light incident on the polarizing selective reflector 16 is in parallel to the transmission axis, the polarizing selective reflector 16 allows the linearly polarized light to pass through as light in the second polarization state (second state, the linearly polarized light in (2) direction). The reflection axis and transmission axis of the polarizing selective reflector 16 are orthogonal to each other. Furthermore, the reflection axis of the polarizing selective reflector 16 is in parallel to the transmission axis of the first polarizing plate 14, and the transmission axis of the polarizing selective reflector 16 is orthogonal to the transmission axis of the first polarizing plate 14. In the present embodiment, a known polarizing selective reflector manufactured by depositing polymer membranes is adopted. Note that, as long as linear polarized light running in one direction can pass through and linear polarized light running in another direction is reflected, any kinds of polarizing selective filters can be adopted.

The color filters 171*a* corresponding to R, G, and B colors are color filters for the area without reflector, and provided on the B-oriented surface of the first glass substrate 11. In the meantime, the color filter 171*b*, which is a transparent color filter and for the area with reflector, is provided on an area facing the color filters 171*b*. Thus, the reflector 161 is provide on an area facing the color filter 171*b*. Moreover, the color filter 171*b* is arranged so as to be thicker than the color filters 171*a*. With this, the cell thickness of the area with reflector is arranged so as to be substantially half as much as the cell thickness of the area without reflector. Note that, although the cell thickness is determined here by arranging the thickness of the color filter 171*b*, it is possible to determine the cell thickness by providing unevenness on the insulating resin layer 162. The shading film 18 is provided in an area which is adjacent to the color filters 171*a* and 171*b* and does not include a part of wiring and pixel electrode thereon. The shading film 18 obstructs the light to pass in the B direction.

The transparent electrodes 19 are provided on the B-oriented surfaces of the color filters 171*a* and 171*b* and the shading film 18 on the first glass substrate 11, and the A-oriented surface of the insulating resin layer 162 on the second glass substrate 12. In the present case, these transparent electrodes 19 are made of ITO (alloy of indium oxide and tin oxide). However, the transparent electrodes 19 may be made of other transparent conductive metal films. Furthermore, although the present embodiment adopts metal transparent electrode materials, transparent materials such as resin and semiconductor may be adopted instead of metal materials. If necessary, a contact section 19*a* for the connection with members such as the switching element 20 may be additionally provided.

The liquid crystal display 7 in FIG. 16 is a double-sided display which can be viewed in all sorts of environments and viewed from both the side in the A direction and the side in the B direction. When viewed from the side in the A direction in FIG. 16, in a well-lighted place with intense outside light, the front light is not turned on so that the image reproduction is carried out using the outside light reflected on the polarizing selective reflector 16 and reflector 161. In a dark place with weak outside light, meanwhile, the front light is turned on so that the image reproduction is carried out by causing the light from the front light to be reflected on the polarizing selective reflector 16 and reflector 161. On the other hand, when viewed from the side in the B direction in FIG. 16, in a well-lighted place, the front light is not turned on so that the image reproduction can be carried out by utilizing the outside light passing through the polarizing selective reflector 16. In a dark place, meanwhile, the front light is turned on so that the image reproduction is carried out by allowing the light from the front light to pass through the polarizing selective reflector 16.

Now, referring to FIGS. 17 and 18, a method of carrying out image reproduction when the liquid crystal layer 13 is a parallel aligned liquid crystal layer will be discussed.

First, a case of viewing from the side in the A direction is described with reference to FIG. 17. When no voltage is applied or a sufficiently low voltage is applied to the liquid crystal layer 13, unpolarized light which is either the outside light or the light from the front light is changed to linearly polarized light as passing through the first polarizing plate 14. The first polarizing plate 14 in FIG. 17 allows linearly polarized light in the lateral direction, which is in parallel to the figure, to pass through. In the area with reflector, the linearly polarized light is caused to have a substantially $\pi/2$ phase difference as passing through the liquid crystal layer 13, and this linearly polarized light is changed to circularly polarized light on the reflector 161. The light reflected on the reflector 161 is further changed to reverse-circularly polarized light which is reversely rotated with respect to the traveling direction of the light, and then retarded as passing through the liquid crystal layer 13 again. As a result, the light arriving at the first polarizing plate 14 is linearly polarized light orthogonal to the linearly polarized light having been incident on the first polarizing plate 14 from the outside or front light, and thus absorbed by the first polarizing plate 14. As a consequence of these, the image reproduction is realized. In the meantime, the light having passed through the area without reflector is caused to have a substantially $\pi$ phase difference by the liquid crystal layer 13, and becomes linearly polarized light orthogonal to the polarized light on the occasion of the incidence, when arriving at the polarizing selective reflector 16. For this reason, the light passes through the polarizing selective reflector 16 and second polarizing plate 15 and then passes away from the back (on the side in the B direction) of the panel. Thus, when viewed from the side in the A direction, the dark-state image reproduction is realized.

As described above, the cell thickness of the liquid crystal layer 13 is caused to be different in the area with reflector and in the area without reflector, so that the light beams passing through the respective areas are caused to have different phase differences. With this, black and white display is realized simultaneously in the area with reflector and the area without reflector, and bright reflective image reproduction is successfully realized using the reflections from both of these areas. Furthermore, the color filter 171*b* in the area with reflector is transparent so that the luminance of the reflected light is further increased.

When a voltage is applied to the liquid crystal layer 13, liquid crystal molecules rise up so that the light incident thereon is not polarized by the layer 13. Thus, the linearly polarized light having passed through the first polarizing plate 14 is reflected in both the area with reflector and the area without reflector, with its polarization state being unchanged, and then passes through the first polarizing plate 14. On this account, the light-state image reproduction is realized when viewed from the side in the A direction.

Now, the reflection characteristics when the liquid crystal display 7 is, as a reflective display, viewed from the side in the A direction will be discussed below.

First, the result of measurement of reflectance when the reflector 161 in FIG. 17 is not provided is shown for reference's sake. In the measurement:

A liquid crystal panel was arranged such that the aperture ratio of the transmission area is 66% and the aperture ratio of the reflector 161 is 0%; and "D-BEF" manufactured by Sumitomo 3M, Ltd. was used as the polarizing selective reflector 16, and;

The result of measurement of reflectance using a measuring device ("CM-572" manufactured by Minolta Co., Ltd.) which can measure the luminance of incident diffused light was 2.2%.

Next, the result of measurement of reflectance of the liquid crystal display 7 in FIG. 17 is shown. In the measurement:

A liquid crystal panel was arranged such that the aperture ratio of the transmission area is 66% and the aperture ratio of the reflector 161 is 13.5%; and "D-BEF" manufactured by Sumitomo 3M, Ltd. was used as the polarizing selective reflector 16, and;

The result of measurement of reflectance using the aforementioned measuring device was 3.9%.

As the results above indicate, the reflectance of the liquid crystal display 7 is almost twice as much as that of the referential display. This is because, the light reflected on the polarizing selective reflector 16 externally provided to the second glass substrate 12 may pass through another color filter, due to the parallax caused by the glass thickness of the liquid crystal panel. If passing through the inappropriate color filter, almost all of the light is absorbed. On the contrary, the light reflected on the reflector 161 always passes through an identical color filter so that the reflection is effectively carried out.

Referring to FIG. 18, the viewing from the side in the B direction is now described. In this case, in that area with reflector which corresponds to a panel non-transmission part, the light arriving at the reflector 161 does not contribute to the transmission image reproduction. Thus, the description concerning this part is omitted here. First, a case of applying no voltage or a sufficiently low voltage to the liquid crystal layer 13 is discussed. Unpolarized light which is either the outside light or the light from the front light is changed to linearly polarized light as passing through the first polarizing plate 14. The first polarizing plate 14 in FIG. 18 allows linearly polarizing light in the lateral direction, i.e. in parallel to the figure, to pass through. The light passing through a transmittable part of the area without reflector is caused to have a $\pi$ phase difference by the liquid crystal layer 13, and becomes linear polarized light orthogonal to the polarized light on the occasion of the incidence, when arriving at the polarizing selective reflector 16. Thus, this light passes through the polarizing selective reflector 16 and second polarizing plate 15 and then passes away from the back (on the side in the B direction) of the panel. As a result, when viewed from the side in the B direction, the light-state image reproduction is realized.

On the other hand, when a voltage is applied to the liquid crystal layer 13, the liquid crystal molecules rise up so that the light incident thereon is not polarized by the layer 13. Thus, the linearly polarized light having passed through the first polarizing plate 14 is reflected on the polarizing selective reflector 16, with its polarization state being unchanged, and then passes through the first polarizing plate 14. On this account, the light-state image reproduction is realized when viewed from the side in the B direction.

When the light enters from the side in the B direction, this light is changed to linearly polarized light by the second polarizing plate 15, and passes through the polarizing selective reflector 16. When no voltage or a low voltage is applied, the linearly polarized light is rotated for 90 degrees in the liquid crystal layer 13, so as to pass through the first polarizing plate 14, as linearly polarized light being in parallel to the transmission axis of the first polarizing plate 14. When a voltage is applied, the linearly polarized light reaches the first polarizing plate 14 without any changes, and is absorbed by the first polarizing plate 14.

In this manner, on the contrary to the conventional art, the polarizing selective reflector 16 is disposed only in the B direction of the liquid crystal layer 13. For this reason, no light is reflected to the liquid crystal layer 13 from the side in the A direction. Also in this case, the light having been incident from the side in the B direction and having passed through the second polarizing plate 15 does not include a linearly polarized light component orthogonal to the transmission axis of the second polarizing plate 15, due to the absorption by the second polarizing plate 15. Thus, no light is reflected by the polarizing selective reflector 16 and returns in the B direction.

Thus, when carrying out the dark-state image reproduction viewed from the side in the B direction using the light incident from the side in the A direction, the light incident from the side in the B direction is caused not to be reflected and return. For this reason, it is possible to obtain suitable black display in a dark place as well as in a well-lighted place. As a result, the liquid crystal display 7 can perform suitable black display in a dark place as well as in a well-lighted place.

Further, in the liquid crystal display 7, when the polarizing selective reflector 16 is provided in the B direction of the second glass substrate 12 rather than between the first and second glass substrates 11 and 12, the reliability of the product is improved and the manufacturing process is improved because of the easiness of the design. In the liquid crystal display 7, moreover, the non-transmissive area is disposed between the liquid crystal layer 13 and second glass substrate 12, and although the polarizing selective reflector 16 is disposed as above, the reflector 161 is also provided so that the light passing through the liquid crystal layer 13 in the B direction is reflected thereon. Thus, when viewing the reflective image reproduction from the side in the A direction, the light which is obstructed by the non-transmissive area and hence does not reach the polarizing selective reflector 16 can be reflected on the reflector 16, so that bright image reproduction can be performed. When color filters are provided, the following problem can be compensated by utilizing reflected light from the reflector 161: The light reflected on the polarizing selective reflector 16 is absorbed by a color filter different from the color filter on the occasion of the incidence, so that the luminance is decreased.

In the liquid crystal display 7, moreover, on the occasion of the light-state image reproduction viewed from the side in the A direction, the liquid crystal layer 13 controls the state of polarization of passing light so as to cause (i) a light component being incident from the side in the A direction of the first polarizing plate 14 and reflected on the reflector 161 and (ii) a light component being incident from the side in the A direction of the first polarizing plate 14 and reflected on the polarizing selective reflector 16 to pass through the first polarizing plate 14 again. With this, the light component reflected on the reflector 161 and the light component reflected on the polarizing selective reflector 16 simultaneously contribute to bright image reproduction. Thus, it is possible to carry out the bright reflective image reproduction.

On the occasion of the dark-state image reproduction viewed from the side in the A direction, the liquid crystal layer 13 controls the state of polarization of passing light so as to cause (i) a light component incident from the side in the A direction of the first polarizing plate 14 and reflected on the reflector 161 and (ii) a light component incident from the side in the A direction of the first polarizing plate 14 and reflected on polarizing selective reflector 16 not to pass through the first polarizing plate 14 again. With this, the light component reflected on the reflector 161 and the light component reflected on the polarizing selective reflector 16 simultaneously contribute to the black display. Thus, it is possible to successfully carry out the dark-state image reproduction.

In the liquid crystal display 7, moreover, the light having passed through the first polarizing plate 14 from the side in the A direction becomes linearly polarized light in parallel to the transmission axis. In the case of the light-state image reproduction, the liquid crystal layer 13 does not substantially change the polarization state of this linearly polarized light. Thus, the light arriving at the polarizing selective reflector 16 is reflected thereon, and in conjunction with the light reflected on the reflector 161, the linearly polarized light passes through the first polarizing plate 14 again.

In the case of the dark-state image reproduction, the liquid crystal layer 13 controls the phase difference of the polarized light in the following manner: The phase difference of the light having passed through the first polarizing plate 14 is set as 0, and then the phase difference of the light traveling from the first polarizing plate 14 to the reflector 161 is set as substantially $\pi/2$ when the light has just passed through the liquid crystal layer 13. With this control, the light is changed to circularly polarized light and reaches the reflecting member. Since the light reflected on the reflector 161 is changed to reverse-circularly polarized light, the liquid crystal layer 13 controls this light so that the phase difference of the light traveling from the reflector 161 to the first polarizing plate 14 is set to be substantially $\pi$ when the light has just passed through the liquid crystal layer 13. Consequently, the light reaches the first polarizing plate 14 as linearly polarized light in parallel to the absorption axis which is orthogonal to the transmission axis, and thus the light is absorbed by the first polarizing plate 14. Furthermore, the liquid crystal layer 13 also carries out the control in such a manner that the phase difference of the light traveling from the first polarizing plate 14 to the polarizing selective reflector 16 is set as substantially $\pi$ when the light has just passed through the liquid crystal layer 13. With this control, the light reaches the polarizing selective reflector as the light in the second polarization state, and thus the dark-state image reproduction can be successfully realized.

Thus, the brightness of the reflective light-state image reproduction can be secured and the dark-state image reproduction can be successfully realized.

In the liquid crystal display 7, moreover, the liquid crystal layer 13 is arranged so that the cell thickness of the area with reflector and the cell thickness of the area without reflector are substantially at a ratio of one to two. With this, the control of the polarization state is realized in consideration of the round trip of the light in both areas, only by changing the difference of cell thickness, and thus the liquid crystal layer 13 in both areas can be made of the same material, i.e. ECB liquid crystal.

In the liquid crystal display 7, furthermore, on the occasion of carrying out normally image reproduction with no voltage or low-voltage application to the liquid crystal layer 13, the polarizing selective reflector 16 allows most of the light coming from the side in the A direction to pass through, the first polarizing plate 14 absorbs most of the light reflected on the reflector 161, and the second polarizing plate 15 allows most of the light coming from the side in the A direction to pass through. Meanwhile, on the occasion of maximum-drive image reproduction with a sufficiently high voltage application to the liquid crystal layer 13, the polarizing selective reflector 16 reflects most of the light coming from the side in the A direction, and the first polarizing plate 14 allows most of the light reflected on the reflector 161 to pass through.

In consequence, the reflective image reproduction viewed from the side in the A direction appears normally black, while the transmission image reproduction viewed from the side in the B direction appears normally white. Conventionally, the quality of black display in transmission normally image reproduction generally depends on the manufacturing process and hence inferior to the quality of black display in reflective image reproduction. On the contrary, in the arrangement above, the transmission black display is carried out in a driving manner. For this reason, the transmission black display does not depends on the manufacturing process so as to have a sufficient quality, and this makes it possible to improve the contrast.

When carrying out reflective image reproduction, normally-black display is carried out in both the area with reflector and the area without reflector, while white display is carried out in both the area with reflector and the area without reflector in the maximum driving manner. Thus, even if one pixel includes the both areas, it is possible to cause the both areas to simultaneously carry out either black display or white display, and thus suitable image reproduction can be carried out.

Seventh Embodiment

The following will describe still another embodiment of the present invention with reference to FIGS. 19-22.

Figure 19:
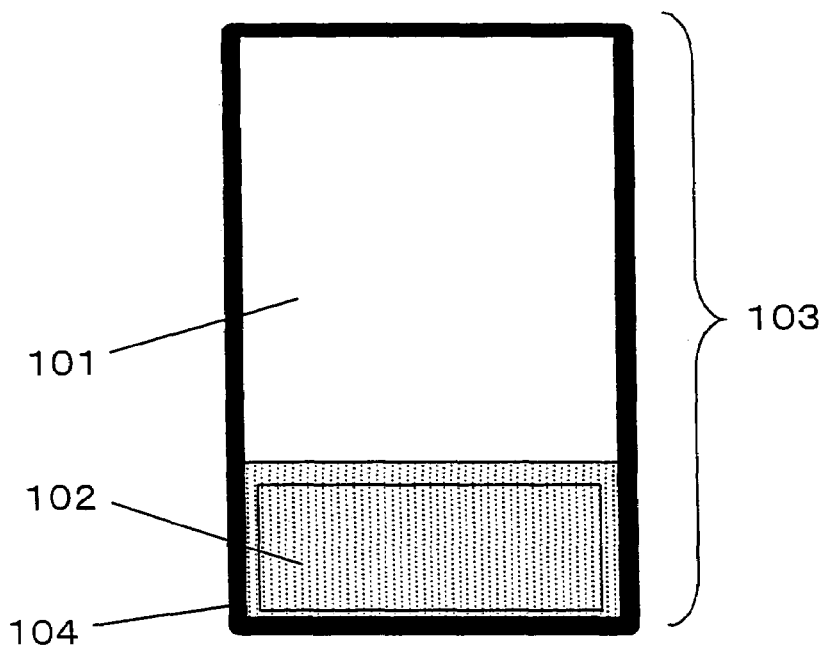
FIG. 19 is a rough plan view of a pixel provided in a display of Seventh Embodiment of the present invention.
Figure 20:
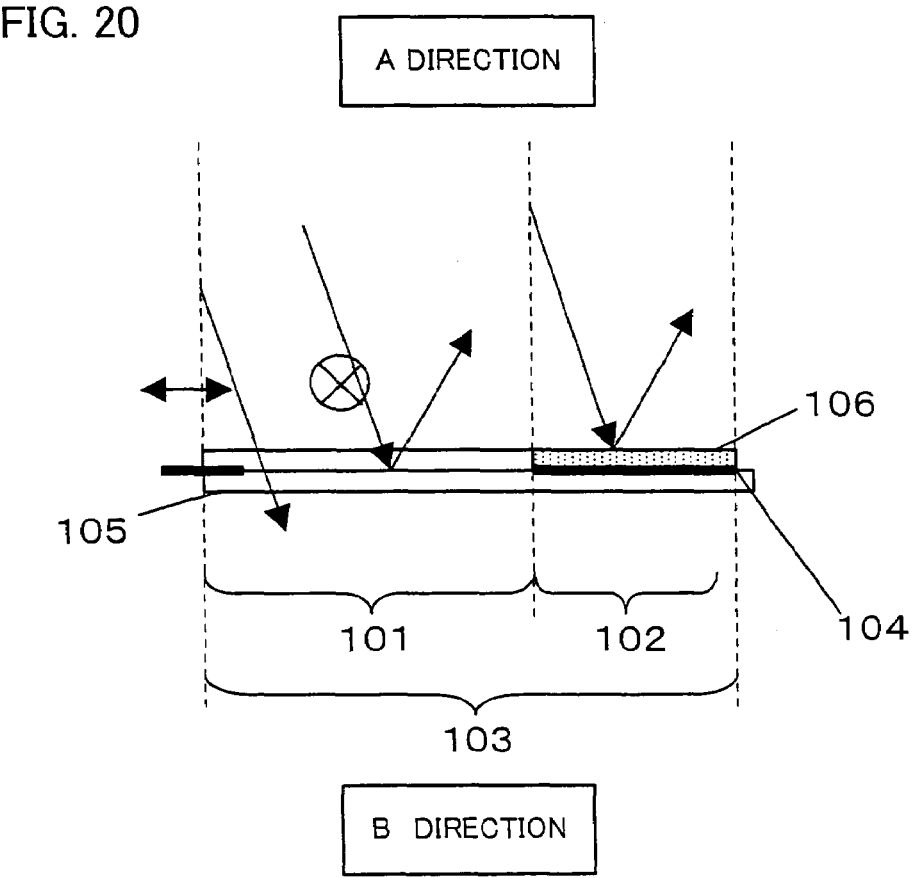
FIG. 20 is a cross section, illustrating the display of Seventh Embodiment of the present invention.

FIG. 19 is a rough plan view of a pixel 103 of the present embodiment, and FIG. 20 is a rough cross section of the pixel 103. The pixel 103 of the present embodiment, which is a part of the display area of the display medium, is divided at least into a first area 101 and second area 102. The first area 101 is formed on a light-transmission area of the pixel 103, and performs both of transmission image reproduction and reflective image reproduction. The second area 102 is formed in a non-light-transmission area of the pixel 103, the non-light-transmission area not transmitting light because of members such as signal wiring 104, and the second area 102 only performs reflective image reproduction.

According to the pixel arrangement of the present embodiment, the area with reflector and the area without reflector are not formed by dividing the pixel. Thus, it is possible to improve the rate of utilization of the light.

Next, the principle of image reproduction is discussed with reference to FIG. 20.

FIG. 20 illustrates a profile of the pixel 103. At least on the side in the B direction (i.e. on the second side) of the first area 101 in the display medium, a polarizing selective reflecting layer (selective reflecting means, polarizing selective reflecting means) 105 is disposed. In the present example, the polarizing selective reflecting layer 105 is disposed on the side in the B direction of the first area as well as on the side in the B direction of the second area. The signal wiring 104 is provided on the side in the A direction of the polarizing selective reflecting layer 105. In the second area 102, a reflecting member (reflecting means) 106 is disposed on the side in the A direction of the signal wiring 104.

In the present embodiment, the polarizing selective reflecting layer 105 allows linearly polarized light in the lateral direction, which is horizontal with respect to the figure, to pass through, while causes linearly polarized light which is vertical with respect to the figure to be reflected. The reflecting member 106 reflects the light passing through the display medium in the B direction (i.e. from the side in (1) direction), regardless of the polarization state of the light.

As to the first area 101, when the light enters in the B direction as in FIG. 20 and is, on the polarizing selective reflecting layer 105, in the state (second state, second polarization state) of linearly polarized light which is in parallel to and in the lateral direction to the figure, the incident light passes through the polarizing selective reflecting layer 105. In this case, the transmission image reproduction viewed from the side in the B direction appears the light-state, because the incident light reaches the eyes of the viewer. As to the reflective image reproduction viewed from the side in the A direction, the incident light does not return to the eyes of the viewer so that the dark-state appears.

On the other hand, when the light enters in the B direction and is, on the polarizing selective reflecting layer 105, in the state (first state, first polarization state) of linearly polarized light which is vertical to the figure, the incident light is reflected on the polarizing selective reflecting layer 105. In this case, the transmission image reproduction viewed from the side in the B direction appears the dark-state as the incident light does not reach the eyes of the viewer, while the reflective image reproduction viewed from the side in the A direction appears the light-state, as the incident light reaches the eyes of the viewer.

Next, the second area 102 is discussed. This second area 102 only contributes to the reflective image reproduction viewed from the side in the A direction, thereby not relating to the transmission image reproduction viewed from the side in the B direction. Thus, the light-state image reproduction and dark-state image reproduction in the second area 102 have to be arranged as below.

When the reflective image reproduction on the side of the A direction of the first area 101 is in the dark-state, the reflective image reproduction on the side of the A direction of the second area 102 is in the dark-state as well, while, when the reflective image reproduction on the side of the A direction of the first area 101 is in the light-state, the reflective image reproduction on the side of the A direction of the second area 102 is in the light-state as well. In this case, the reflective image reproduction viewed from the side in the A direction is the combination of the image reproduction in the first area 101 and the image reproduction in the second area 102. In the present embodiment, the first area 101 and second area 102 simultaneously perform either the dark-state image reproduction or the light-state image reproduction. Thus, the resultant image reproduction as the combination of the image reproductions on these areas is good in quality, since the image reproductions on these areas do not cancel out each other.

Furthermore, since the reflecting member 106 of the second area 102 is formed only on the non-transmitting area of the display medium, the brightness of the transmission image reproduction viewed from the side in the B direction is not degraded. With this, it is possible to maximize the rate of utilization of the light in the case of the transmission image reproduction viewed from the side in the B direction, and hence the image reproduction with high brightness and visibility can be carried out.

In this manner, the display of the present embodiment can carry out the transmission image reproduction on the side in the B direction of the display medium, in such a way that the light incident on the first area 101 from the side in the A direction thereof is controlled so as to be in the state of linearly polarized light in parallel to the figure, thereby passing through the polarizing selective reflecting layer 105. Furthermore, the display of the present embodiment can carry out the first reflective image reproduction on the side in the A direction of the display medium by controlling and causing the light incident on the first area 101 from the side in the A direction to be in the state of linearly polarized light vertical to the figure and to be reflected on the polarizing selective reflecting layer 105. The display of the present embodiment can, moreover, carry out the second reflective image reproduction on the side in the A direction of the display medium by causing the light incident on the second area 102 from the side in the A direction to be reflected on the reflecting member 106.

It is noted that the polarization state of the light on the polarizing selective reflecting layer 105 and the polarization state of the light on the reflecting member 106 greatly influence on the ratio of the contrast of image reproduction. Concerning this, the relationship between the ellipticity of these polarized lights and the ratio of contrast is discussed below.

Figure 21:
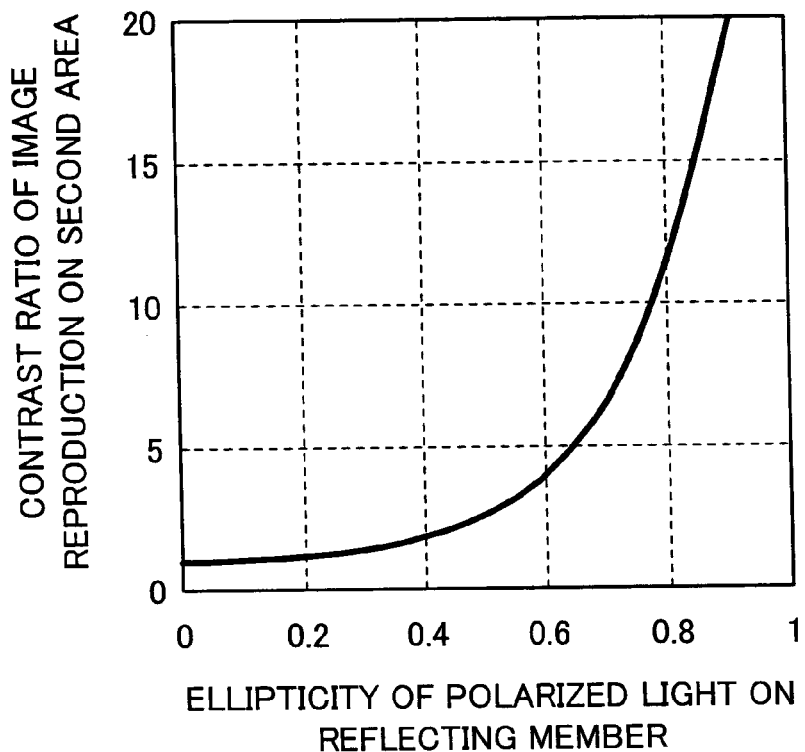
FIG. 21 is a first graph, showing display properties of the display in FIG. 20.

FIG. 21 shows the relationship between the ellipticity of the polarized light on the reflecting member 106 and the ratio of the contrast of the image reproduction on the second area 102 viewed from the side in the A direction. This figure indicates that, when the ellipticity of the polarized light on the reflecting member 106 in the second area 102 is not less than 0.7, the ratio of the contrast is not less than 5 so that the image reproduction is properly carried out.

Figure 22:
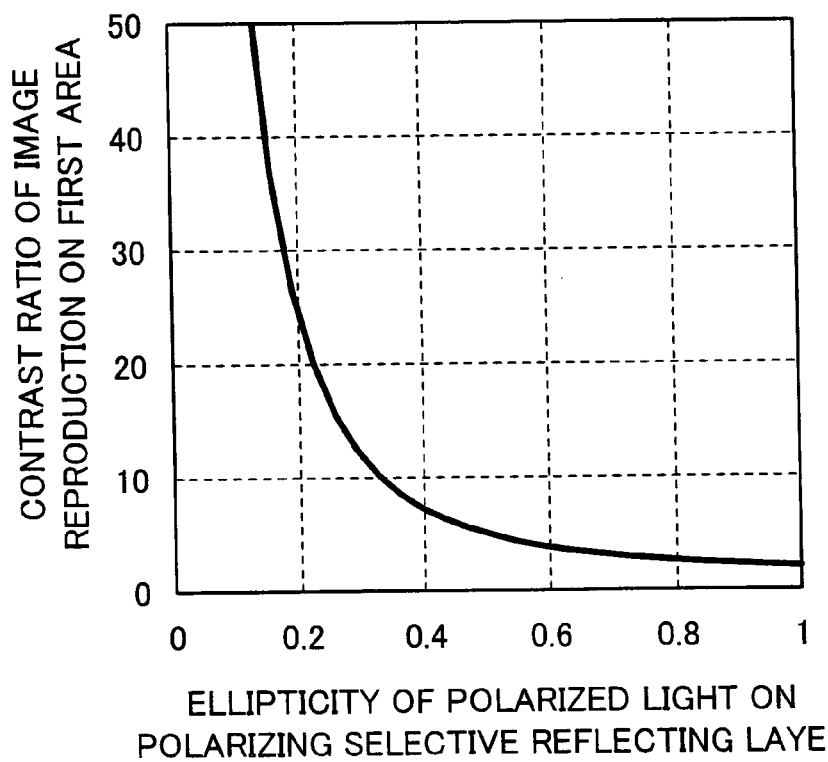
FIG. 22 is a second graph, showing display properties of the display in FIG. 20.

Meanwhile, FIG. 22 shows the relationship between the ellipticity of the polarized light on the polarizing selective reflecting layer 105 and the ratio of the contrast of the image reproduction on the first area 101 viewed from the side in the B direction. This figure indicates that, when the ellipticity of the polarized light on the polarizing selective reflecting layer 105 is not less than 0.3, the ratio of the contrast is not less than 10 so that the image reproduction is properly carried out. Note that, results similar to the above-mentioned relationships between the ellipticity and the ratio of contrast can be obtained in any types of display media which control polarized light. Furthermore, the image reproduction on the first area 101 viewed from the side in the A direction is in the state opposite to the image reproduction viewed from the side in the B direction, i.e., when the image reproduction on the first area 101 viewed from the side in the A direction is in the dark-state, the image reproduction viewed from the side in the B direction is in the light-state, and vice versa. Thus, when the transmission image reproduction viewed from the side in the B direction is good in quality, the reflective image reproduction viewed from the side in the A direction is also good in quality. Moreover, as FIG. 22 shows, the ratio of contrast is not less than 20 when the ellipticity on the polarizing selective reflecting layer 105 in the first area 101 is not more than 0.22, so that better image reproduction can be realized.

To realize such polarization state, it is necessary to, for example, adjust the display medium in the first area and the display medium in the second area. More specifically, the adjustment can be realized in such a manner that the type of the display medium in the first area is caused to be different from the type of the display medium in the second area. However, even if the type of the display media is identical in these areas, the polarization states of the respective areas can be matched each other by causing the display medium in the first area to be thicker than the display medium in the second area, by providing, for instance, an insulating layer in the first area.

Eighth Embodiment

The following will describe still another embodiment of the present invention with reference to FIGS. 23-32.

Figure 23:
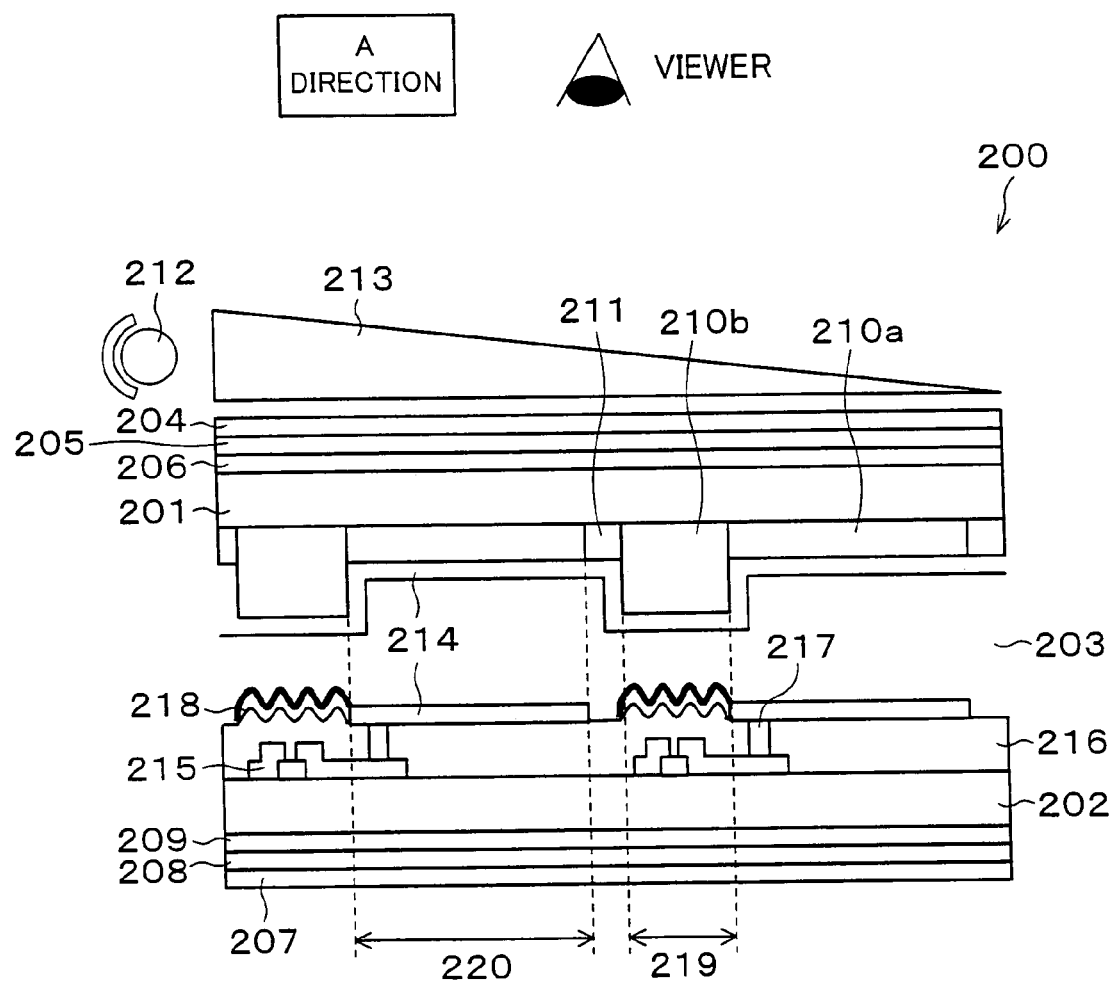
FIG. 23 is a cross section, illustrating a display of Eighth Embodiment and Ninth Embodiment of the present invention.

FIG. 23 schematically illustrates a liquid crystal display (display) 200 of the present embodiment. This liquid crystal display 200 includes a first glass substrate 201, second glass substrate 202, liquid crystal layer 203, elliptically polarizing plate made up of a first polarizing plate 204 and first optical compensation element 205, and elliptic polarizing plate made up of a second polarizing plate 207, second optical compensation element 209, and polarizing selective reflector 208, light-scattering layer 206, color filters 210a and 210b, shading film 211, transparent electrodes 214, switching element 215, light source 212, light guiding plate 213, and reflector 218. This liquid crystal display 200 is arranged so that the liquid crystal layer 203 is sandwiched between the first and second glass substrates 201 and 202 which are a pair of transparent substrates, and the direction from the liquid crystal layer 203 towards the first glass substrate 201 is termed "A direction" (first direction), whereas the direction from the liquid crystal layer 203 towards the second glass substrate 202 is termed "B direction" (second direction). The light source 212 and light guiding plate 213 constitutes a front light. This front light is provided at the farthest in the A direction, and the light emitted from the light source 212 is reflected in the B direction by the light guiding plate 213. The liquid crystal layer (display medium, 90° twisted nematic liquid crystal layer) 203 is made of 90° TN liquid crystal.

The first polarizing plate (first polarizing means) 204 is disposed on the A-oriented surface of the first glass substrate 201, has a transmission axis provided in a predetermined direction, and allows only light component which is linearly polarized light in the direction identical with the transmission axis to pass through. When unpolarized light from the front light is incident on the first polarizing plate 204, the light is changed to linearly polarized light in parallel to the transmission axis of the first polarizing plate 204 and passes therethrough. This first polarizing plate 204 is manufactured in such a manner that a polymer resin film to which absorber such as iodine and dichroic dye is mixed is stretched so that the absorber is aligned. Aside from this, any kinds of materials may be used for manufacturing the first polarizing plate 204, as long as the unpolarized light is changed to the linearly polarized light.

The second polarizing plate (second polarizing means) 207 is disposed on the B-oriented surface of the second glass substrate 202, and its transmission axis is substantially orthogonal to the first polarizing plate 204. The polarizing selective reflector (selective reflecting means, polarizing selective reflecting means) 208 is disposed between the second glass substrate 202 and second polarizing plate 207. The polarizing selective reflector 208 reflects the linearly polarized light incident thereon as the light in the first polarization state (first state, state of linearly polarized light in (1) direction), when the direction of the polarization of the light is in parallel to the reflection axis. Meanwhile, the polarizing selective reflector 208 allows the linearly polarized light incident thereon to pass through as the light in the second polarization state (second state, state of linearly polarized light in (2) direction), when the direction of the polarization of the light is in parallel to the transmission axis. The reflection axis and transmission axis of the polarizing selective reflector 208 are orthogonal to each other. Furthermore, the reflection axis of the polarizing selective reflector 208 is substantially in parallel to the transmission axis of the first polarizing plate 204, while the transmission axis of the polarizing selective reflector 208 is substantially orthogonal to the transmission axis of the first polarizing plate 204. In the present embodiment, a known polarizing selective reflector manufactured by depositing polymer membranes is adopted. Note that, as long as linear polarized light running in one direction passes through and linear polarized light running in another direction is reflected, any kinds of polarizing selective filters can be adopted.

The first optical compensation element (optical compensation means) 205 is disposed between the first glass substrate 201 and first polarizing plate 204. The second optical compensation element (optical compensation means) 209 is disposed between the second glass substrate 202 and polarizing selective reflector 208. The light-scattering layer (light-scattering means) 206 is disposed on the side in the A direction of the first glass substrate 201. Note that, the light-scattering layer 206 is provided on the A-oriented side of the first glass substrate 201. The position of the light-scattering layer 206 with respect to the first polarizing plate 204 and the first optical compensation element 205 can be arbitrarily determined.

The color filters 110*a* correspond to R, G, and B colors and are provided on the side in the B direction of the first glass substrate 201, and the color filter 210*b* is a transparent color filter. The reflector 218 reflects the incident light irrespective of the polarization state, and is disposed in an area on the insulating resin layer 216 in the substrate, the area substantially facing the color filter 110*b*. The color filter 210*b* is arranged so as to be thicker than the color filters 210*a*. With this, the cell thickness of the area where the color filter 210*b* is disposed is arranged so as to be substantially half as much as the cell thickness of the remaining areas. Note that, although the cell thickness is determined by arranging the thickness of the color filter 210*b*, it is possible to determine the cell thickness by providing unevenness on the insulating resin layer 216. In the present embodiment, furthermore, microscopic irregularities are formed on the insulating resin layer 216, in order to improve the visibility obtained by the effect of the reflector 218 which does not depend on the polarization state. The shading film 211 is provided in an area which is adjacent to the color filters 210*a* and 210*b* and does not include a part of wiring and pixel electrode thereon. The shading film 211 obstructs the light passing in the B direction.

The transparent electrodes 214 are provided on the B-oriented surfaces of the color filters 210*a* and 210*b* and the shading film 211 on the first glass substrate 201, and the A-oriented surface on the second glass substrate 202. In the present case, these transparent electrodes 214 are made of ITO (alloy of indium oxide and tin oxide). However, the transparent electrodes 214 may be made of other transparent conductive metal films. Furthermore, although the present embodiment adopts metal transparent electrode materials, transparent materials such as resin and semiconductor may be adopted instead of metal materials. If necessary, a contact section 217 for wiring may be provided. The switching element 215 is disposed on the A-oriented surface of the second glass substrate 202, and is an active element such as a TFT for carrying out switching for driving the pixels.

In the above-described liquid crystal display 200, the color filters 210*a* and the area facing them are a first area 220 which transmits light, and this first area 220 corresponds to the first area 101 in Seventh Embodiment. On the other hand, the color filter 210*b* and the area facing the same are a second area 219, and this second area 219 corresponds to the second area 102 in Seventh Embodiment. The non-transmitting area in the second area 219 is constituted by, for example, the switching element 215 disposed on the side in the B direction of the reflector 218 and wiring.

Next, an optical arrangement when, as in the present embodiment, the liquid crystal layer 203 is made of 90° TN is discussed. The liquid crystal display 200 of the present embodiment can realize the image reproduction with good quality in both the reflective image reproduction viewed from the side in the A direction and the transmission image reproduction viewed from the side in the B direction.

In the case of the reflective image reproduction viewed from the side in the A direction, the viewer watches both the first and second areas of the display. Meanwhile, in the case of the transmission image reproduction viewed from the side in the B direction, the viewer watches only the first area 220. In other words, the second area 219 contributes only to the reflective image reproduction viewed from the side in the A direction, while the first area 220 contributes to both the reflective image reproduction viewed from the side in the A direction and the transmission image reproduction viewed from the side in the B direction.

First, an optical arrangement regarding the reflective image reproduction on the second area 219 is specifically described.

In the present embodiment, the reflective image reproduction viewed from the side in the A direction is termed normally black, and the transmission image reproduction viewed from the side in the B direction is termed normally white. To obtain a high ratio of contrast in the second area 219 on which the normally-black reflective image reproduction is carried out, it is preferable that the linearly polarized light having passed through the first polarizing plate 204 is changed to circularly polarized light on the reflector 218. In this case, when reaching the first polarizing plate 204 again, the reflected light has become linearly polarized light substantially orthogonal to the linearly polarized light on the occasion of the first incidence to the first polarizing plate 204, so as to be obstructed by the first polarizing plate 204.

Figure 24:
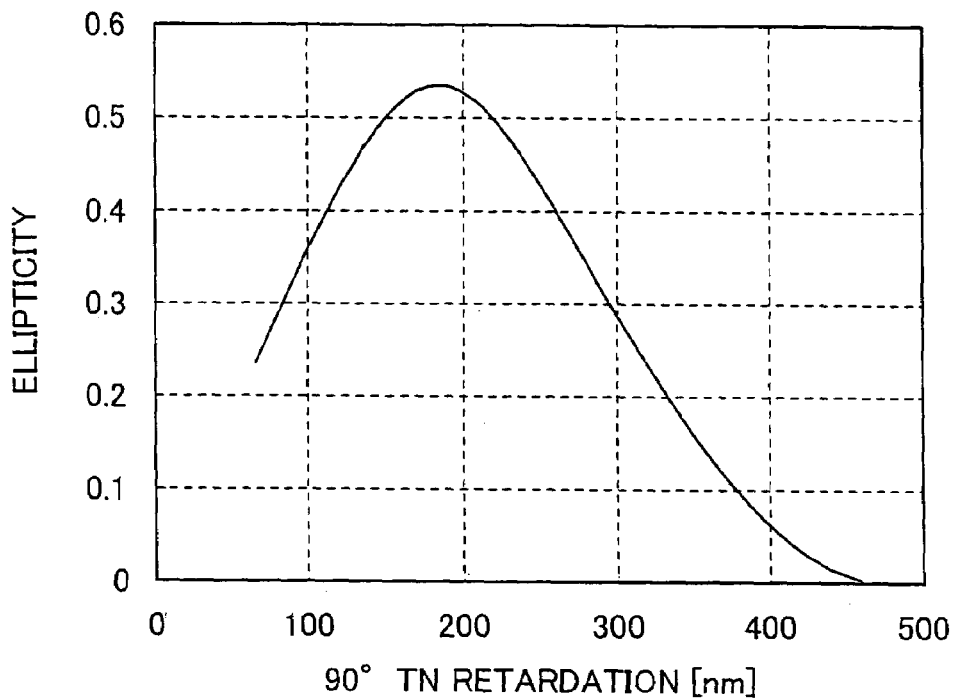
FIG. 24 is a first graph, showing properties concerning the display of Eighth Embodiment shown in FIG. 23.

However, when the linearly polarized light enters the liquid crystal layer 203 made of conventional 90° TN having various retardations as shown in FIG. 24, the ellipticity of the polarized light is only 0.54 on the reflector 218 when no voltage is applied. In this case, the reflected light having reached the first polarizing plate 204 again is not the linearly polarized light substantially orthogonal to the linearly polarized light on the occasion of the first incidence. Thus, most of the light passes through the first polarizing plate 204 so that the shielding of the light is improper. In FIG. 24, even the ellipticity of light most similar to the circularly polarized light, which is 0.54, is lower than the ellipticity on the reflector 106 for obtaining the image reproduction with good quality as described in Seventh Embodiment, which is not less than 0.7.

Thus, in the present embodiment, the linearly polarized light having passed through the first polarizing plate 204 is changed in advance to elliptically polarized light using the first optical compensation element 205, and then this elliptically polarized light is caused to enter the liquid crystal layer 203 made of 90° TN, so that the ellipticity of the polarized light is not less than 0.7 on the reflector 218. However, there is a limitation to the conversion of the linearly polarized light having passed through the first polarizing plate 204 to the elliptically polarized light, because of the following reason.

In the case of the normally-white transmission image reproduction on the first area 220, it is necessary to dispose, on the polarizing selective reflector 208, the second optical compensation element 209 which (i) has retardation identical with that of the first optical compensation element 205 and (ii) is optically orthogonal to the first optical compensation element 205, because, as described above, the first optical compensation element 205 which is basically unnecessary for 90° TN is disposed.

In this case, the second optical compensation element 209 also has a function to change linearly polarized light to elliptically polarized light, and this decreases the ratio of contrast of the transmission image reproduction. For this reason, it is preferable that the ellipticity of the elliptically polarized light as a result of the conversion by the second optical compensation 209 is as small as possible. To convert the linearly polarized light to the elliptically polarized light having minimum ellipticity by the second optical compensation element 209, the first optical compensation element 205 is also required to convert the linearly polarized light to elliptically polarized light with minimum ellipticity. To accomplish this, it is necessary to adopt a 90° TN liquid crystal layer which can independently cause the incident light to be polarized light whose ellipticity is in close proximity to 1 on the reflector 218.

Figure 25:
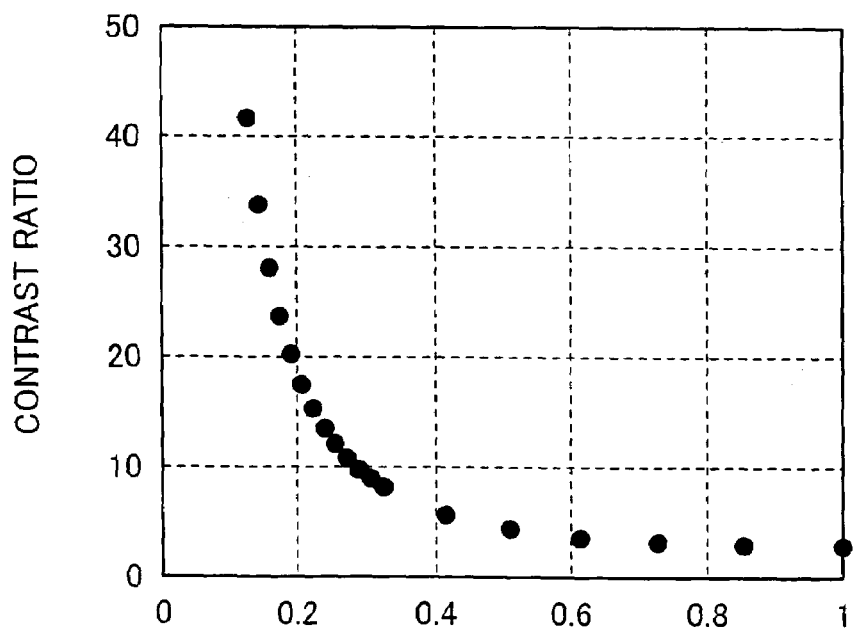
FIG. 25 is a second graph, showing properties concerning the display of Eighth Embodiment shown in FIG. 23.

FIG. 25 shows the relationship between the ellipticity as a result of a elliptic polarizing plate made up of the second polarizing plate 207, second optical compensation element 209, and polarizing selective reflector 208 and the ratio of contrast of the transmission image reproduction. As the figure indicates, it is required that the linearly polarized light is converted by the second optical compensation element 209 to be polarized light in which the ellipticity is not more than 0.3, in order to cause the ratio of contrast to be not less than 10 with which high-quality transmission image reproduction can be realized. For this reason, the ellipticity as a result of the elliptic polarizing plate made up of the first polarizing plate 204 and first optical compensation element 205 has to be not more than 0.3 as well.

Figure 26:
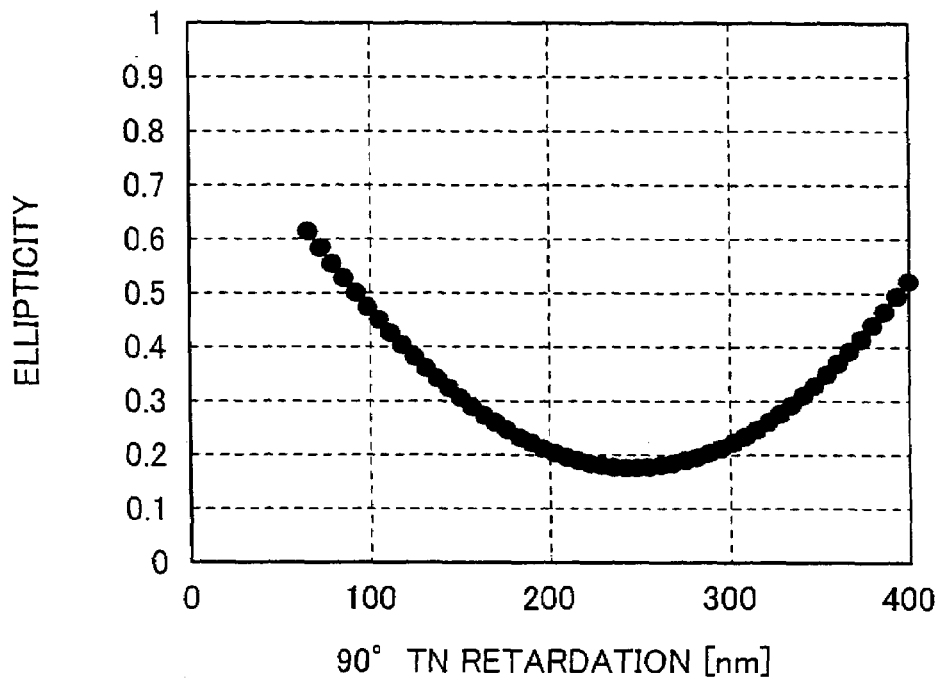
FIG. 26 is a third graph, showing properties concerning the display of Eighth Embodiment shown in FIG. 23.

FIG. 26 shows the ellipticity of the light having passed through 90° TN, when right-circularly polarized light is incident on the 90° TN having different retardations. In this case, an elliptic polarizing plate which converts the elliptically polarized light having passed through 90° TN to polarized light having the ellipticity identical with that of the elliptically polarized light, so that the polarized light having passed through the elliptic polarizing plate becomes circularly polarized light on the reflector 218. As illustrated in FIG. 26, the ellipticity is at the minimum when the retardation is about 250 nm. On this condition, the ellipticity as a result of the first optical compensation element 205 and second optical compensation element having been adopted in this case is small, and hence the ratio of contrast necessary for realizing the transmission image reproduction can be obtained. Meanwhile, when an elliptic polarizing plate made up of the aforementioned first compensation element 205 by which the ellipticity is not more than 0.3 is adopted, the retardation of that 90° TN in the second area 219, as a result of which the circularly polarized light in which the ellipticity is 1 is produced, is not less than 150 nm and not more than 320 nm. Furthermore, when the elliptic polarizing plate made up of the aforementioned first compensation element 205 by which the ellipticity is not more than 0.3 is adopted, the retardation of that 90° TN in the second area 219, as a result of which the circularly polarized light in which the ellipticity is 0.7 is produced, is not less than 150 nm and not more than 340 nm.

In the above-described liquid crystal display 200, a value $\Delta\epsilon$ indicating the dielectric anisotropy of the liquid crystal layer 203 is positive. Thus, when the reflective image reproduction viewed from the side in the A direction is black display, an OFF voltage, i.e. the lowest voltage among drive voltages, is applied to the liquid crystal layer 203. As a result, the light incident on the first area 220 from the side in the A direction becomes, on the polarizing selective reflector 208, either elliptically polarizing light or linearly polarized light which has a major axis in parallel to the transmission axis of the polarizing selective reflector 208. Moreover, the light incident on the second area 219 becomes, on the reflector 218, either elliptically polarized light or circularly polarized light. Consequently, the reflective image reproduction using both the first and second areas 220 and 219 can realize high-quality black display by precisely causing these areas to carry out identical black display.

On the contrary, when the value $\Delta\epsilon$ of the liquid crystal layer 203 is negative, an ON voltage which is the highest voltage among the drive voltages is applied to cause the reflective image reproduction viewed from the side in the A direction to be black display. In this case, the light incident on the first area 220 from the side in the A direction becomes, on the polarizing selective reflector 208, either elliptically polarized light or linearly polarized light, which has a major axis in parallel to the transmission axis of the polarizing selective reflector 208. Moreover, the light incident on the second area 219 becomes, on the reflector 218, either elliptically polarized light or circularly polarized light. Consequently, the reflective image reproduction using both the first and second areas 220 and 219 can realize high-quality black display by precisely causing these areas to carry out identical black display.

Figure 27:
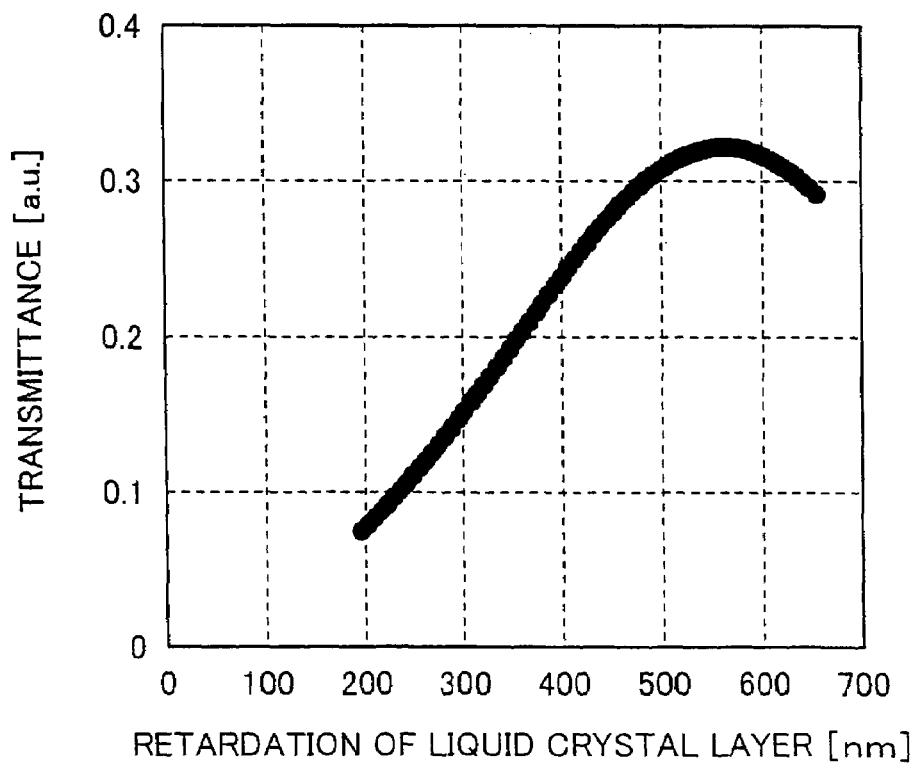
FIG. 27 is a fourth graph, showing properties concerning the display of Eighth Embodiment shown in FIG. 23.

Now, the first area 220 is normally-white 90° TN, and can suitably reproduce black color regardless of the retardation of the liquid crystal layer 203 on condition that a sufficient voltage is applied thereto, because the first optical compensation element 205 and second optical compensation element 209 have substantially identical retardations and the lagging axes thereof are orthogonal to each other. However, the transmittance on the occasion of no voltage application depends on the retardation of the liquid crystal layer 203 as shown in FIG. 27, and high transmittance can be obtained when the retardation is not less than 400 nm.

The liquid crystal display 200 was actually manufactured in accordance with the above-mentioned optical arrangement. More specifically, in the manufactured liquid crystal layer 203, the cell thickness in the second area 219 was 2.8 µm and the cell thickness in the first area 220 was 5.6 µm. The first glass substrate 201 and second glass substrate 202 were parallel aligned, and a liquid crystal composition of 100 µm in which $\Delta n=0.089$ and the spontaneous pitch is counterclockwise was filled up using methods such as vacuum filing.

The liquid crystal layer 203 in the second area 219 was 90° TN with the retardation of 250 nm. When circularly polarized was incident on this liquid crystal layer 203 from the reflector 218, the ellipticity of the outgoing light was 0.18 and the major axis of the ellipse was −70 degrees, provided that the rubbing direction of the lower substrate was determined as 0 degree and the counterclockwise direction was determined as the positive direction. The optical elements were arranged in the following manner: The lagging axis of the first optical compensation element 205 with the retardation of 138 nm was caused to be in parallel to the major axis of the elliptically polarized light as a result of the incidence of the circularly polarized light from the reflector 218 on the second area, and an angle between either the absorption axis or transmission axis of the first polarizing plate 204 and the lagging axis of the first optical compensation element 205 was set as −10 degrees. In the meantime, the second optical compensation element 209 has the retardation of 138 nm, and the lagging axis thereof was substantially orthogonal to the lagging axis of the first optical compensation element 205. The reflection axis of the polarizing selective reflector 208 was substantially in parallel to the absorption axis of the second polarizing plate 207, while the absorption axis of the second polarizing plate 207 was substantially orthogonal to the absorption axis of the first polarizing plate 204.

Figure 28:
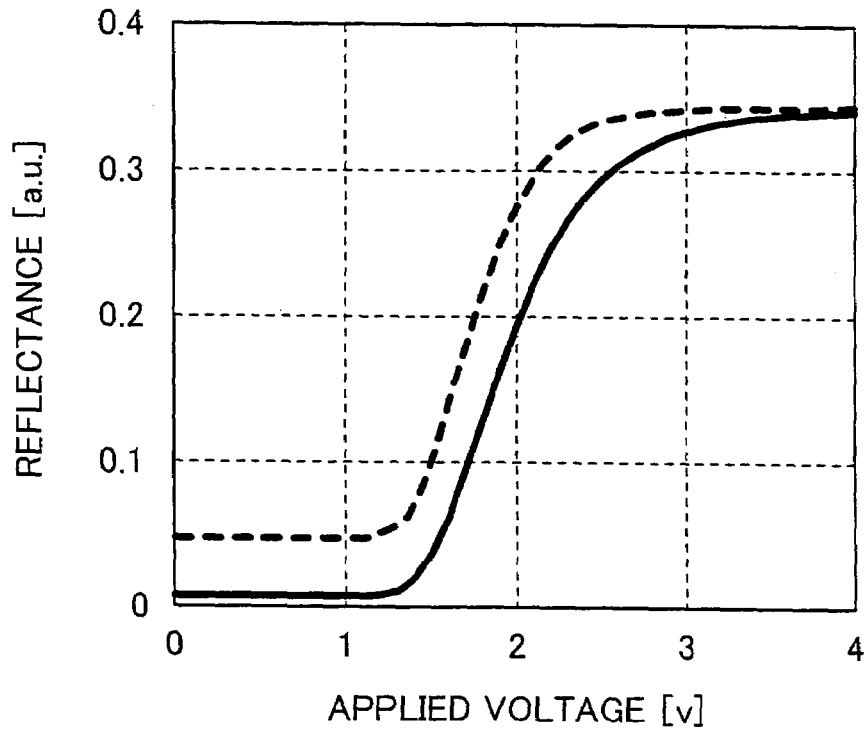
FIG. 28 is a first graph, showing properties of the display of Eighth Embodiment shown in FIG. 23.
Figure 29:
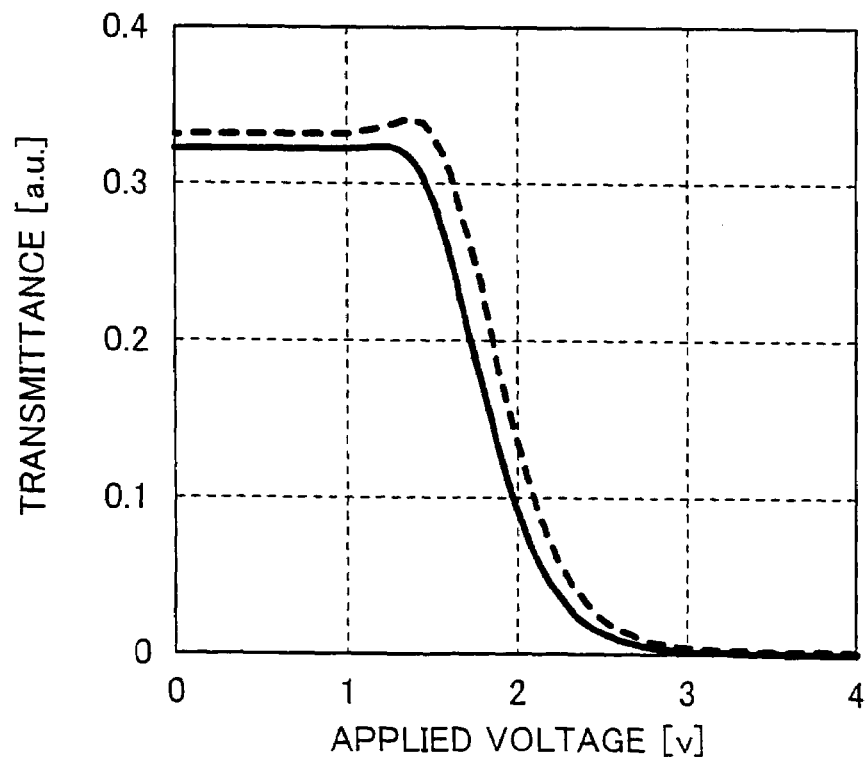
FIG. 29 is a second graph, showing properties of the display of Eighth Embodiment shown in FIG. 23.
Figure 31:
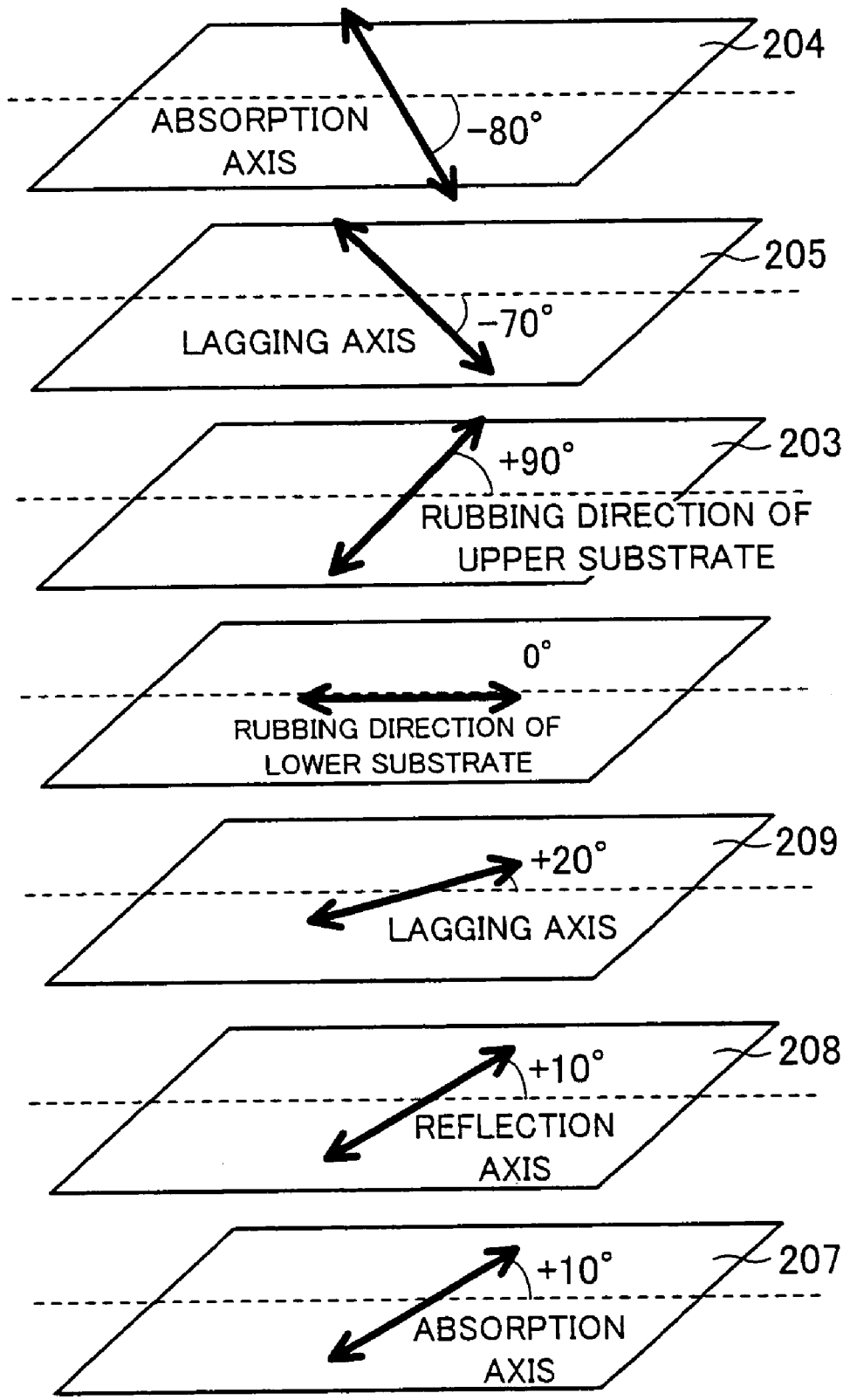
FIG. 31 shows the directions of the optical axes of the display of Eighth Embodiment shown in FIG. 23.

FIGS. 28 and 29 illustrate the electro-optical characteristics of the reflective image reproduction viewed from the side in the A direction and the transmission image reproduction viewed from the side in the B direction of the liquid crystal display 200 of the present embodiment arranged as above. In these figures, full lines indicate the characteristics of the liquid crystal display 200 of the present embodiment, while dotted lines indicate the characteristics of a conventional display not adopting optical compensation elements, as a comparative example. FIG. 31 illustrates the respective angles of the optical axes.

In the present embodiment, a λ/4 plate having the retardation of 138 nm is adopted as the first optical compensation element 205, in order to convert linearly polarized light to elliptically polarized light. However, instead of this, linearly polarized light may be converted to elliptically polarized light by changing the retardation itself. In this case, effects similar to those of the present embodiment can be obtained on condition that the respective optical axes are optimally arranged.

Next, there is illustrated a case when a laminated-type optical compensation element made up of a plurality of optical compensation elements is adopted as the first optical compensation element 205, in order to cause a wider range of light to be the circularly polarized light on the reflector 218.

Figure 30:
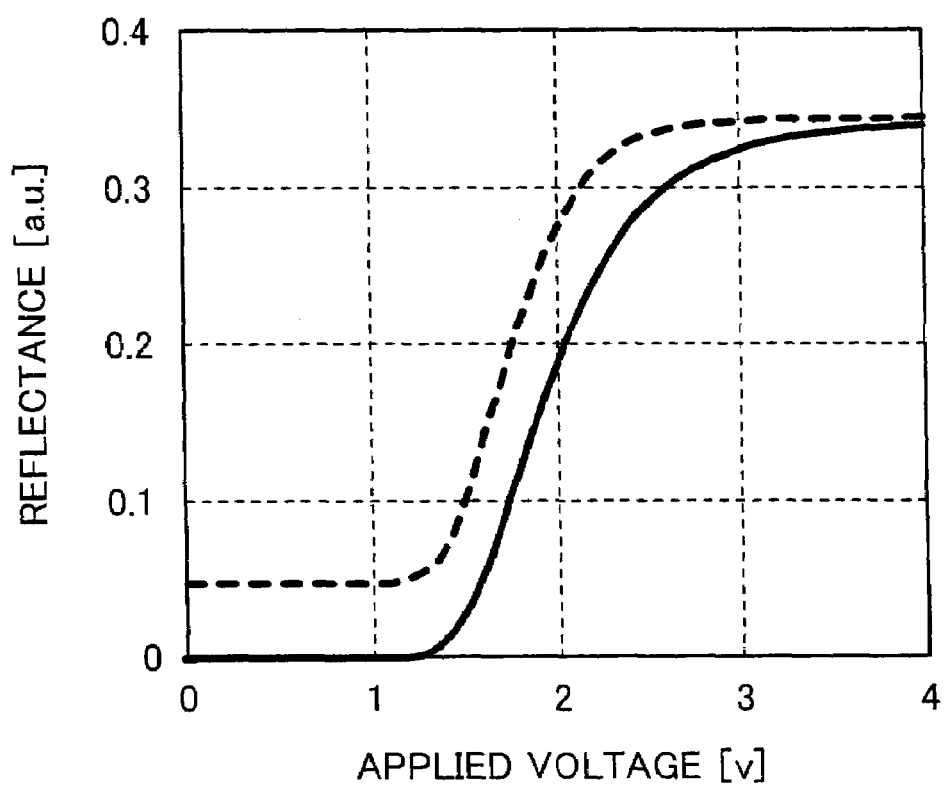
FIG. 30 is a drawing for illustrating the properties regarding an alternatively-arranged display of Eighth Embodiment shown in FIG. 23.
Figure 32:
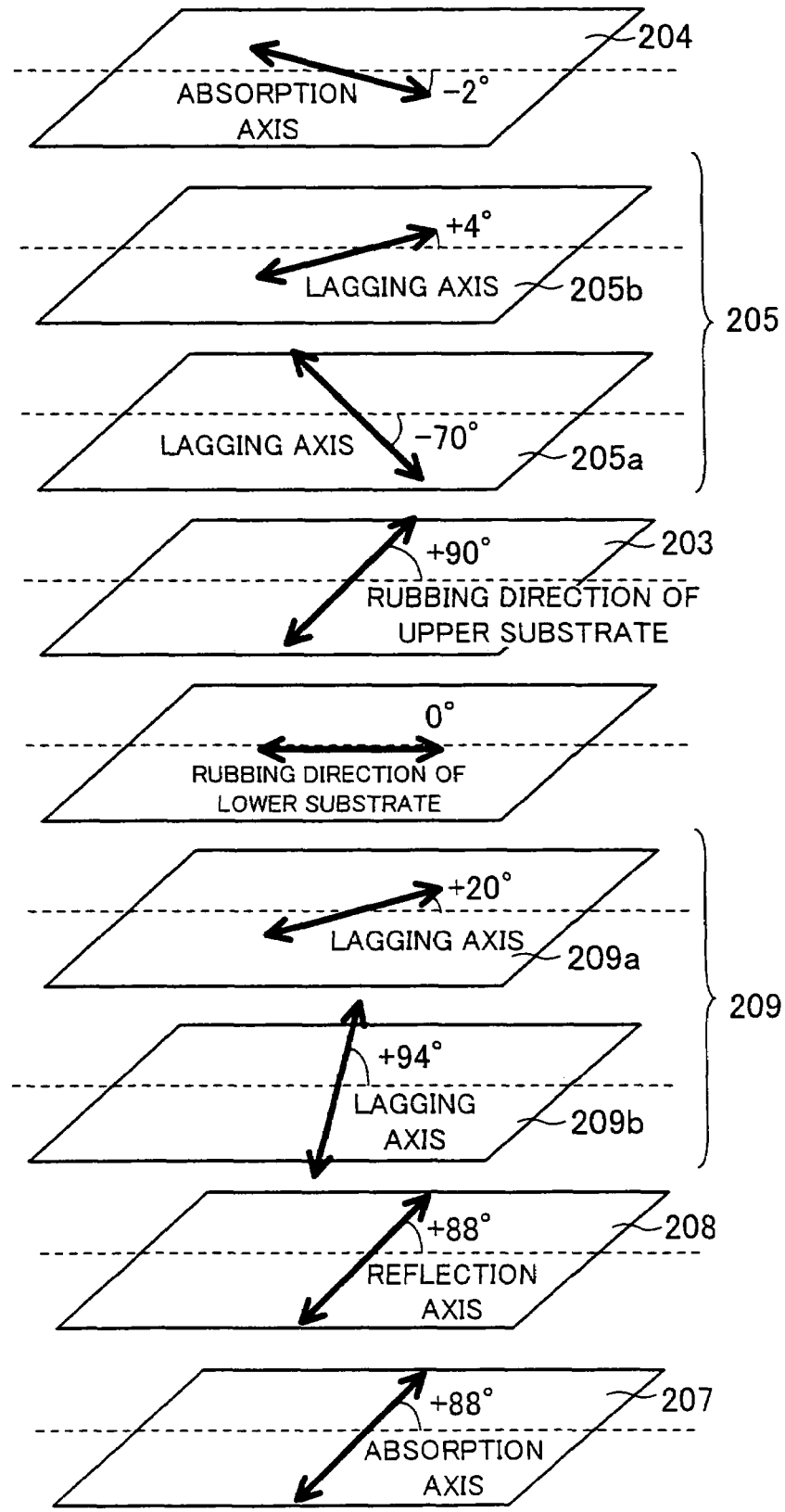
FIG. 32 shows the directions of the optical axes of the alternatively-arranged display of Eighth Embodiment shown in FIG. 23.

As an example, FIG. 32 shows the respective angles of the optical axes in the case of adopting (i) a first optical compensation element 205 made up of an optical compensation element 205a having the retardation of 138 nm and an optical compensation element 205b having the retardation of 275 nm and (ii) a second optical compensation element 209 made up of an optical compensation element 209a having the retardation of 138 nm and an optical compensation element 209b having the retardation of 275 nm. In this case, the ratio of contrast of the reflective image reproduction is further increased. The electro-optical characteristics in this case are shown in FIG. 30. In the figure, a full line indicates the characteristics of the liquid crystal display 200 arranged as in FIG. 32, while a dotted line indicate the characteristics of a conventional display not adopting optical compensation elements, as a comparative example.

Ninth Embodiment

Figure 33:
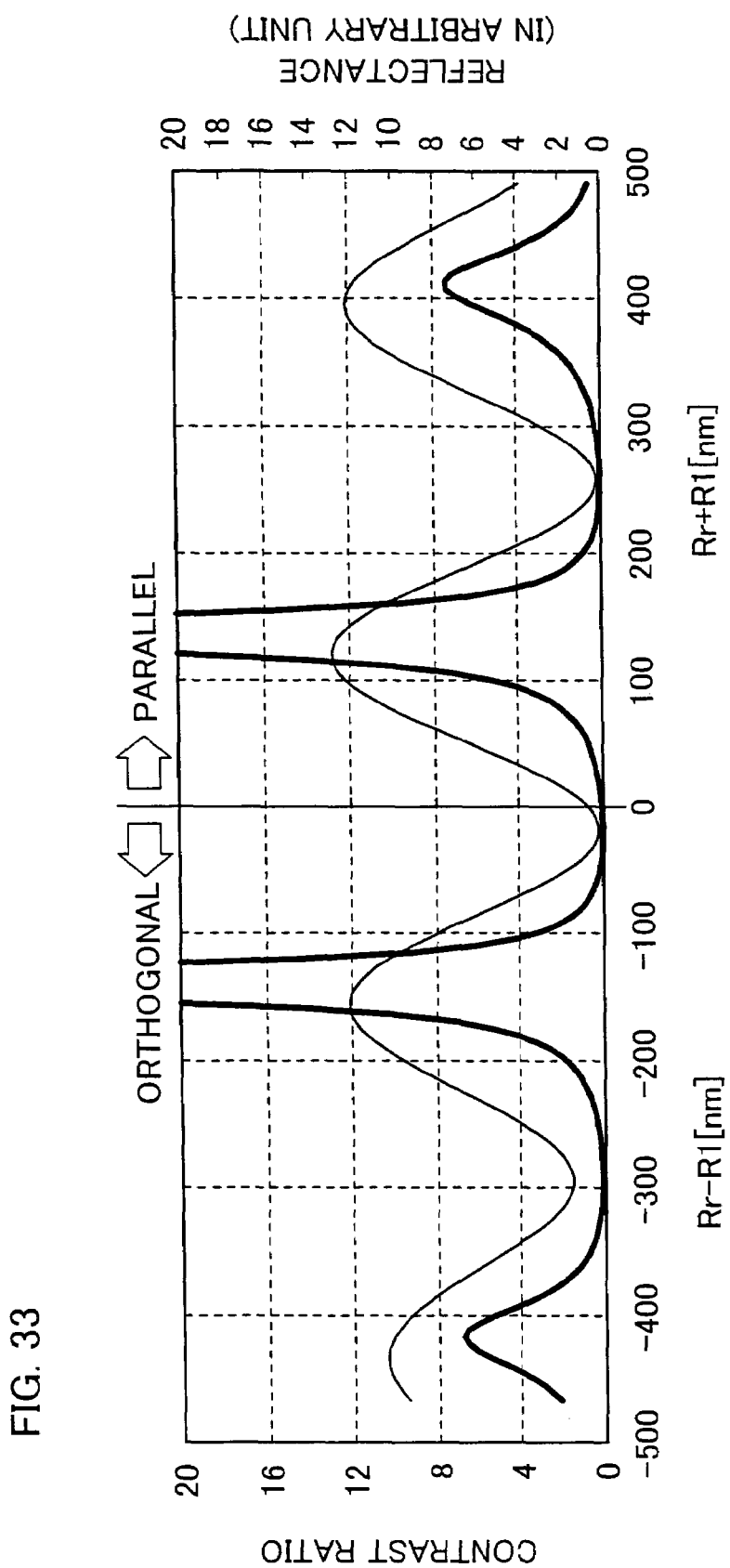
FIG. 33 is a first graph, showing properties of the display of Ninth Embodiment shown in FIG. 23.
Figure 41:
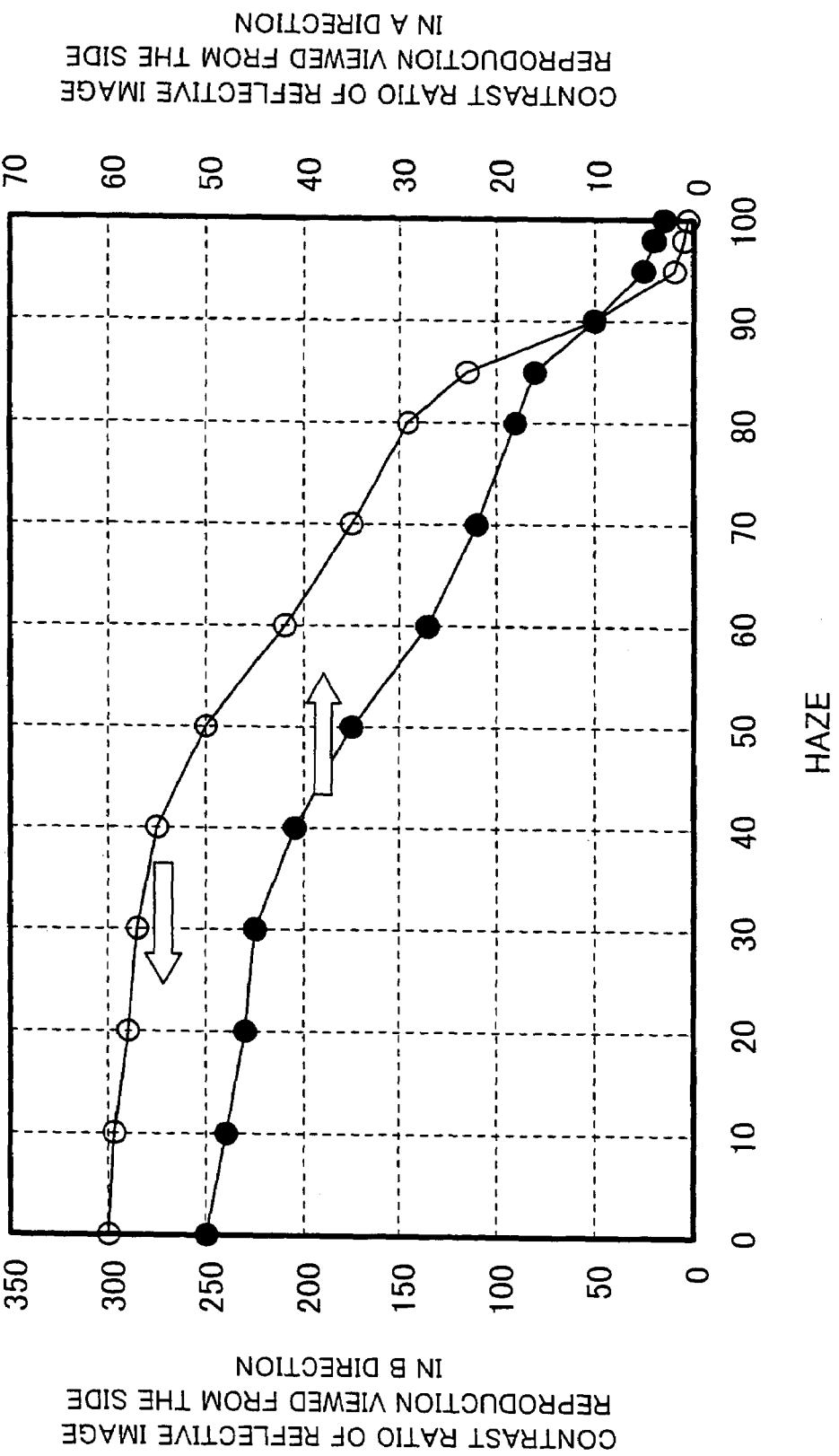
FIG. 41 is an eighth graph, showing properties of the display of Ninth Embodiment shown in FIG. 23.

The following will describe still another embodiment of the present invention with reference to FIGS. 23, 33, and 41.

A display of the present embodiment is identical with the liquid crystal display 200 in FIG. 23, except that the liquid crystal layer 203 is homogeneous aligned. The liquid crystal layer 203 of the present embodiment is, for instance, ECB (Electricalcontrolled birefringence) liquid crystal, and causes polarized light being incident thereon and passing therethrough to have a phase difference. In the present case, the liquid crystal layer 203 receives no voltage or a sufficiently low voltage so as to impart a phase difference of about λ/2 to the polarized light in the first area 220, and impart a phase difference of about λ/4 to the polarized light in the second area 219.

Now, a general optical arrangement of this liquid crystal display 200 is discussed. The liquid crystal display 200 of the present embodiment can realize the image reproduction with good quality in both the reflective image reproduction viewed from the side in the A direction and the transmission image reproduction viewed from the side in the B direction. In the case of the reflective image reproduction viewed from the side in the A direction, the viewer watches both the first and second areas 220 and 219 of the liquid crystal display 200. Meanwhile, in the case of the transmission image reproduction viewed from the side in the B direction, the viewer watches only the first area 220. In other words, the second area 219 contributes only to the reflective image reproduction viewed from the side in the A direction, while the first area 220 contributes to both the reflective image reproduction viewed from the side in the A direction and the transmission image reproduction viewed from the side in the B direction.

First, the reflective image reproduction in the second area 219 was examined.

The liquid crystal display 200 was manufactured in such a manner that the cell thickness of the liquid crystal layer 203 in the second area 219 was 2.5 μm and the cell thickness of the liquid crystal layer 203 in the first area 220 was 5.0 μm. The first glass substrate 201 and second glass substrate 202 were parallel aligned, and a liquid crystal composition in which Δn=0.065 was filled up using methods such as vacuum filing.

The reflective image reproduction in the second area 219 of the liquid crystal display 200 arranged as above was examined as below. A retardation R1 of the first optical compensation element (optical compensation means, first optical compensation means) 205 was varied, and the reflectance and the ratio of contrast were measured when the lagging axis of the first optical compensation element 205 is orthogonal to the director of liquid crystal molecules of the liquid crystal layer 203. The results of this measurement are illustrated in FIG. 33. The retardation of the liquid crystal layer 203 is in the state of no voltage application, which is a state when the lowest voltage (OFF voltage) among the drive voltages is applied to the liquid crystal layer 203. The retardation of the liquid crystal layer 203 in the second area 219 is referred as Rr. A part Rr−R1 indicates a case when the lagging axis of the first optical compensation element 205 is orthogonal to the director of the liquid crystal molecules. In this part, a phase difference corresponding to a retardation smaller than the retardation Rr of the liquid crystal layer 203 by a retardation R1 of the first optical compensation element 205 is imparted to passing light.

If the reflectance is not less than 8% and the ratio of contrast is not less than 5, the image reproduction can be suitably carried out. In FIG. 33, both of the reflectance indicated by a narrow full line and the ratio of contrast indicated by a wide full line satisfy the above-mentioned values only in particular regions, namely (i) in a region where the lagging axis of the first optical compensation element 205 and the director of liquid crystal molecules are orthogonal to each other and Rr−R1 is in the range of not less than −175 nm and not more than −105 nm and (ii) in a region where the lagging axis of the first optical compensation element 205 and the director of liquid crystal molecules are orthogonal to each other and Rr+R1 is in the range of not less than 100 nm and not more than 170 nm. In these cases, the ellipticity of the polarized light on the reflector 218 formed on the second area 219 is not less than 0.7.

Now, FIGS. 34-37 show the transmittance and the ratio of contrast of the transmission image reproduction viewed from the side in the B direction and with no voltage application to the liquid crystal layer 203, when the retardation R2 of the second optical compensation element (optical compensation means, second optical compensation means) 209 is varied in two regions where the Rr−R1 is optimum, namely when Rr−R1=1137 nm or Rr+−R1=133 nm. The words "orthogonal" and "parallel" above the graphs in FIGS. 34-37 indicate the relationship between the lagging axis of the second optical compensation element 209 and the director of liquid crystal molecules in the liquid crystal layer 203. In these figures, the retardation Rt of the liquid crystal layer 203 in the first area 220 varies in accordance with the retardation Rr of the liquid crystal layer 203 in the second area 219 and the difference of the thickness of the liquid crystal layer 203.

Figure 34:
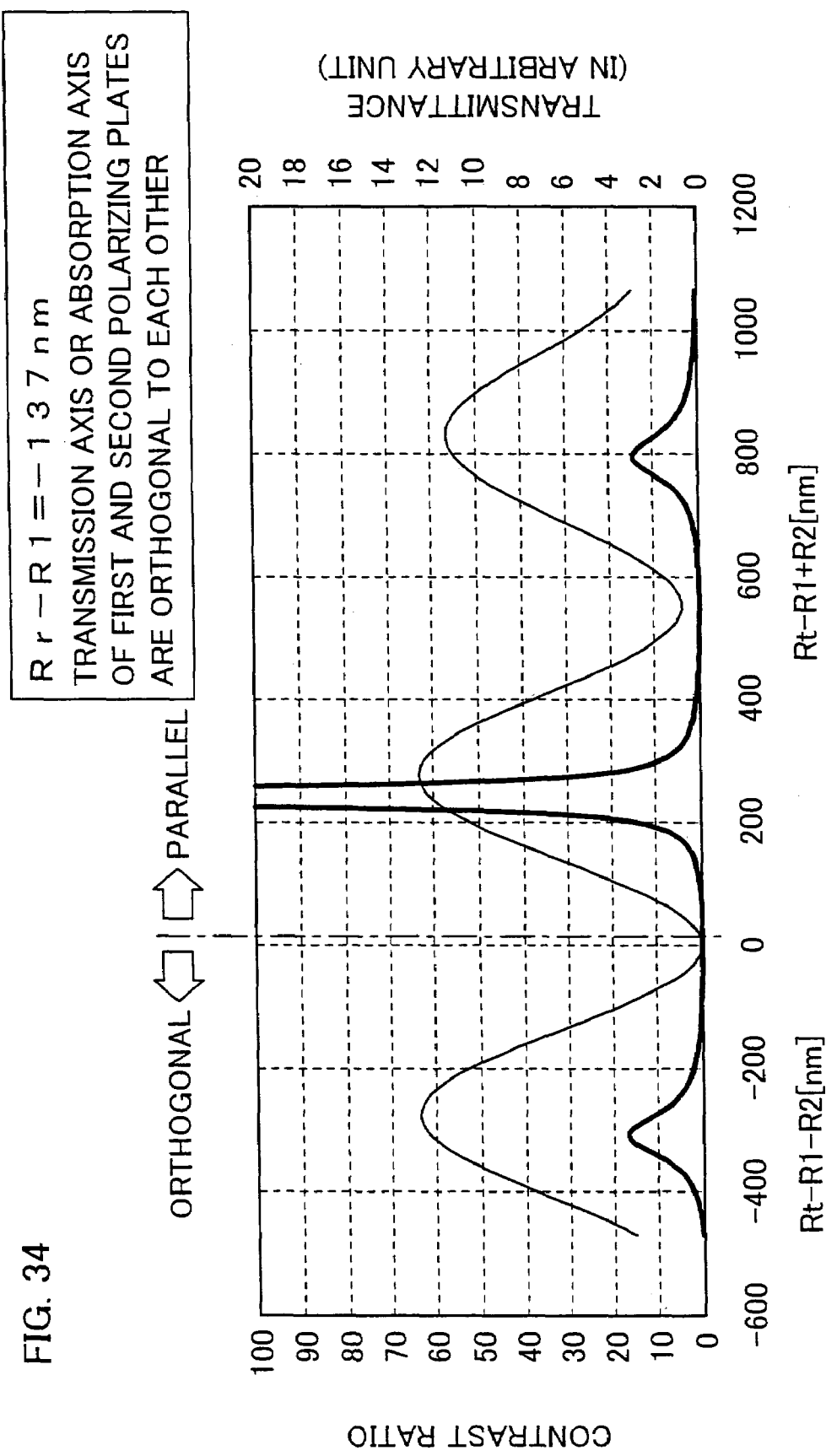
FIG. 34 is a second graph, showing properties of the display of Ninth Embodiment shown in FIG. 23.

FIG. 34 shows a graph when Rr−R1=137 nm and the transmission axes or absorption axes of the first and second polarizing plates 204 and 207 are orthogonal to each other.

Figure 35:
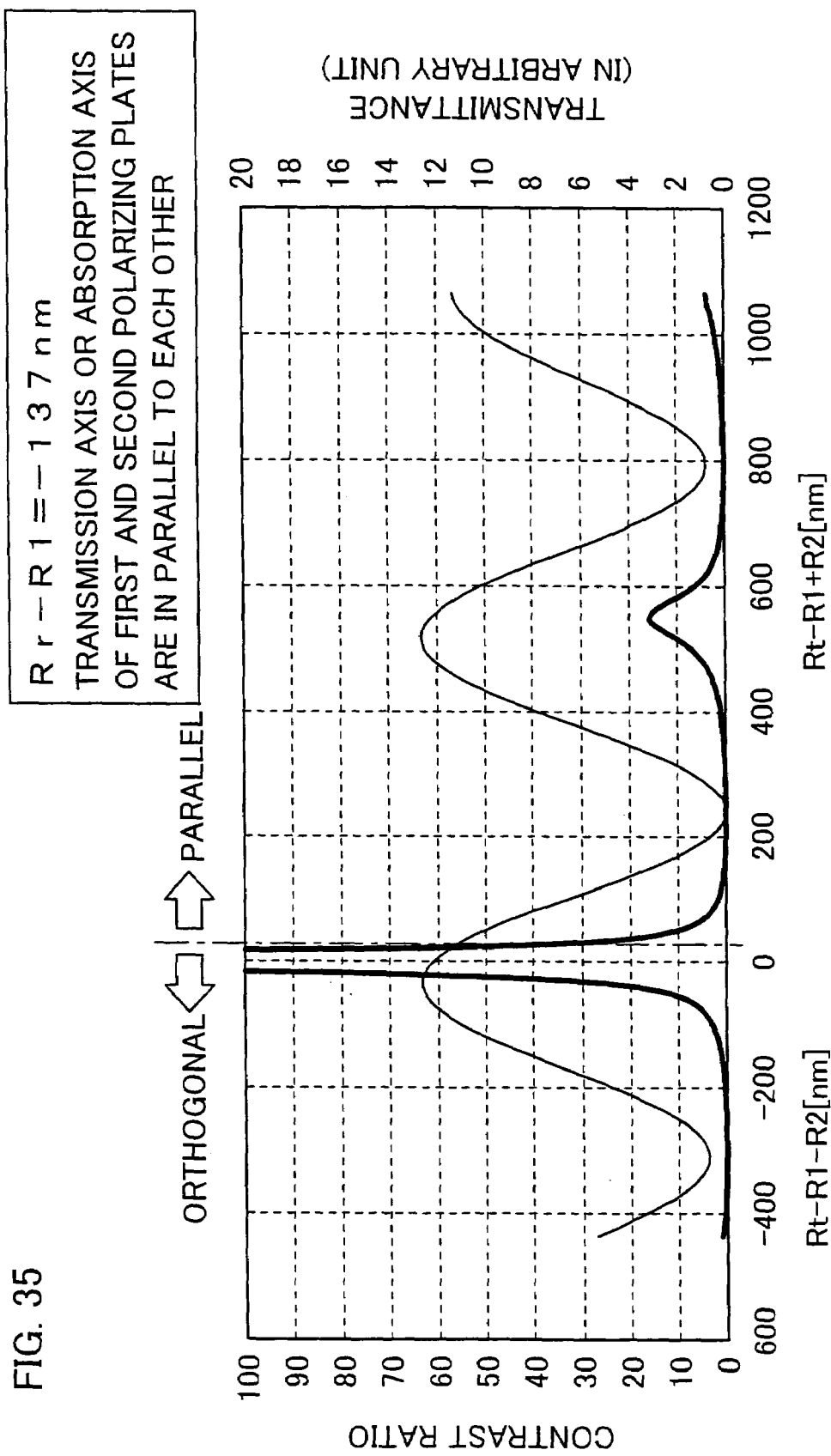
FIG. 35 is a third graph, showing properties of the display of Ninth Embodiment shown in FIG. 23.

FIG. 35 shows a graph when Rr−R1=−137 nm and the transmission axes or absorption axes of the first and second polarizing plates 204 and 207 are in parallel to each other. FIGS. 34 and 35 show the results of the measurement of transmittance and ratio of contrast, when the lagging axis of the second optical compensation element 209 is orthogonal to the director of liquid crystal molecules or when the lagging axis of the second optical compensation element 209 is in parallel to the director of liquid crystal molecules. The region of Rt−R1−R2 indicates a case when the lagging axis of the second optical compensation element 209 is orthogonal to the director of liquid crystal molecules, while the region of Rt−R1+R2 indicates a case when the lagging axis of the second optical compensation element 209 is in parallel to the director of liquid crystal molecules. In these examples, the image reproduction is suitably carried out when the transmittance is not less than 8% and the ratio of contrast is not less than 10.

In FIG. 34, both of the transmittance indicated by a narrow full line and the ratio of contrast indicated by a wide full line satisfy the above-mentioned values only in a particular region, namely in a region where the lagging axis of the second compensation element 209 is in parallel to the director of liquid crystal molecules and Rt−R1+R2 is not less than 190 nm and not more than 300 nm.

In FIG. 35, both of the transmittance indicated by a narrow full line and the ratio of contrast indicated by a wide full line satisfy the above-mentioned values only in particular regions, namely 9 in a region where the lagging axis of the second compensation element 209 is in parallel to the director of liquid crystal molecules and Rt−R1+R2 is not less than 25 nm and not more than 50 nm, and (ii) in a region where the lagging axis of the second compensation element 209 is orthogonal to the director of liquid crystal molecules and Rt−R1−R2 is not less than −50 nm and not more than 25 nm.

Figure 36:
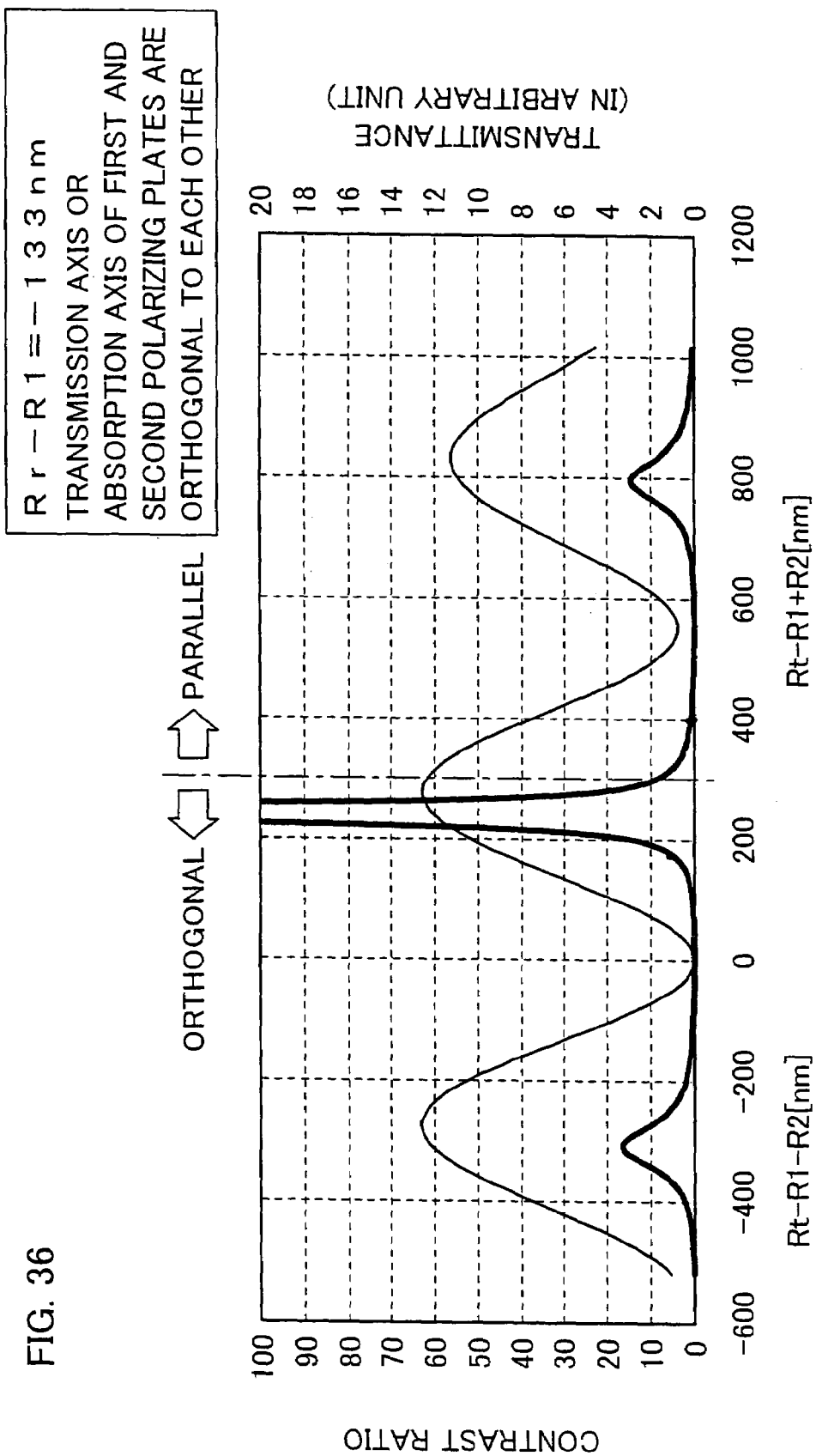
FIG. 36 is a fourth graph, showing properties of the display of Ninth Embodiment shown in FIG. 23.
Figure 37:
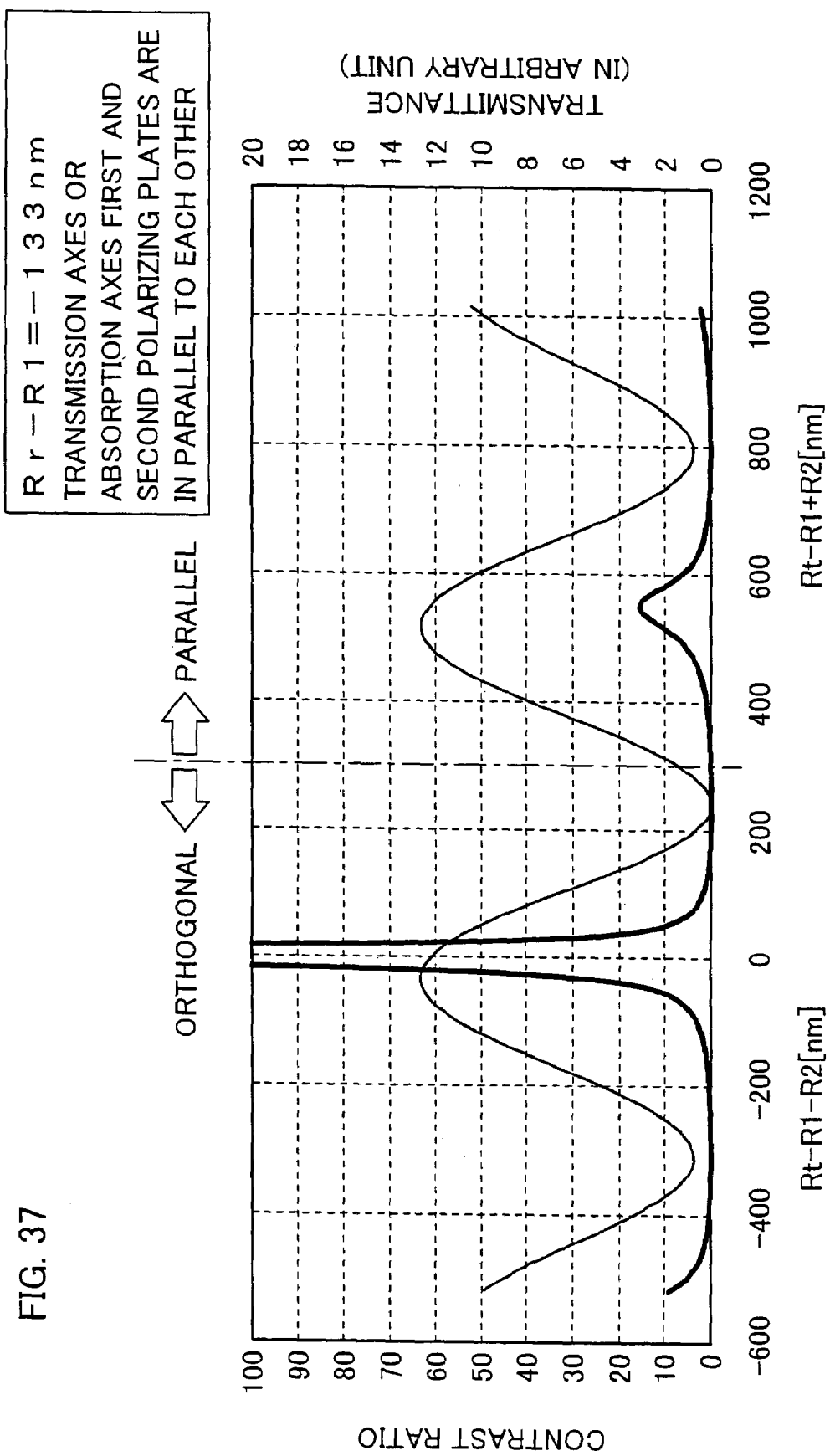
FIG. 37 is a fifth graph, showing properties of the display of Ninth Embodiment shown in FIG. 23.

FIG. 36 shows the result of a case when Rr+R1=133 nm and the transmission axes or absorption axes of the first and second polarizing plates 204 and 207 are orthogonal to each other. FIG. 37 also shows the result of a case when Rr+R1=133 nm and the transmission axes or absorption axes of the first and second polarizing plates 204 and 207 are orthogonal to each other. Now, the transmittance and the ratio of contrast are measured in a case when the lagging axis of the second optical compensation element 209 is orthogonal to the directors of liquid crystal molecules, and when the lagging axis of the second optical compensation element 209 is in parallel to the directors of liquid crystal molecules. The region of Rt−R1−R2 indicates the case when the lagging axis of the second optical compensation element 209 is orthogonal to the directors of liquid crystal molecules, while the region of Rt−R1+R2 indicates the case when the lagging axis of the second optical compensation element 209 is in parallel to the directors of liquid crystal molecules. In these examples, the image reproduction is suitably carried out when the transmittance is not less than 8% and the ratio of contrast is not less than 10.

In FIG. 36, both of the transmittance indicated by a narrow full line and the ratio of contrast indicated by a wide full line satisfy the above-mentioned values only in a particular region, namely in a region where the lagging axis of the second compensation element 209 is orthogonal to the director of liquid crystal molecules and Rt−R1−R2 is not less than 190 nm and not more than 300 nm.

In FIG. 37, both of the transmittance indicated by a narrow full line and the ratio of contrast indicated by a wide full line satisfy the above-mentioned values only in a particular region, namely in a region where the lagging axis of the second compensation element 209 is orthogonal to the director of liquid crystal molecules and Rt−R1−R2 is not less than −50 nm and not more than 50 nm.

Note that, FIGS. 34-37 simultaneously show the characteristics of the transmission image reproduction viewed from the side in the B direction of the first area 220 and the characteristics of the reflective image reproduction viewed from the side in the A direction of the first area 220. Since the tones the reflective image reproduction viewed from the side in the A direction are in contrast to the tones of the transmission image reproduction viewed from the side in the B direction, the characteristics of the transmission image reproduction viewed from the side in the B direction of the first area 220 is good when the characteristics of the reflective image reproduction viewed from the side in the A direction of the first area 220 is good.

In the present embodiment, the retardation Rr of the liquid crystal layer 203 in the second area 219 is set so as to be 162.5 nm and the retardation Rt of the liquid crystal layer 203 in the first area 220 is set so as to be 325 nm. However, the retardations Rr and Rt are not limited to these values.

Now, specific values in the optical arrangement of the liquid crystal display 200 will be discussed. As in the case above, the liquid crystal display 200 was manufactured in such a manner that the cell thickness of the liquid crystal layer 203 in the second area 219 was 2.5 µm and the cell thickness of the liquid crystal layer 203 in the first area 220 was 5.0 µm, the first glass substrate 201 and second glass substrate 202 were parallel aligned, and a liquid crystal composition in which Δn=0.065 was filled up using methods such as vacuum filing. Furthermore, as the first optical compensation element 205, a polymer film which is made of PVA (polyvinyl alcohol) and has the retardation R1 of 300 nm is adopted, and the first optical compensation element 205 is disposed so that the director of liquid crystal molecules and the lagging axis of the first optical compensation element 205 forms an angle of 90 degrees.

Figure 38:
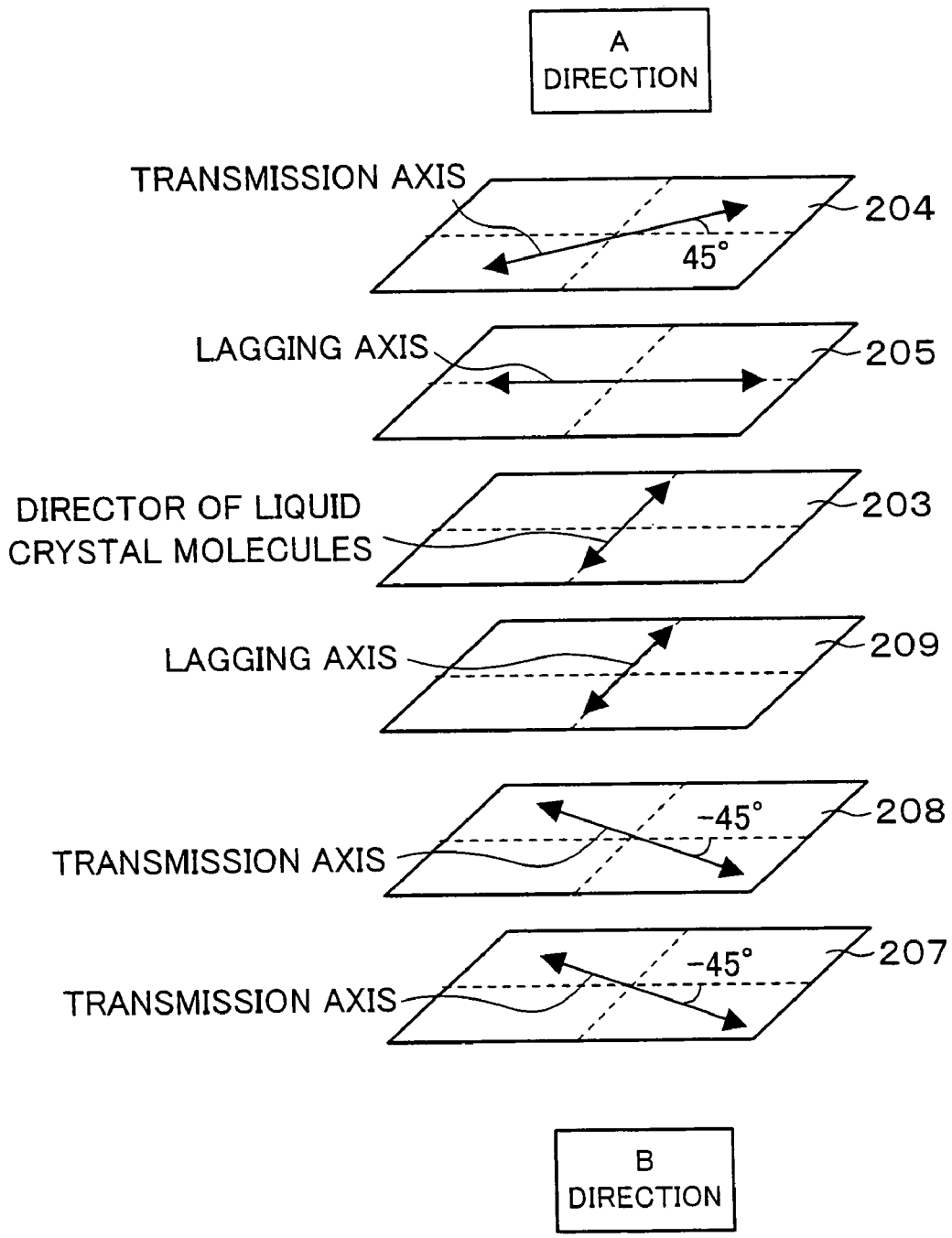
FIG. 38 shows the directions of the optical axes of the display of Ninth Embodiment shown in FIG. 23.

As the second compensation element 209, moreover, a polymer film which is made of PVA (polyvinyl alcohol) and has the retardation R2 of 220 nm was adopted, and the second optical compensation element 205 was disposed so that the director of liquid crystal molecules and the lagging axis of the second optical compensation element 205 formed an angle of 0 degree. As FIG. 38 illustrates, the members were disposed to meet the following conditions: The transmission axis of the first polarizing plate 204 and the lagging axis of the first optical compensation element 205 forms an angle of 45 degrees, the transmission axis of the polarizing selective reflector 208 is in conformity to the transmission axis of the second polarizing plate 207, and these transmission axes are orthogonal to the transmission axis of the first polarizing plate 204.

Alternatively, the members may be disposed to meet the following conditions: The absorption axis of the first polarizing plate 204 and the lagging axis of the first optical compensation element 205 forms an angle of 45 degrees, the reflection axis of the polarizing selective reflector 208 is in conformity to the absorption axis of the second polarizing plate 207, and these absorption axes are orthogonal to the absorption axis of the first polarizing plate 204.

Now, the following will show the result of the measurement of display properties of the liquid crystal display 200 adopting the foregoing optical arrangement.

Figure 39:
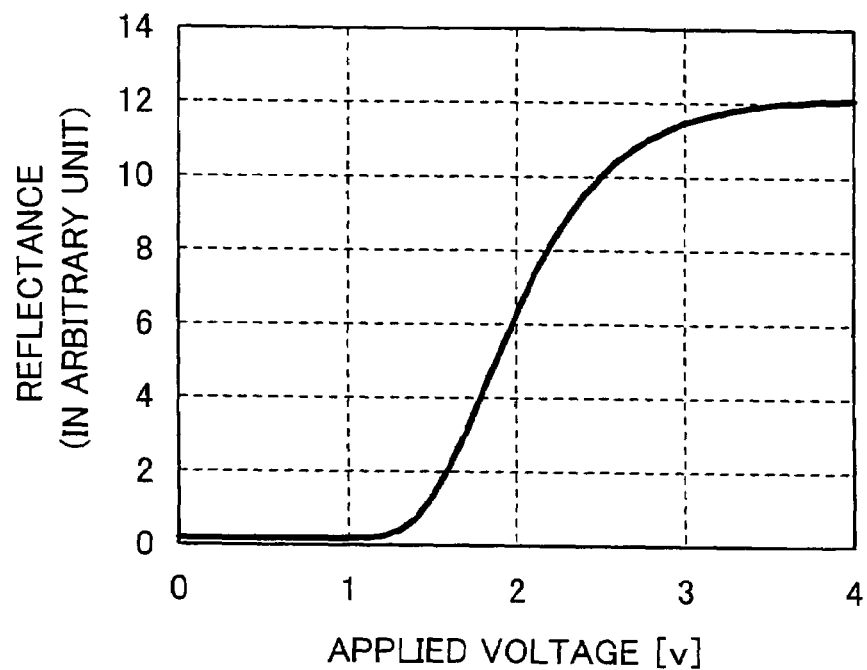
FIG. 39 is a sixth graph, showing properties of the display of Ninth Embodiment shown in FIG. 23.
Figure 40:
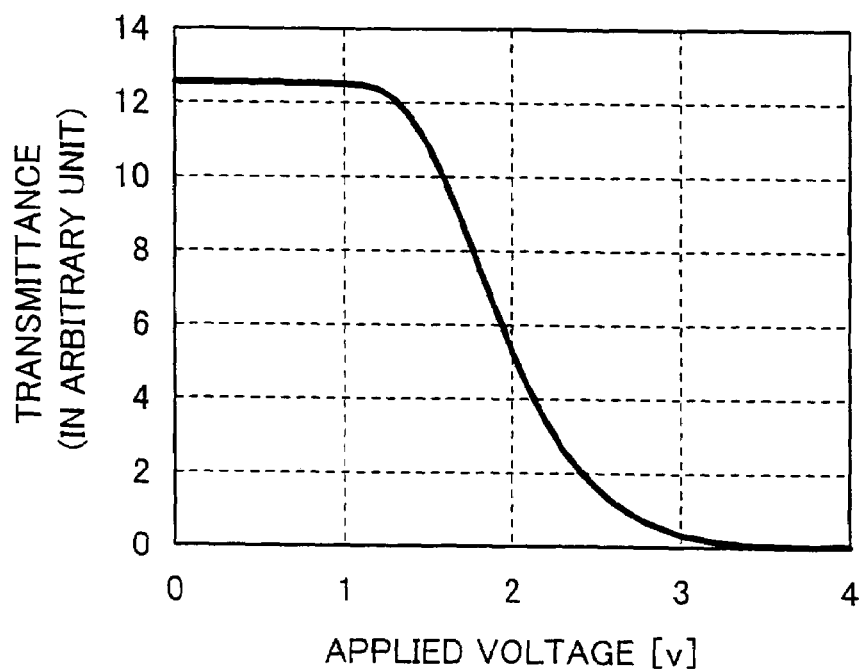
FIG. 40 is a seventh graph, showing properties of the display of Ninth Embodiment shown in FIG. 23.

The electro-optical characteristics of the reflective image reproduction viewed from the side in the A direction is shown in FIG. 39, and the electro-optical characteristics of the transmission image reproduction viewed from the side in the B direction is shown in FIG. 40. FIG. 39 shows the relationship between a voltage applied to the liquid crystal layer 203 and the reflectance, while FIG. 40 shows the relationship between a voltage applied to the liquid crystal layer 203 and the transmittance. These figures indicate that both of the reflective image reproduction in FIG. 39 and the transmission image reproduction in FIG. 40 are sufficiently bright and has sufficient ratio of contrast. The reflective image reproduction viewed from the side in the A direction appears normally-black, while the transmission image reproduction viewed from the side in the B direction appears normally-white. However, since the liquid crystal display 200 of the present embodiment is arranged so that the viewing is always carried out either from the side in the A direction or from the side in the B direction, the tones of the image reproduction are suitably reversed using a button for image reversal. Note that, buttons for laterally reversing images and for vertically reversing images may be additionally provided.

In the above-described liquid crystal display 200, a value Δε indicating the dielectric anisotropy of the liquid crystal layer 203 is positive, and when the reflective image reproduction viewed from the side in the A direction is black display, an OFF voltage, i.e. the lowest voltage among drive voltages is applied to the liquid crystal layer 203. On this occasion, the light incident on the first area 220 from the side in the A direction becomes, on the polarizing selective reflector 208, either elliptically polarized light or linearly polarized light which has a major axis in parallel to the transmission axis of the polarizing selective reflector 208. Furthermore, the light incident on the second area 219 becomes, on the reflector 218, either elliptically polarized light or circularly polarized light. Consequently, the reflective image reproduction using both the first and second areas 220 and 219 can realize high-quality black display by precisely causing these areas to carry out identical black display.

In the meantime, when the value Δε in the liquid crystal layer 203 is negative, an ON voltage, i.e. the highest voltage among the drive voltages, is applied to the liquid crystal layer 203 on the occasion when the reflective image reproduction viewed from the side in the A direction is black display. On this occasion, the light incident on the first area 220 from the side in the A direction becomes, on the polarizing selective reflector 208, either elliptically polarized light or circularly polarized light which has a major axis in parallel to the transmission axis of the polarizing selective reflector 208. Furthermore, the light incident on the second area 219 becomes, on the reflector 218, either elliptically polarized light or circularly polarized light. Consequently, the reflective image reproduction using both the first and second areas 220 and 219 can realize high-quality black display by precisely causing these areas to carry out identical black display. Here, assume that the above-mentioned relationships between the retardations Rr, Rt, R1, and R2 are obtained in the state of applying the ON voltage to the liquid crystal layer 203.

Note that, the control of the ellipticity of the elliptically polarized light described above is not always identical with that of Eighth Embodiment.

Next, the following will describe how the light scattering layer 206 included in the liquid crystal display 200 functions.

The liquid crystal display 200 of the present embodiment uses, in the case of the transmission image reproduction viewed from the side in the B direction, not only the light from the front light but also the ambient light coming from behind the front light. Thus, on the contrary to conventional transmission liquid crystal displays, the liquid crystal display 200 of the present embodiment can realize high-quality transmission image reproduction even in a well-lighted place. However, when the ambient light is incident on the first area 220 of the liquid crystal display 200 but passes therethrough without scattering, the tones of the ambient light, e.g. the patterns of a table or a floor in doors and the patterns of the ground in the open air are overlapped on the image reproduction. That is to say, the quality of image reproduction significantly decreases as if a table, floor, or ground is viewed through a transparent glass. To impart light-scattering characteristic to the liquid crystal display 200 in order to avoid the problem, the light scattering layer 206 is included in the liquid crystal display 200. Note that, this light scattering layer 206 has a suitable scattering intensity in order not to decrease the ration of contrast.

When the overall haze of the liquid crystal display 200 is too high, the ratio of contrast decreases so that the frontal luminance decreases, both in the reflective image reproduction viewed from the side in the A direction and in the transmission image reproduction viewed from the side in the B direction. Furthermore, displayed images are significantly blurred when the reflective image reproduction is viewed from the side in the A direction. Taking these into consideration, the haze optimum for the liquid crystal display 200 of the present embodiment was examined as below. According to the examination, the overlapping due to the ambient light was more or less eliminated when the haze was 50, and even if high-contrast patterns are overlapped on the image reproduction, the overlapping was eliminated when the haze was 60. FIG. 41 shows the result of the examination of the ratio of contrast in the reflective image reproduction viewed from the side in the A direction and the ratio of contrast of the transmission image reproduction viewed from the side in the B direction, when a light scattering layer causing various types of hazes is provided in a display identical with that of FIG. 23.

When the overall haze of the display was low, the foregoing problem occurred due to the above-mentioned reason, even if the ratio of contrast was high. Meanwhile, when the haze was more than 90, the contrast significantly decreased so as to be impractical. As described above, the image reproduction was suitably carried out when the ratio of contrast in the reflective image reproduction was not less than 5 or when the ratio of contrast in the transmission image reproduction was not less than 10. Thus, it is preferable that the haze is 95 at the maximum.

As a result of the above-described examination, it has been found that the overlapping and the decrease of the ratio of contrast due to the ambient light can be eliminated when the overall haze of the display is not less than 50 and not more than 95, more preferably not less than 60 and not more than 90.

For this reason, the light scattering layer 206 is preferably disposed so that the overall haze of the display is not less than 50 and not more than 95, more preferably not less than 60 and not more than 90. Alternatively, it is possible to do without the light scattering layer 206 by imparting a light scattering characteristic to members such as the color filter 210a, first glass substrate 101, second glass substrate 202, and insulating resin layer 216.

Next, the relationship between the location of the light scattering layer 206 and display properties will be discussed.

Table. 1 shows the result of the measurement of the ratio of contrast in the liquid crystal display 200, when the light scattering layer 206 was provided in the A direction of the liquid crystal layer 203 and when the light scattering layer 206 was provided in the B direction of the liquid crystal layer 203.

TABLE 1

| | REFLECTIVE IMAGE REPRODUCTION VIEWED FROM THE SIDE IN THE A DIRECTION | TRANSMISSION IMAGE REPRODUCTION VIEWED FROM THE SIDE IN THE B DIRECTION |
| --- | --- | --- |
| PROVIDED IN THE A DIRECTION | 17 | 120 |
| PROVIDED IN THE B DIRECTION | 30 | 20 |
| NO LIGHT SCATTERING LAYER IS PROVIDED | 30 | 150 |

Note that, in this case, the haze of the light scattering layer 206 was 80. When the light scattering layer 206 is provided in the A direction of the liquid crystal layer 203, while the ratio of contrast of the reflective image reproduction viewed from the side in the A direction was low, the transmission image reproduction viewed from the side in the B direction was high. Thus, the ratio of contrast of the transmission image reproduction significantly decreased, compared to the ratio of contrast of the reflective image reproduction. In the meantime, when the light scattering layer 206 was provided in the B direction of the liquid crystal layer 203, while the ratio of contrast of the reflective image reproduction viewed from the side in the A direction was high, the ratio of contrast of the transmission image reproduction viewed from the side in the B direction significantly decreased. In practice, priorities should be given to the transmission image reproduction. Thus, it was found out that the liquid crystal display 200 can deliver better performances when the light scattering layer 206 is provided in the A direction of the liquid crystal layer 203.

It is noted that the ambient light can be utilized for the transmission image reproduction viewed from the side in the B direction. In this case, since, in some cases, the ambient light includes a lot of polarized light components whose electric field oscillate in a horizontal direction, it is possible to improve the rate of utilization of the light by causing the transmission axis of the first polarizing plate 204 to be substantially in conformity to the horizontal direction with respect to the posture of the in-use liquid crystal display 200.

Tenth Embodiment

The following will describe still another embodiment of the present invention with reference to FIGS. 42-52. By the way, members having the same functions as those described in First Embodiment are given the same numbers, so that the descriptions are omitted for the sake of convenience.

Figure 42:
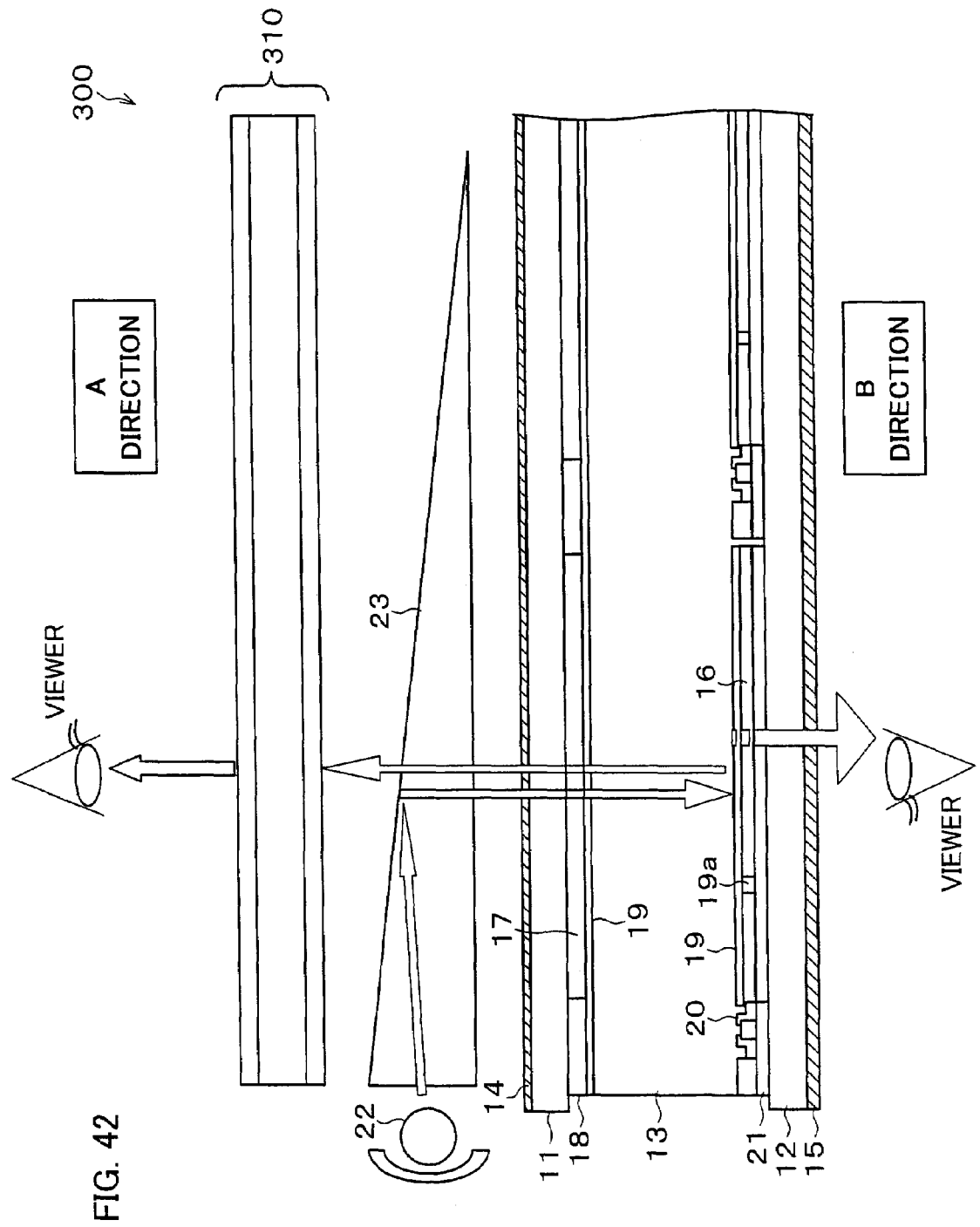
FIG. 42 is a cross section, illustrating a display of Tenth Embodiment of the present invention.

FIG. 42 is a cross section of a liquid crystal display (display) 300 of the present embodiment. This liquid crystal display 300 includes a first glass substrate 11, second glass substrate 12, liquid crystal layer 13, first polarizing plate 14, second polarizing plate 15, polarizing selective reflector 16, color filters 17, shading film 18, transparent electrodes 19, switching element 20, light absorbing layer 21, light source 22, light guiding plate 23, and light modulation mechanism 310. In short, the liquid crystal display 300 is identical with the liquid crystal display 1 of First Embodiment, except that the light modulation mechanism 310 is additionally provided.

This liquid crystal display 300 is arranged so that the liquid crystal layer 13 is sandwiched between the first and second glass substrates 11 and 12 which are a pair of transparent substrates, and the direction from the liquid crystal layer 13 towards the first glass substrate 11 is termed "A direction" (first direction), whereas the direction from the liquid crystal layer 13 towards the second glass substrate 12 is termed "B direction" (second direction). The liquid crystal display 300 is a double-sided display which can be viewed both in the A direction and in the B direction.

Such a double-sided display having two display screens, image reproduction can be viewed from the both sides of the display in all sorts of circumstances. It is noted that, however, when the light-state image reproduction is carried out on the one side, the dark-image reproduction is carried out on the other side, and vice versa. Thus, one can understand that the tones of the image reproduction viewed from one side are in contrast to the tones of the image reproduction viewed from the other side, with respect to identical display data. With no modification to these image reproductions in reverse to each other, the viewer on one side of the display views images in reverse to images viewed by the viewer on the other side of the display. When very intense light enters from the side of the transmission image reproduction, images whose tones are identical with those of images on the side of the transmission image reproduction but in reverse thereto from side to side can be viewed from the side of the reflective image reproduction.

In this manner, in conventional liquid crystal displays having two display screens, images on one screen can also be viewed on the other screen, and this has caused privacy issues. The present embodiment is done to solve this problem. To put it concretely, a display taking the privacy issues into consideration is realized in such a manner that, in the double-sided display, the light modulation mechanism 310 is provided in order to cause the unnecessary image reproduction on the back side not to be viewable.

The light modulation mechanism (light modulation means) 310 is disposed in the A direction of the light guiding plate 23. This light modulation mechanism 310 can change the direction of predetermined light, which passes through the liquid crystal display 300 on the side in the A direction, in a predetermined manner.

Concerning the light entering and going out from the liquid crystal display 300, the outgoing light is viewable in the image reproduction (including reversed image reproduction) on the side in the A direction or on the side in the B direction and moves away from the liquid crystal display 300, when the light modulation mechanism 310 is not provided. Such light moving away from the liquid crystal display 300 in the A direction is light moving in the A direction away from the first polarizing plate 14.

Concerning the light entering and going out from the liquid crystal display 300, the incoming light is light (i) before extracting a particular polarized light component for the image reproduction on the side in the A direction or on the side in the B direction therefrom and (ii) moving towards the inside of the liquid crystal display 300, when the light modulation mechanism 310 is not provided. Such light incident on the liquid crystal display 300 in the A direction is light moving in the A direction from the outside towards the first polarizing plate 14. Note that, in the following, the switching between a modulating state and an unmodulating state is carried out by the light modulation mechanism 310 in order to change the direction of the light. The light modulation mechanism 310 is provided at least on the side in the A direction or on the side in the B direction. In the following description, the light modulation mechanism 310 is provided on the side in the A direction.

When the liquid crystal display 300 is viewed from the side in the A direction, the light modulation mechanism 310 is caused to be in the unmodulating state with respect to the polarized light for the image reproduction on the side in the A direction, i.e. the light moving in the A direction from the first polarizing plate 14. In the unmodulating state, the light modulation mechanism allows both the light moving in the A direction away from the first polarizing plate 14 and the light moving from the side in the A direction to the first polarizing plate 14 to pass through. In this case, the image reproduction viewed from the side in the A direction can be carried out using the light from the front light or the ambient light reflected on the polarizing selective reflector 16.

In the meantime, when the liquid crystal display 300 is viewed from the side in the B direction, the light modulation mechanism 300 is caused to be in the modulating state with respect to the polarized light for the image reproduction on the side in the A direction, i.e. the light moving in the A direction away from the first polarizing plate 14. In the modulating state, the light modulation mechanism 310 modulates the light which moves in the A direction away from the first polarizing plate 14 so that the traveling state of the light is changed from a usual passing-through state to an alternative state, in order to prevent the image reproduction from being viewable from the side in the A direction. As to the light moving from the side in the A direction to the first polarizing plate 14, the light modulation mechanism 300 may let the light pass through or may modulate the light to be in the non-passing-through state. On this occasion, the image reproduction viewed from the side in the B direction can be performed using the ambient light or the light from the front light, which have passed through the polarizing selective reflector 16. However, when the light modulation mechanism 310 is in the modulating state, it is not possible from the side in the A direction to view reversed images of the images reproduced on the side in the B direction, so that the visibility of the images reproduced on the side in the B direction is reduced and hence the privacy issues can be resolved.

Now, the following will discuss a specific arrangement of the light modulation mechanism 310.

Figure 43:
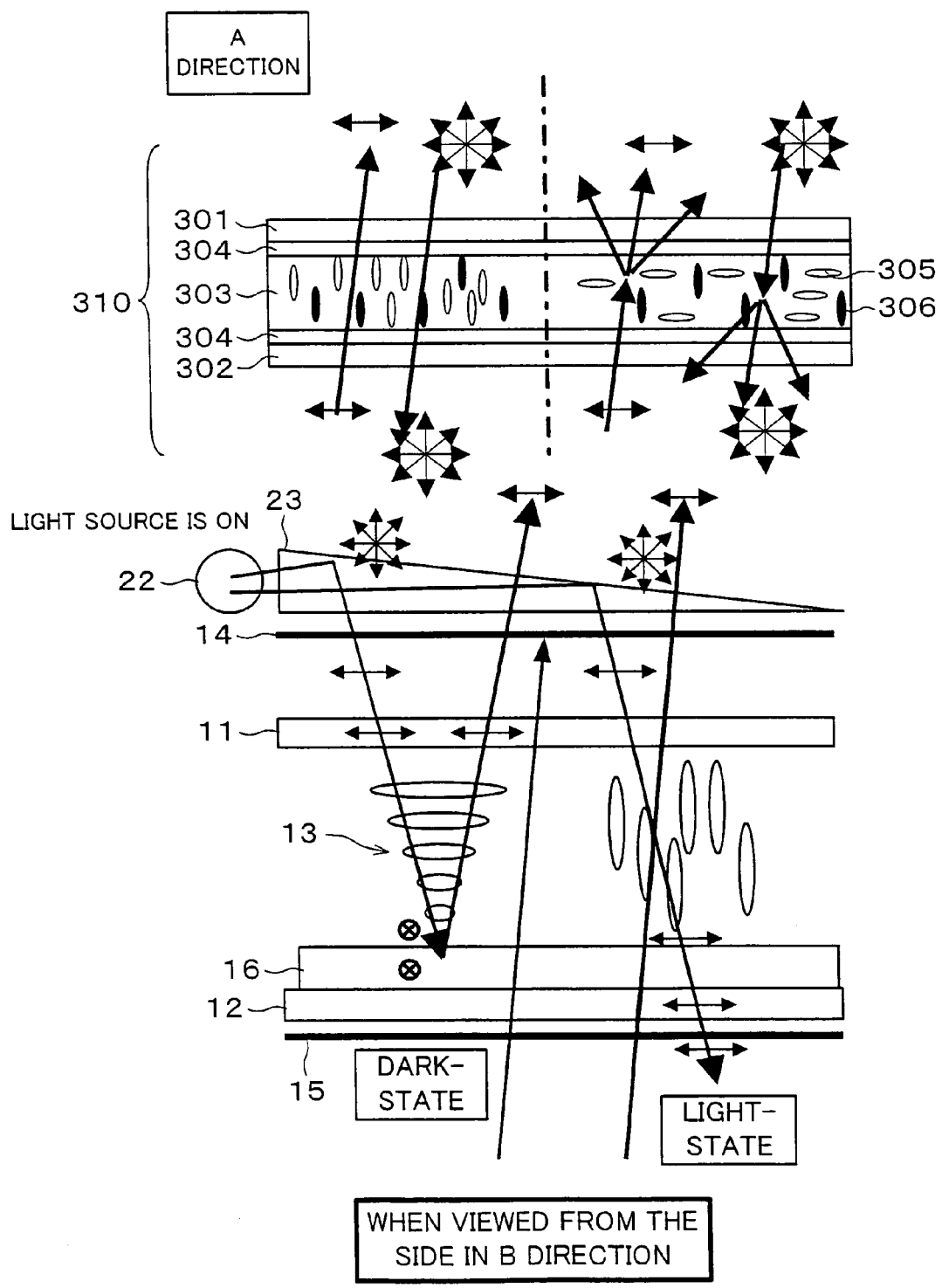
FIG. 43 is a cross section, clearly illustrating a light modulation mechanism of the display in FIG. 42.

The light modulation mechanism 310 shown in FIG. 43 is made up of a third glass substrate 301, fourth glass substrate 302, light scattering layer 303, and a pair of transparent electrodes 304. The order of these members in the B direction is as follows: the third glass substrate 301, transparent electrode 304, light scattering layer 303, transparent electrode 304, and fourth glass substrate 302.

The light scattering layer 303 is made of ultraviolet-curing polymer dispersed liquid crystal (PDLC), and the transparent electrodes 104 cover the whole screen. A prepolymer liquid crystal mixture of the ultraviolet-curing polymer dispersed liquid crystal is obtained, for instance, by adding a small amount of polymerization initiator (made by Ciba-Geigy AG) to a mixture as a result of mixing, in the weight ratio of 10:90, an ultraviolet-curing material (MixC (product name) made by DIC) and liquid crystal (ZLI-4318 (product name) made by Merck & Co., Inc) whose dielectric anisotropy is negative. The ultraviolet-curing polymer dispersed liquid crystal is obtained by polymerizing the prepolymer. On the transparent electrodes 304 on the both surfaces of the substrate in which liquid crystal is charged, homeotropic alignment films vertically aligned with respect to the liquid crystal are provided.

The traveling state of the light incident on the polymer dispersed liquid crystal layer manufactured as above is switched between the scattering state and passing-through state, in accordance with an applied electric field. In the present case, the liquid crystal layer let the light pass through, i.e. do not modulate the light when no voltage is applied to the layer, while the liquid crystal layer modulates the light when a voltage is applied to the layer.

In the above-mentioned example, the liquid crystal of the liquid crystal layer has a negative dielectric anisotropy and the homeotropic alignment film is adopted. It is noted that, however, the liquid crystal and alignment film are not necessarily limited to them, so that a liquid crystal material having a positive dielectric anisotropy and a horizontal alignment film may be adopted, and moreover, hybrid alignment and bend alignment may be adopted in some cases.

In FIG. 43, when viewed from the side in the B direction, unpolarized light which is either the ambient light or the light from the front light is changed to linearly polarized light as passing through the first polarizing plate 14. The first polarizing plate 14 allows linearly polarized light in the lateral (horizontal with respect to the figure) direction to pass through. This linearly polarized light optically rotates and twists for 90 degrees when passing through the liquid crystal layer 13, so as to become the linearly polarized light in the lateral (horizontal with respect to the figure) direction. When the transmission axis of the first polarizing plate 14 is in parallel to the transmission axis of the polarizing selective reflector 16, the linearly polarized light twists for 90 degrees in the liquid crystal layer 13, and then is incident on the polarizing selective reflector 16, in a manner orthogonal to the reflection axis of the polarizing selective reflector 16. Thus, the linearly polarized light is incident in a manner in parallel to the reflection axis of the polarizing selective reflector 16. The linearly polarized light incident on the reflection axis is reflected, and twists again for 90 degrees so as to become identical with the original linearly polarized light. Consequently, the light passes through the first polarizing plate 14.

In this manner, the light is caused not to pass through in the B direction so that the dark-state image reproduction is realized. On this occasion, light-state images are reproduced on the side in the A direction due to this passing polarized light. In the meantime, when the ambient light enters from the side in the B direction, this light passes through, as lateral linearly polarized light, the first polarizing plate 14, and the light having passed through the first polarizing plate 14 consequently produces light-state images on the A-oriented surface of the liquid crystal display 300.

Upon voltage application, the light scattering layer 303 is caused to be in the modulating state (cf. right side of FIG. 43) so that the light for light-state image reproduction passing in the A direction through the liquid crystal display 300 is subjected to forward scattering, and thus the images are blurred. The scattered ambient light, which is unpolarized, becomes a polarized light component in parallel to the figure, on the first polarizing plate 14. As a result, it is possible to use this light to perform the image reproduction on the side in the B direction. The degree of the reduction of the visibility of images by utilizing scattering depends on the resolution of the displayed images, a haze value of the light scattering layer 303 in the scattering state, and a distance d between the liquid crystal display 300 and light scattering layer 303. For this reason, the haze in the scattering state (問題なし) is preferably not less than 50.

Also, the rate of utilization of the ambient light for the image reproduction on the side in the B direction by adding the light modulation mechanism 310 depends on the all-light transmittance of the light scattering layer 303 in the scattering state, and hence the all-light transmittance is preferably not less than 50%.

Upon no voltage application, meanwhile, the light scattering layer 303 is in the non-modulating state (cf. left side of FIG. 43). Thus, the reflective image reproduction utilizing the light from the front light or the ambient light is viewable from the side in the A direction.

When the A-oriented screen is used as a standby screen, the light scattering layer 303 is preferably a so-called reverse PDLC as in the present embodiment, in order to reduce the power consumption. However, other types of PDLC may be adopted.

It is also possible to adopt the following arrangement: In sync with the switching between the image reproduction on the side in the A direction and the image reproduction on the side in the B direction, a voltage applied to the transparent electrodes 304 is changed so that the modulating state of the light modulation mechanism 310 is switched.

Furthermore, the light modulation mechanism 310 may be disposed between the light guiding plate 23 of the front light and the first polarizing plate 14. In this case, the light modulation mechanism 310 is disposed in the B direction of the light guiding plate 23. This light guiding plate 23 is light irradiation means for emitting light for image reproduction, and leads the light emitted from the light source 22 to the liquid crystal display 300. Since the light modulation mechanism 310 is disposed between the light guiding plate 23 and first polarizing plate 14, the light incident on the light modulation mechanism 310 is regarded as the light entering into or exiting from the liquid crystal display 300.

Figure 52:
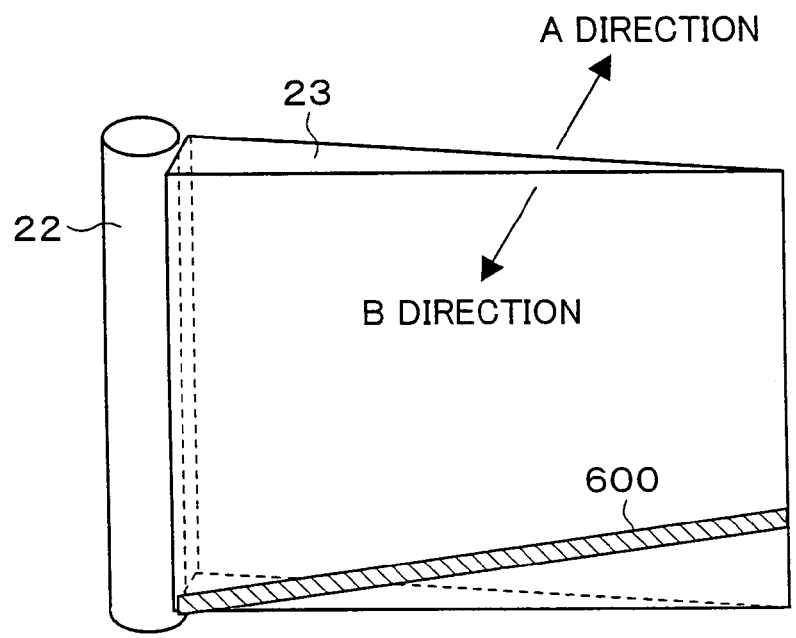
FIG. 52(a) is an oblique perspective view of a front light, for illustrating a dark line of the front light.
FIG. 52(b) is an oblique perspective view of the front light, for illustrating the dark line of the front light.
Figure 52:
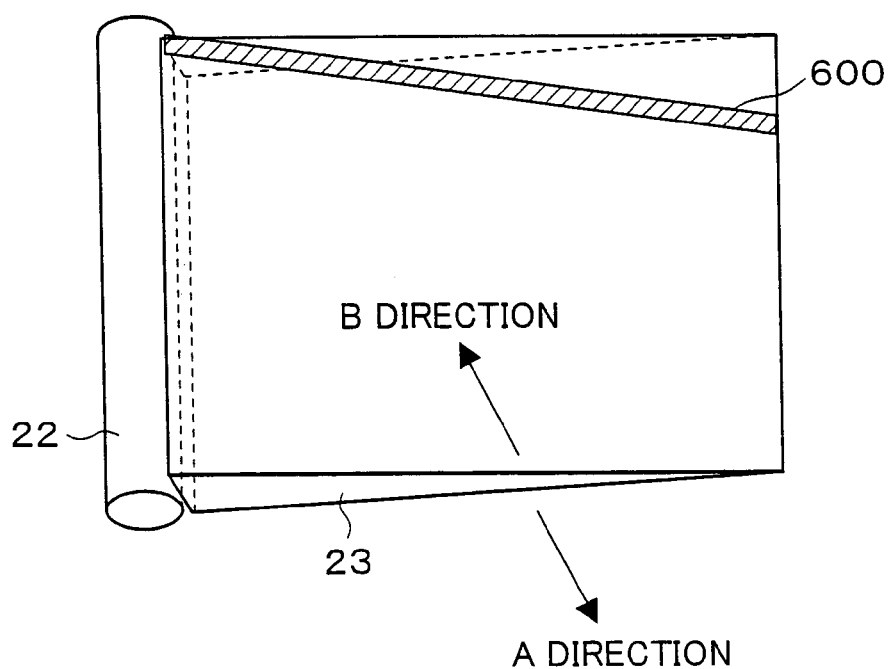

When being turned on, a front light generally produces dark lines from the both corners of one side of the light guiding plate to which the light source is attached. FIG. 52 shows these dark lines. FIG. 52(a) illustrates (i) a B-oriented surface of the light guiding plate 23 and one side surface of the light guiding plate 23, said one side surface being one of two side surfaces orthogonal to the longitudinal direction of the light source 22, and (ii) a dark line 600 obliquely extends from around the border between the other side surface and the light source 22 to that end of the optical wave guide 23 which is opposite to the light source 22. Meanwhile, FIG. 52(b) illustrates (i) a B-oriented surface of the light guiding plate 23 and the other surface of the light guiding plate 23, and a dark line 600 obliquely extends from around the border between said one side surface and the light source 22 to that end of the optical wave guide 23 which is opposite to the light source 22.

Thus, when this liquid crystal display to which light is irradiated is viewed from the side in the B direction, the quality of the image reproduction deteriorates due to the dark lines, when the front light is turned on. To solve this problem, the light modulation mechanism 310 is disposed between the light guiding plate 23 of the front light and the first polarizing plate 14, so as to cause the light scattering layer 303 to be in the scattering state to a sufficient degree. With this, it is possible to prevent the deterioration of the quality of the image reproduction due to the dark lines, when this liquid crystal display is viewed from the side in the B direction.

Figure 44:
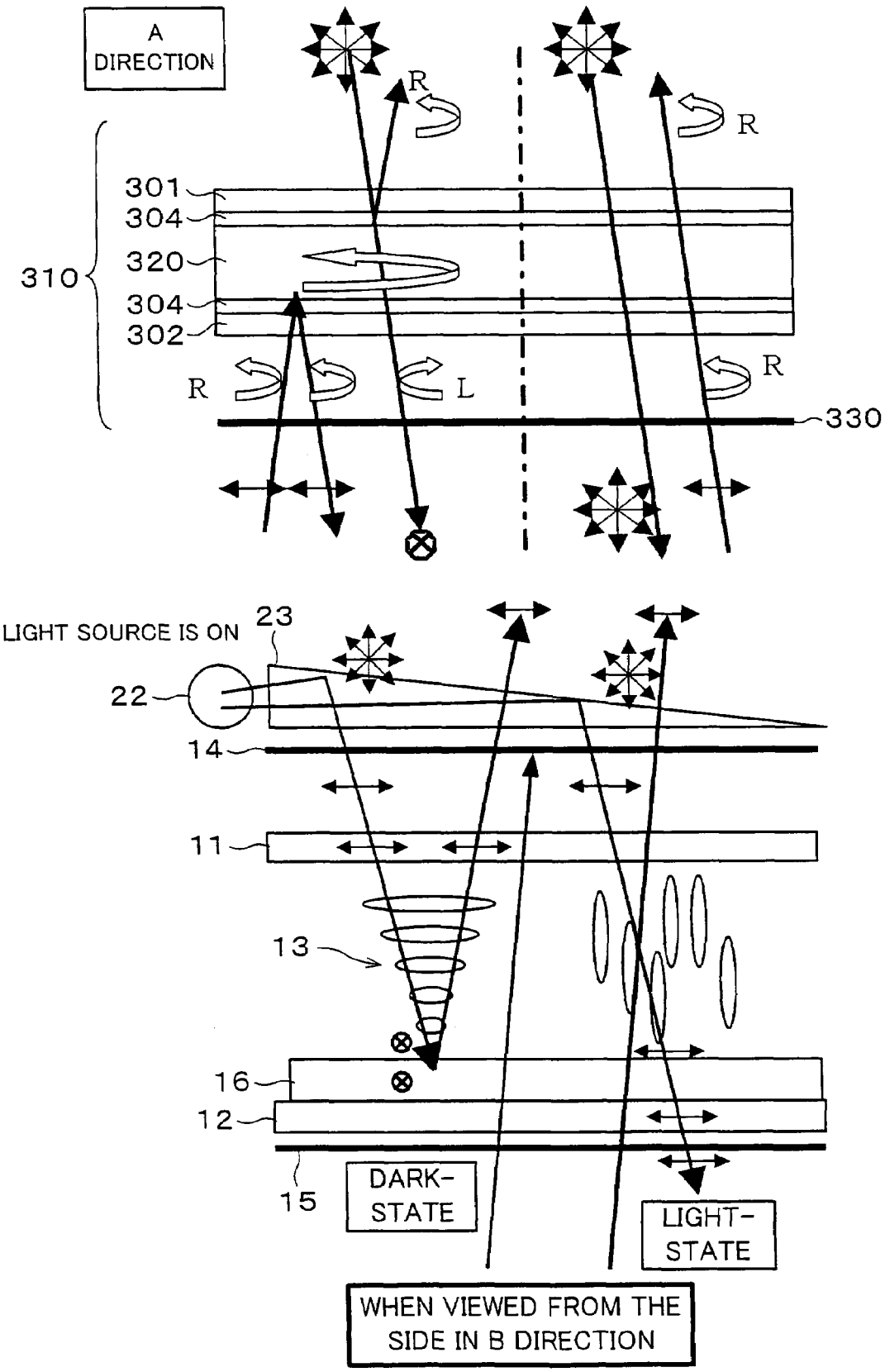
FIG. 44 is a cross section, clearly illustrating another light modulation mechanism of the display in FIG. 42.

Now, the following will discuss another specific arrangement of the light modulation mechanism 310 with reference to FIG. 44. The light modulation mechanism 310 in FIG. 44 is made up of a third glass substrate 301, fourth glass substrate 302, selective reflection switching layer 320, a pair of transparent electrodes 304, and a λ/4 plate 330. The selective reflection switching layer 320 is provided in place of the light scattering layer 303 in the light modulation mechanism 310 in FIG. 43, and the λ/4 plate 330 is provided in the B direction of the fourth glass substrate 302.

In the present case, the selective reflection switching layer 320 is a broadband cholesteric layer, and the transparent electrodes 304 cover the whole screen. The broadband cholesteric layer is arranged in the following manner: When no voltage is applied, the broadband cholesteric layer is in the modulating state so as to selectively reflect right-circularly polarized light in a visible light range, and when a voltage is applied, the broadband cholesteric layer is in the non-modulating state so as to allow light to pass through.

When viewing the image reproduction from the side in the A direction (cf. right side of FIG. 44), conventional A-oriented image reproduction is carried out by applying a voltage to the pair of transparent electrodes 404 and causing the selective reflection switching layer 320 to be in the non-modulating state. In the meantime, When viewing the image reproduction from the side in the B direction (cf. left side of FIG. 44), the visibility of the image reproduction on the side in the A direction, which is unnecessary, is reduced, and the light for the light-state image reproduction on the side in the A direction and the light passing through the liquid crystal display 300 from the side in the B direction can be utilized for the image reproduction on the side in the B direction. That is to say, when the viewing is carried out from the side in the B direction, linearly polarized light passes through the liquid crystal display 300 in the A direction via the first polarizing plate 14, and this linearly polarized light includes (i) a light component contributing to the light-state image reproduction which is carried out by the light from the front light and on the side in the A direction and (ii) a light component which enters the liquid crystal display 300 from the side in the B direction and passes therethrough.

In the present example, the transmission axis of the first polarizing plate 14 is arranged so as to be in parallel to and lateral with respect to the figure (hereinafter, this angle of the transmission axis is determined as 0 degree, and the counterclockwise direction is determined as the positive direction). The lagging axis of the λ/4 plate 330 is determined to be +45 degrees, and the linearly polarized light becomes right-circularly polarized light after passing through the λ/4 plate 330. When no voltage is applied to the selective reflection switching layer 320, only the right-circularly polarized light is selectively reflected. For this reason, the image reproduction on the A-oriented surface of the liquid crystal display 300 is not viewable. The right-circularly polarized light having been reflected passes through the λ/4 plate 330 again, and becomes identical with the original linearly polarized light. Since this linearly polarized light can pass through the first polarizing plate 14, this light can be utilized for the image reproduction on the side in the B direction. Also in the case of the ambient light entering the light modulation mechanism 310 from the side in the A direction, only right-circularly polarized light is selectively reflected, while left-circularly polarized light is allowed to pass through. By the λ/4 plate 330, the left-circularly polarized light having passed through becomes polarized light vertical to the figure, thereby being absorbed by the first polarizing plate 14.

Thus, in the arrangement shown in FIG. 44, when the ambient light cannot be suitably used, i.e. when the ambient light (on the side in the A direction) is weak, it is preferable that the light for the image reproduction on the A-oriented side of the liquid crystal display 300 is utilized for the image reproduction on the side in the B direction.

Figure 45:
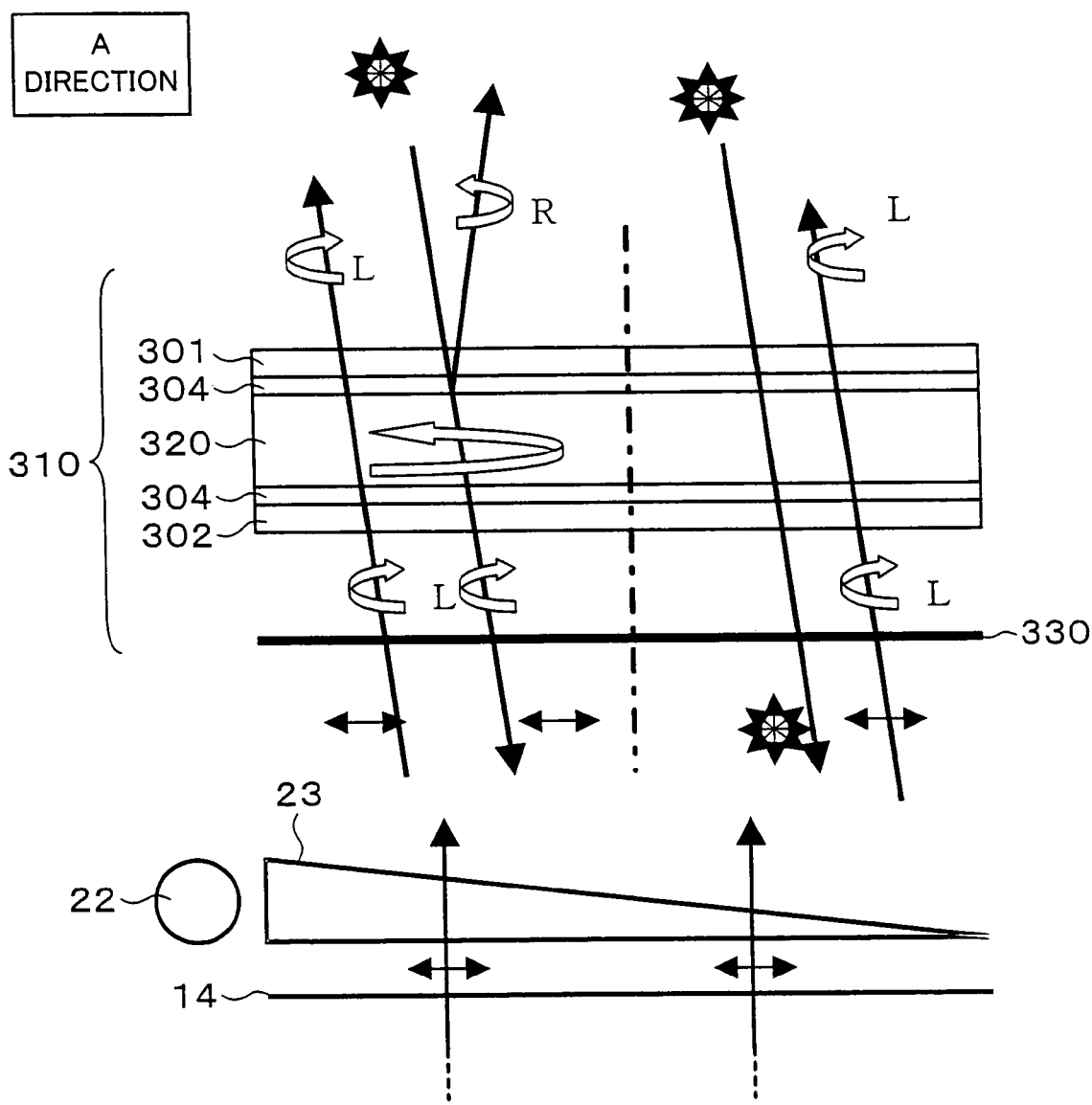
FIG. 45 is a cross section, clearly illustrating a further light modulation mechanism of the display in FIG. 42.

Next, the following will discuss a further specific arrangement of the light modulation mechanism 310 with reference to FIG. 45. Note that, in the liquid crystal display 330 shown in FIG. 45, the part in the B direction of the first polarizing plate 14 is identical with the same in FIG. 44, and thus omitted from the figure. It is further noted that the light modulation mechanism 310 in FIG. 45 is identical with the light modulation mechanism 310 in FIG. 44, except the angle of the λ/4 plate 330. In the present case, the angle of the lagging axis of the λ/4 plate 330 is determined to be +135 degrees, so that the polarized light having passed through the first polarizing plate 14 of the liquid crystal display 300 becomes left-circularly polarized light on the λ/4 plate 330.

When viewed from the side in the A direction (cf. right side of FIG. 45), a voltage is applied to the pair of transparent electrodes 304, so that the selective reflection switching layer 320 is caused to be in the non-modulating state. Thus, the image reproduction on the side in the A direction is viewed as usual. Meanwhile, when the viewing is carried out from the side in the B direction (cf. left side of FIG. 45), no voltage is applied so that the selective reflection switching layer 320 selectively reflects only right-circularly polarized light. Since, in this case, the polarized light having passed through the first polarizing plate 14 of the liquid crystal display 300 is left-circularly polarized light, this light passes through the selective reflection switching layer 320. However, more or less a half of the ambient light (i.e. the right-circularly polarized light) being incident on the selective reflection switching layer 320 from the side in the A direction is reflected on the selective reflection switching layer 320, and thus the image reproduction viewed from the side in the A direction is blurred like a half mirror (i.e. the contrast thereof is significantly decreased). In the meantime, the remaining half of the ambient light (i.e. left-circularly polarized light) from the side in the A direction passes through the selective reflection switching layer 326, then becomes, by the λ/4 plate 330, linearly polarized light in parallel to the figure, and passes through the first polarizing plate 14. Thus, this light can be utilized for the image reproduction on the side in the B direction. The rate of utilization of the ambient light in this case is substantially equal to that of the case when the light modulation mechanism 310 is not provided.

As described above, the arrangement in FIG. 45 is preferably used when the ambient light (on the side in the A direction) is intense, on the contrary to the arrangement in FIG. 44.

Now, referring to FIG. 46, an example where the switching between the arrangement in FIG. 44 and the arrangement in FIG. 45 can be performed will be discussed. Note that, members with the same numbers have the same functions. Instead of the λ/4 plate 330 in FIGS. 44 and 45, the light modulation mechanism 310 in FIG. 46 has a parallel aligned nematic liquid crystal layer (hereinafter, liquid crystal layer 340) 340, fifth glass substrate 341, sixth glass substrate 342, and a pair of transparent electrodes 343 covering the whole surfaces of the liquid crystal layer （問題なし）. In the B direction these members are disposed in the following order: the fifth glass substrate 341, transparent electrode 343, liquid crystal layer 340, transparent electrode 343, and sixth glass substrate 342. The alignment axis of liquid crystal molecules of the liquid crystal layer 340 is determined to be 45° with respect to the transmission axis of the first polarizing plate 14, and Δnd thereof is determined to be 3λ/4 when no voltage is applied.

When the ambient light is intense, no voltage is applied to the liquid crystal layer 340. In this case, the light having passed through the first polarizing plate 14 and being in parallel to the figure obtains a phase difference of Δnd=3λ/4 by the liquid crystal layer 340, so as to become left-circularly polarized light. Thus, even if the light for the image reproduction on the side in the A direction passes through the selective reflection switching layer 320, more or less a half of the intense ambient light is reflected and reproduced images appear like a half mirror, and thus the privacy issues can be resolved. In this case, the left-circularly polarized light as the intense ambient light having passed through the selective reflection switching layer 320 can be utilized for the B-oriented image reproduction.

When, meanwhile, the ambient light is weak, a sufficient voltage is applied to the liquid crystal layer 340 so that the retardation Δnd of the liquid crystal layer 340 is determined to be λ/4. In this case, the polarized light in parallel to the figure obtains a phase difference of λ/4 by the liquid crystal layer 340, and becomes right-circularly polarized light. Thus, the light for the image reproduction on the side in the A direction is reflected on the selective reflection switching layer 320 and hence not to be viewable from the outside, and utilized again for the image reproduction on the side in the B direction.

Furthermore, it is possible to adopt the most effective way for utilizing the ambient light in accordance with the intensity thereof, by controlling the retardation of the liquid crystal layer 340 to be a predetermined value so as to control the ellipticity.

Figure 47:
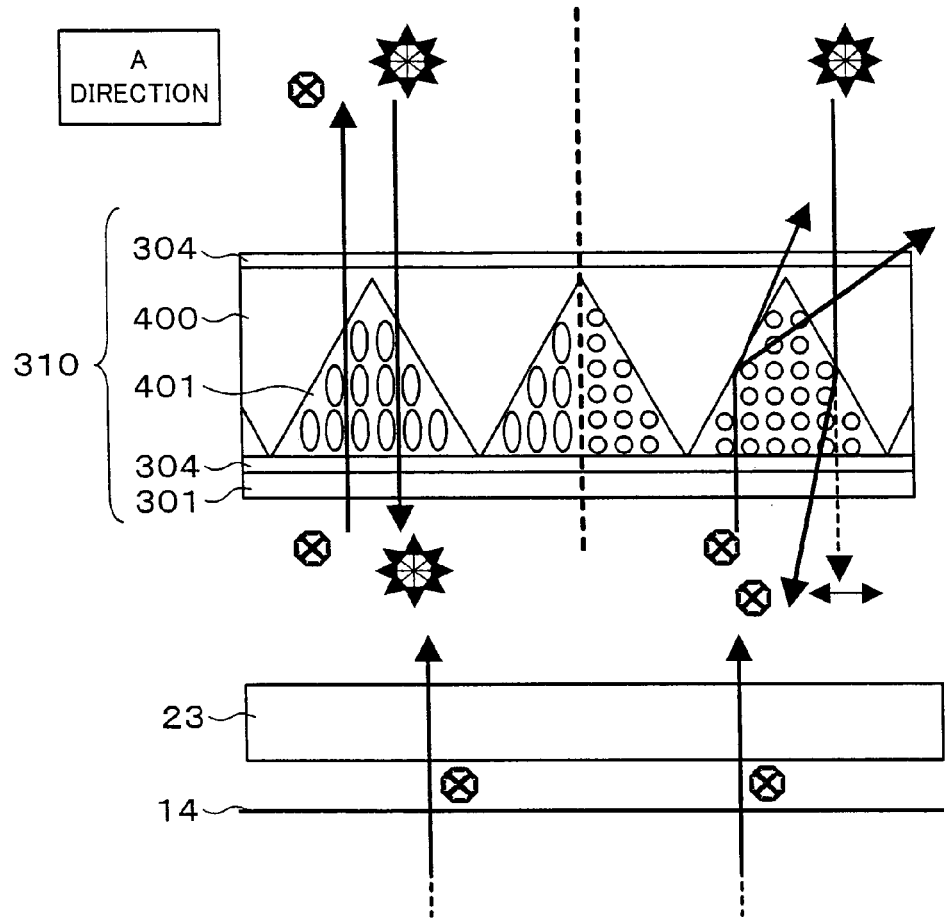
FIG. 47 is a cross section, clearly illustrating yet another light modulation mechanism of the display in FIG. 42.
Figure 48:
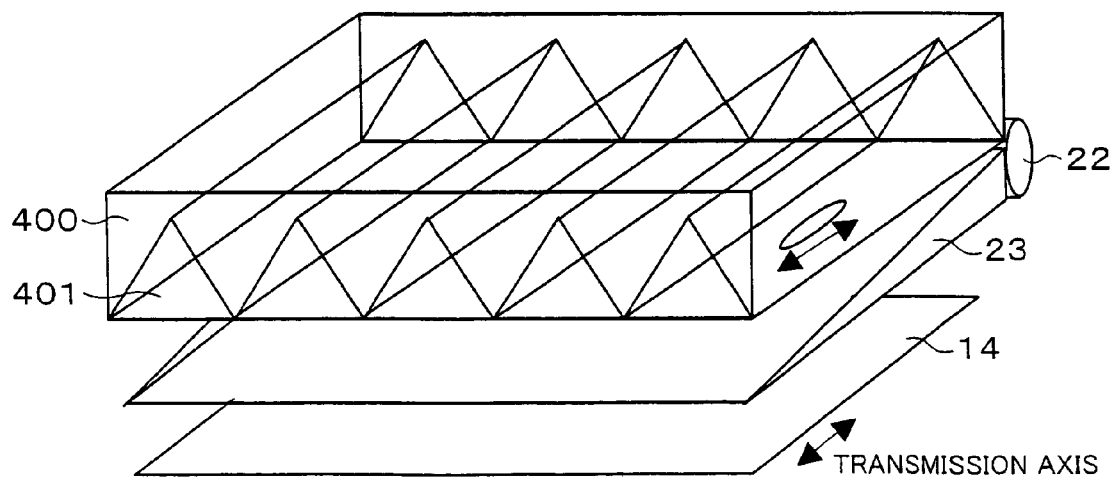
FIG. 48 is an oblique perspective view of the light modulation mechanism in FIG. 47.

Now, the following will discuss yet another specific arrangement of the light modulation mechanism 310 with reference to FIGS. 47 and 48.

Figure 46:
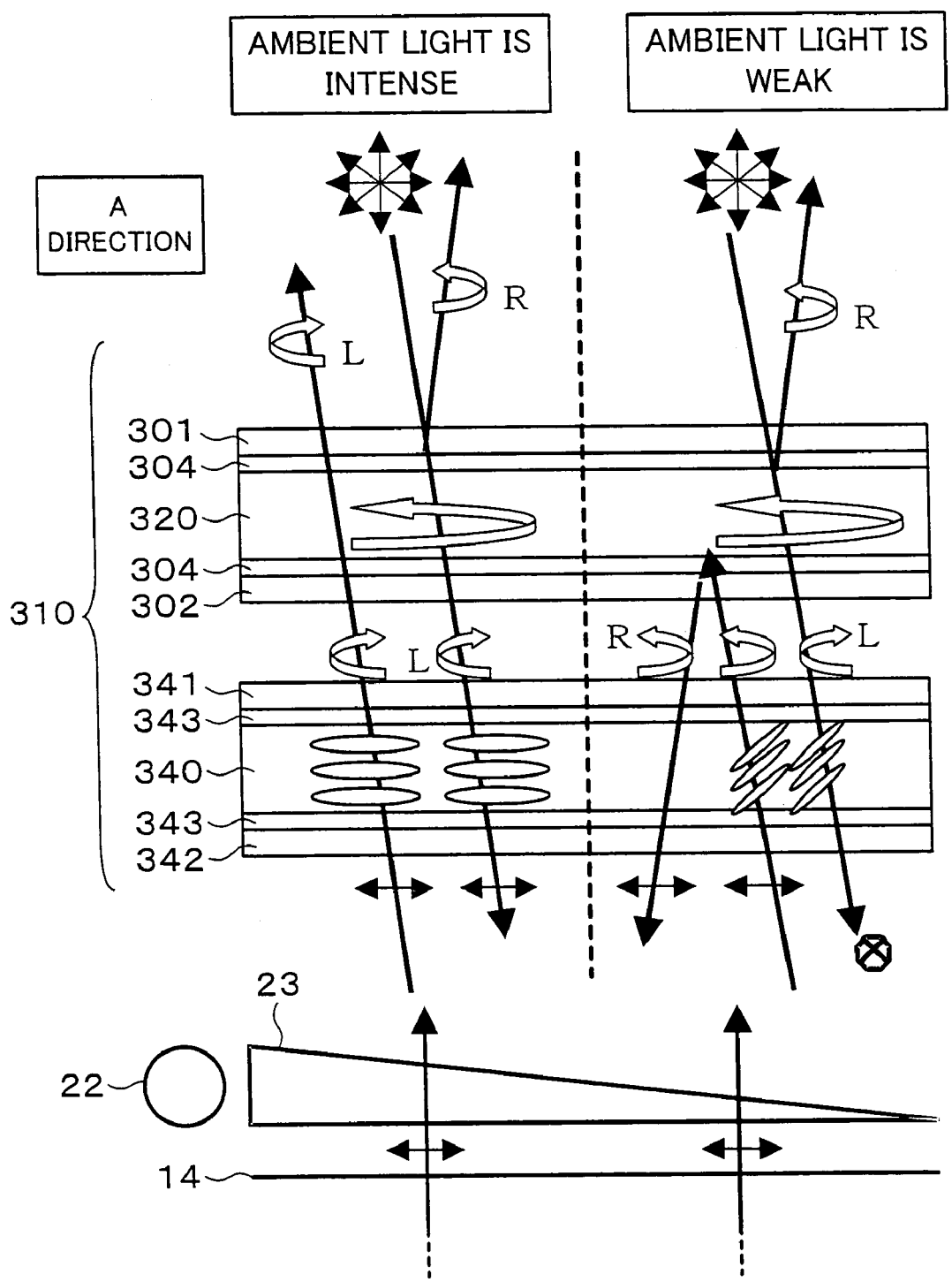
FIG. 46 is a cross section, clearly illustrating still another light modulation mechanism of the display in FIG. 42.

FIG. 47 is a cross section orthogonal to the cross sections shown in FIGS. 42 and 46. That is, in the figure, the light having passed through the first polarizing plate 14 is assumed as polarized light orthogonal to the figure.

The light modulation mechanism 310 in FIG. 47 is made up of a third glass substrate 301, a pair of transparent electrodes 304, prism-shaped member 400, and liquid crystal 401. In the B direction, these members are disposed in the following manner: the transparent electrode 304, prism-shaped member 400, liquid crystal 401, transparent electrode 304, and third glass substrate 301.

The prism-shaped member 400 is a structure made of acrylic resin and disposed between the pair of transparent electrode 304. This structure is shaped in the following manner: Assuming that a plurality of triangular prisms, each having an apex angle of about 60°, a bottom face which is about 100 μm wide, and extending in parallel to the transmission axis of the first polarizing plate 14, are aligned without intervals, the bottom face is in parallel to the third glass substrate 301, and the shape of the structure is identical with the shape of a space produced by subtracting the above-mentioned triangular prisms from a space between the pair of transparent electrode 304.

The prism-shaped member 400 is attached to the third glass substrate 301 on which the transparent electrode 304 is formed, and the cavity space is filled with the liquid crystal 401. The liquid crystal 401 is positive liquid crystal (ZLI-5049-100 made by Merck & Co., Inc) having Δn=0.2027 (the refraction index no with respect to ordinary light is 1.5065 and the refraction index ne with respect to extraordinary light is 1.7092). The molecule orientation of the liquid crystal is homogeneous aligned in the direction vertical to the figure. FIG. 48 is an oblique perspective view of the light modulation mechanism 310 shown in FIG. 47. The transmission axis of the first polarizing plate 14 is in parallel to the molecule orientation of the liquid crystal 401.

When the image reproduction on the side in the A direction is viewed, a voltage is applied to the pair of upper and lower transparent electrodes 304, and the liquid crystal molecules respond to this voltage application (cf. left side of FIG. 47). In this case, polarized light which has passed through the first polarizing plate 14 and is vertical to the figure moves in accordance with the refraction index no of the liquid crystal 401 with respect to ordinary light, which is 1.5065, Since the refractive index of acrylic resin is about 1.5, the refraction index of the polarized light hardly changes at the interface between the liquid crystal 401 and prism-shaped member 400, so that the polarized light goes straight. Here, in order to determine the internal light path so as not to change the direction of the light coming from the first polarizing plate 14, the light modulation mechanism 310 is caused to be in the light path non-modulating state.

Meanwhile, when the viewing is carried out from the side in the B direction, no voltage is applied so that the liquid crystal molecules are vertically aligned with respect to the figure (right side of FIG. 47). In this case, polarized light which has passed through the first polarizing plate 14 and is vertical to the figure moves in accordance with the refraction index ne of the liquid crystal 401 with respect to extraordinary light, which is 1.7092. Since the refractive index of acrylic resin is about 1.5, the polarized light is reflected and refracted in accordance with the change of the refraction index at the interface between the liquid crystal 401 and prism-shaped member 400. Here, in order to determine the internal light path so as to change the direction of the light coming from the first polarizing plate 14, the light modulation mechanism 310 is caused to be in the state of the light path modulating state.

With this, the image reproduction on the side in the A direction is caused not to be viewable, and the ambient light coming from the side in the A direction is divided at the interface into ordinary light and extraordinary light. On this occasion, the refractive index of the polarized light vertical to the figure is higher in the liquid crystal 401 than in the prism-shaped member 400, so that the ambient light is not total-reflected but efficiently passes through the interface, and utilized for the image reproduction on the side in the B direction.

Figure 49:
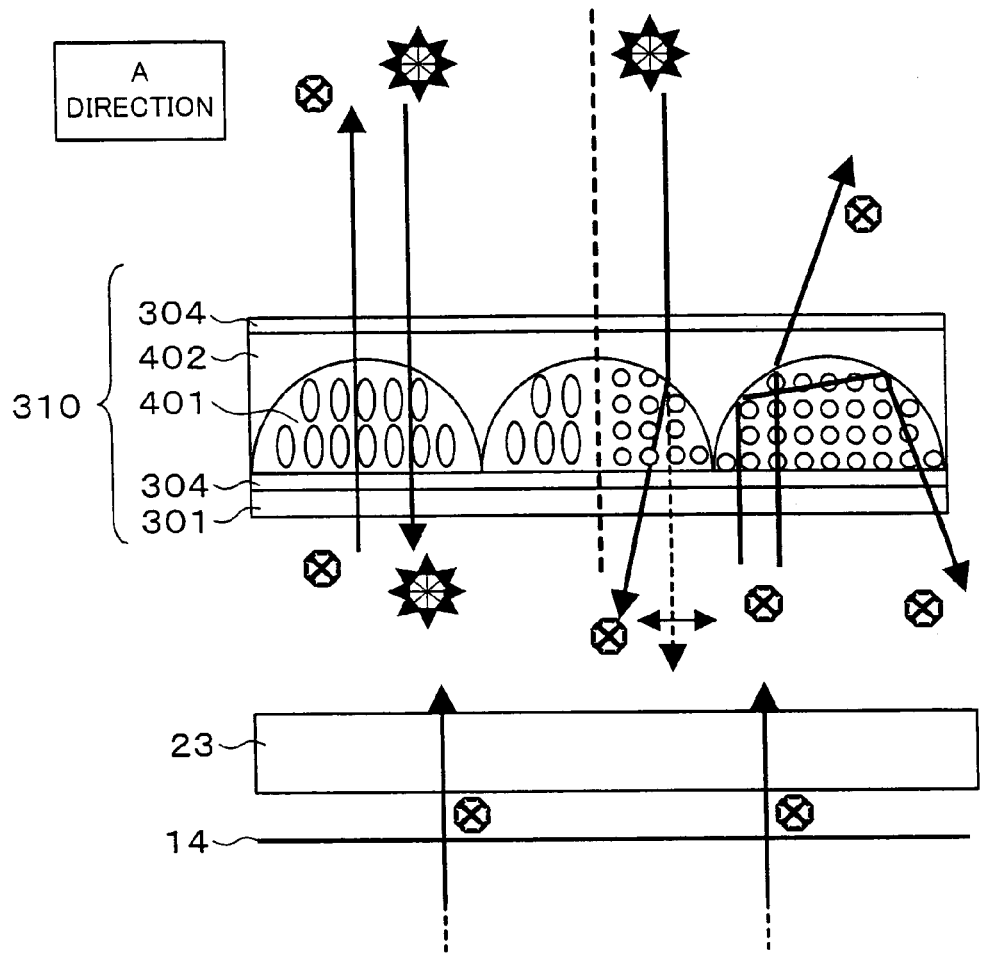
FIG. 49 is a cross section, clearly illustrating yet another light modulation mechanism of the display in FIG. 42.
Figure 50:
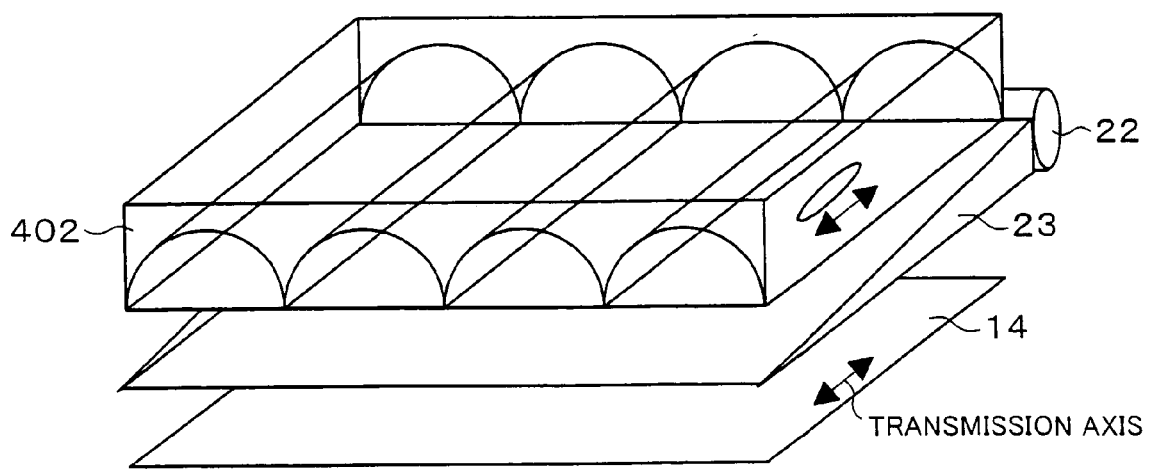
FIG. 50 is an oblique perspective view of the light modulation mechanism in FIG. 49.

Now, the following will discuss still another specific arrangement of the light modulation mechanism 310 with reference to FIGS. 49 and 50.

As in FIGS. 49 and 50, this light modulation mechanism 310 adopts a wave-shaped member 402 which is made of acrylic resin and made up of semi-cylinders each being about 100 μm in diameter, instead of the prism-shaped member 400 in FIGS. 47 and 48. FIG. 49 is a cross section of FIG. 47 in the same direction, and FIG. 50 is an oblique perspective view of FIG. 47. The wave-shaped member 402 is similar to the prism-shaped member 400, except that the allay of triangular prisms is replaced with the allay of semi-cylinders whose rectangular cross section is in parallel to the third glass substrate 301. These semi-cylinders extend in the direction parallel to the transmission axis of the first polarizing plate 14, and the diameter of each semi-cylinder is about 100 μm.

When the image reproduction on the side in the A direction is viewed, a voltage is applied to both the pair of upper and lower transparent electrodes 304, and the liquid crystal molecules respond to this voltage application (cf. left side of FIG. 49). In this case, the light goes straight as in the case of FIG. 47. Here, in order to determine the internal light path so as not to change the direction of the light coming from the first polarizing plate 14, the light modulation mechanism 310 is caused to be in the light path non-modulating state.

Meanwhile, when the viewing is carried out from the side in the B direction, no voltage is applied so that the liquid crystal molecules are vertically aligned with respect to the figure (right side of FIG. 49). In the arrangements shown in FIGS. 48 and 49, the interface between the liquid crystal 401 and wave-shaped member 402 is curved. Thus, the polarized light which comes from the liquid crystal display 300 and is vertical to the figure is refracted and reflected on the interface. However, since the interface is between a member having refractive index of 1.7092 and a member having refractive index of 1.5, the polarized light incident at an angle not less than about 60.7° is total-reflected and can be utilized for the image reproduction on the side in the B direction. Meanwhile, the ambient light from the side in the A direction passes through without total reflection, and thus the ambient light can be used for the image reproduction on the B-oriented surface of the liquid crystal display 300. In this case, the light modulation mechanism 310 is in the state of the light path modulating state, in order to change the direction of the light which comes from the first polarizing plate 14.

Figure 51:
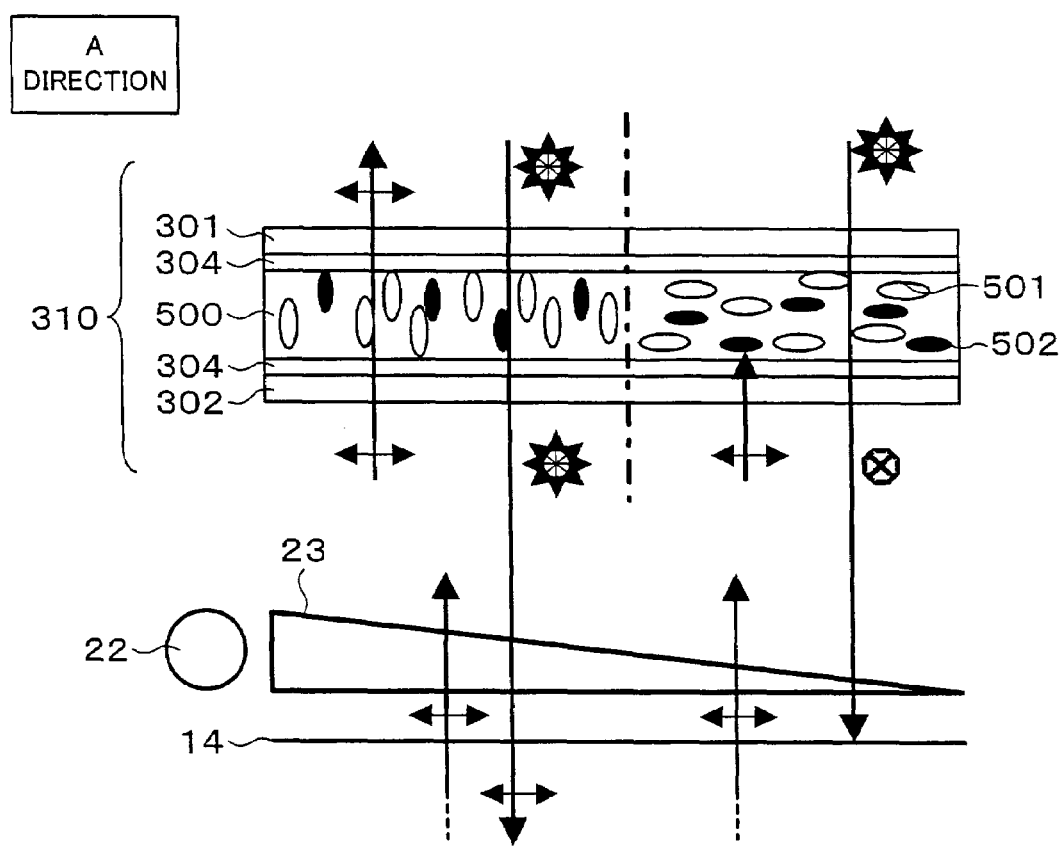
FIG. 51 is a cross section, clearly illustrating yet another light modulation mechanism of the display in FIG. 42.

Now, the following will discuss still another specific arrangement of the light modulation mechanism 310 with reference to FIG. 51.

The light modulation mechanism 310 in FIG. 51 is made up of a third glass substrate 301, fourth glass substrate 302, guest-host liquid crystal layer 500, and a pair of transparent electrodes 304. In the B direction, these members are disposed in the following order: the third glass substrate 301, transparent electrode 304, guest-host liquid crystal layer 500, transparent electrode 304, and fourth glass substrate 302. The transparent electrodes are formed so as to cover the whole surfaces of the screen. When no voltage is applied, by means of the liquid crystal molecules, pigment molecules of the guest-host liquid crystal 500 are aligned to be in parallel to the transmission axis of the first polarizing plate 14 (cf. right side of FIG. 51). Thus, the polarized light having passed through the first polarizing plate 14 is absorbed by these pigment molecules. This is because the light modulation mechanism 310 is in the absorbing state with respect to the light. When a voltage is applied, the liquid crystal molecules are aligned substantially vertical to the third glass substrate 301 and fourth glass substrate 302. Since the absorption by the pigment reduces in this case, the light modulation mechanism 310 becomes transparent, i.e. the light modulation mechanism 310 is in the transmission state with respect to the light.

When the image reproduction is viewed from the side in the A direction, a voltage is applied to the pair of transparent electrodes 304 so that the guest-host liquid crystal layer 500 is caused to be in the non-modulating state (transmission state). Thus, the traveling direction of the light with respect to the light modulation mechanism 310 is changed to the direction for the transmission (cf. left side of FIG. 51), the image reproduction is viewed from the side in the A direction as usual. Meanwhile, when the image reproduction is viewed from the side in the B direction, he guest-host liquid crystal layer 500 is caused to be in the modulating state, and hence the light is absorbed by the light modulation mechanism 310 (right side of FIG. 51). As a result, it becomes impossible to view, from the outside, the image reproduction on the side in the A direction.

It is noted that a WT mode, etc., in which the molecular alignment of the liquid crystal is twisted for not less than 360 degrees so that the polarized light is totally absorbed when no voltage is applied, may be adopted.

The present embodiment being thus described, in all examples, the light modulation mechanism 310 may act as a cover of the front light (light guiding plate 23). Although front lights have conventionally required an anti-dust and anti-fouling protective cover, the provision of the light modulation mechanism 310 as a protective cover makes it possible to eliminate the need for an additional protective cover, and thus the thickness of the display on the whole can be reduced.

Furthermore, there may be provided with a mechanism for switching between the modulating state and the non-modulating state of the light modulation mechanism 310, which operates in sync with the switching between the image reproduction on the side in the A direction and the image reproduction on the side in the B direction. With this, it is unnecessary to carry out the operation of switching the state of the light modulation mechanism 310.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The invention is useful for mobile phones, notebook PCs, mobile terminals, televisions, digital cameras and the like, and allows these devices to carry out suitable image reproduction.

The invention claimed is:

1. A display including a display medium for controlling a state of light passing through the display medium, comprising:

the display being characterized in that, provided that one direction away from the display medium is termed "first direction" and the other direction away from the display medium is termed "second direction", the display medium and selective reflecting means for reflecting light in a first state and allowing light in a second state to pass through are disposed in this order in the second direction, the selective reflective means is disposed only in the second direction of the display medium;

wherein, a non-transmitting area which does not allow light to pass through is provided in the second direction of the display medium, and between at least a part of the non-transmitting area and the display medium, light reflecting means for causing light passing through the display medium in the second direction to be reflected is provided.

2. The display as defined in claim 1, wherein, the first state and the second state are polarization states, the selective reflecting means is polarizing selective reflecting means which reflects the light in the first polarization state and allows the light in the second polarization state to pass through, and in the second direction, first polarizing means for allowing only a light component in a predetermined polarization state to pass through, the display medium, the polarizing selective reflecting means, and second polarizing means for absorbing a light component in the first polarization state while allowing a light component in the second polarization state to pass through, are disposed in this order.

3. The display as defined in claim 2, wherein, the predetermined polarization state is a state of linear polarization, the first polarization state is a state of linear polarization in a (1) direction, and the second polarization state is a state of linear polarization in a (2) direction orthogonal to the (1) direction, and the display medium is a 90° twisted liquid crystal layer.

4. The display as defined in either claim 2, wherein, the second polarization state is a state of linear polarization, and in the second direction of the second polarizing means, a λ/4 plate is disposed.

5. The display as defined in claim 1, wherein, the first state and the second state are circular polarization states, the selective reflecting means is polarizing selective reflecting means which reflects light in the first circular polarization state, and allowing light in the second circular polarization state, whose rotative direction is opposite to a rotative direction of the light in the first circular polarization state, to pass through, and in the second direction, polarizing means, which has a first transmission axis, for allowing a linearly polarized light component in a predetermined direction to pass through, a first λ/4 plate, the display medium, the polarizing selective reflecting means, a second λ/4 plate, and polarizing means having a second transmission axis which is orthogonal to the first transmission axis, are provided in this order.

6. The display as defined in claim 1, further comprising a light absorber which absorbs light passing away in the second direction and is able to be inserted into and removed from a light path.

7. The display as defined in claim 1, further comprising a first color filter disposed in the first direction of the display medium and a second filter disposed in the second direction of the selective reflecting means.

8. The display as defined in claim 1, further comprising a color filter in the first direction of the display medium, wherein, the color filter has a plurality of transmittance areas in each pixel of the display medium.

9. The display as defined in claim 8, wherein, the transmittance areas are divided into (i) a high-transmittance area which has a high transmittance and provided, in the first direction, on a non-transmitting area which does not allow light moving in the second direction to pass through, when transmission image reproduction is performed on a side in the second direction, and (ii) a low-transmittance area which has a transmittance lower than the transmittance of the high-transmittance area and is disposed on a transmitting area which allows the light to pass through.

10. The display as defined in any one of claims 1-4, further comprising a light absorbing layer in the second direction of a driver wiring for driving the display medium.

11. The display as defined in any one of claims 1-4, wherein, a driver wiring for driving the display medium is made of a low-reflecting material which restrains reflection of light to be not more than a predetermined value.

12. The display as defined in any one of claims 1-4, wherein, tones of an image reproduced from display data are reversed when reflective image reproduction on a side in the first direction is changed to a transmission image reproduction on a side in the second direction, and when the transmission image reproduction on the side in the second direction is changed to the reflective image reproduction on the side in the first direction.

13. The display as defined in any one of claims 1-4, wherein, an image reproduced from display data is laterally reversed when reflective image reproduction on a side in the first direction is changed to a transmission image reproduction on a side in the second direction, and when the transmission image reproduction on the side in the second direction is changed to the reflective image reproduction on the side in the first direction.

14. The display as defined in any one of claims 1-4, wherein, an image reproduced from display data is turned upside down when reflective image reproduction on a side in the first direction is changed to a transmission image reproduction on a side in the second direction, and when the transmission image reproduction on the side in the second direction is changed to the reflective image reproduction on the side in the first direction.

15. The display as defined in claim 1, wherein, the first state and the second state are polarization states, the selective reflecting means is polarizing selective reflecting means for reflecting the light in the first polarization state while allowing the light in the second polarization state to pass through, in the second direction, first polarizing means for allowing only a light component in a predetermined polarization state to pass through, the display medium, the polarizing selective reflecting means, and second polarizing means for absorbing a light component in the first polarization state and allowing a light component in the second polarization state to pass through, are provided, a pair of transparent substrate sandwiching the display medium are provided, the polarizing selective reflective means is provided in the second direction of one of the pair of transparent substrate, said one of the pair of transparent substrates being provided in the second direction with respect to the other one of the pair of transparent substrates, and between the display medium and the transparent substrate in the second direction with respect to the other transparent substrate, the non-transmitting area is provided.

16. The display as defined in claim 15, wherein, the display medium controls a polarization state of light passing through the display medium so that:

in a case of light-state image reproduction viewed from a side in the first direction, light being incident from a side in the first direction of the first polarizing means and reflected on the reflecting means and light being incident from the side in the first direction of the first polarizing means and reflected on the polarizing selective reflecting means pass through the first polarizing means again; and in a case of dark-state image reproduction viewed from the side in the first direction, the light being incident from a side in the first direction of the first polarizing means and reflected on the reflecting means and the light being incident from the side in the first direction of the first polarizing means and heading for the polarizing selective reflecting means are caused not to pass through the first polarizing means again.

17. The display as defined in claim 16, wherein, the first polarization state is a state of linear polarization in a (1) direction, and the second polarization state is a state of linear polarization in a (2) direction orthogonal to the (1) direction, the predetermined polarization state is the first polarization state, and the display medium controls a polarization state of light passing through the display medium, so that, with respect to light came from a side in the first direction of the first polarizing means and has passed through the first polarizing means, the polarization state of the light is substantially unchanged in the case of light-state image reproduction, and in the case of dark-state image reproduction, provided that a phase difference between orthogonal axes of polarized light on a plane in parallel to the transparent substrate is 0 in a case of the first polarization state, a phase difference of light having just passed through the display medium and heading for the reflecting means is substantially $\pi/2$, a phase difference of light having just passed through the display medium and heading for the first polarizing means is substantially $\pi$, and a phase difference of light having just passed through the display medium and heading for the polarizing selective reflecting means is substantially $\pi$.

18. The display as defined in claim 17, wherein, a thickness of a part of the display medium between the first polarizing means and the reflecting means is substantially half as much as a thickness of a part of the display medium between the first polarizing means and the polarizing selective reflecting means not facing the reflecting means, in the first/second direction.

19. The display as defined in any one of claims 16-18, wherein:

in a case of normally image reproduction, the polarizing selective reflecting means allow most of light coming from a side in the first direction to pass through, the first polarizing means absorbs most of light being reflected on the reflecting means and reaching the first polarizing means, and the second polarizing means allows most of light coming from a side in the first direction to pass through;

in a case of maximum-drive image reproduction, the polarizing selective reflecting means reflects most of light coming from the side in the first direction, and the first polarizing means allows most of light reflected on the reflecting means to pass through.

20. The display as defined in claim 1, wherein, an area for display on the display medium is divided into (i) a first area in which a transmission operation to allow light incident on the display area from a side in the first direction to pass through in the second direction and a reflection operation to reflect light incident on the display area from the side in the first direction to the first direction are carried out and (ii) a second area in which the reflection operation to reflect light incident on the display area from the side in the first direction to the first direction is carried out, reflecting means for reflecting light passing through the display medium in the second direction is provided in the second direction of the display medium, the reflection operation is carried out in the second area using the reflecting means, and the display is able to carry out:

transmission image reproduction arranged in such a manner that, by means of the transmission operation in the first area, light incident on the first area from the side in the first direction is controlled to be in the second state and thus allowed to pass through the selective reflecting means, so as to be utilized for image reproduction on a side in the second direction of the display medium;

first reflective image reproduction arranged in such a manner that, by means of the reflection operation in the first area, light incident on the first area from the side in the first direction is controlled to be in the first state and hence reflected on the selective reflecting means, so as to be utilized for image reproduction on the side in the first direction of the display medium; and second reflective image reproduction arranged in such a manner that, by means of the reflection operation in the second area, light incident on the second area from the side in the first direction is utilized for image reproduction on the side in the first direction of the display medium.

21. The display as defined in claim 20, wherein, in a case of the first reflective image reproduction, light-state image reproduction is carried out such that light incident on the first area from the side in the first direction is controlled to be in the first state so as to be reflected on the selective reflecting means, while dark-state image reproduction is carried out such that light incident on the first area from the side in the first direction is controlled to be in the second state so as to pass through the selective reflecting means, in a case of the second reflective image reproduction, light-state image reproduction is carried out such that light reflected on the reflecting means is allowed to reach eyes of a viewer on the side in the first direction of the display medium, while dark-state image reproduction is carried out such that light reflected on the reflecting means is caused not to reach the eyes of the viewer on the side in the first direction of the display medium, and thus the first reflective image reproduction corresponds to the second reflective image reproduction, since the first reflective image reproduction and the second reflective image reproduction are both light-state image reproduction or both dark-state image reproduction.

22. The display as defined in claim 21, wherein, in the transmission image reproduction, dark-state image reproduction is carried out such that light incident on the first area from the side in the first direction is controlled to be in the first state so as to be reflected on the selective reflecting means, while light-state image reproduction is carried out such that light incident on the first area from the side in the first direction is controlled to be in the second state so as to pass through the selective reflecting means.

23. The display as defined in claim 20, wherein, the first state and the second state are polarization states, the selective reflecting means reflects light in a first polarization state, while allows light in a second polarization state to pass through, and first polarizing means which only allows a light component in a predetermined polarization state to pass through is provided in the first direction of the display medium.

24. The display as defined in claim 23, wherein, the predetermined polarization state is a state of linear polarization, the first polarization state is a state of linear polarization in a (1) direction, while the second polarization state is a state of linear polarization in a (2) direction orthogonal to the (1) direction, a transmission axis of the first polarizing means is orthogonal to a transmission axis of the polarizing selective reflecting means, and when a lowest voltage among drive voltages is applied to the display medium, light incident on the first area from the side in the first direction becomes, on the polarizing selective reflecting means, either elliptically polarized light or linearly polarized light having a major axis in parallel to the transmission axis of the polarizing selective reflecting means, and light incident on the second area from the side in the second direction becomes, on the reflecting means, either elliptically polarized light or circularly polarized light.

25. The display as defined in claim 23, wherein, the predetermined polarization state is a state of linear polarization, the first polarization state is a state of linear polarization in a (1) direction, while the second polarization state is a state of linear polarization in a (2) direction orthogonal to the (1) direction, a transmission axis of the first polarizing means is orthogonal to a transmission axis of the polarizing selective reflecting means, when a highest voltage among drive voltages is applied to the display medium, light incident on the first area from the side in the first direction becomes, on the polarizing selective reflecting means, either elliptically polarized light or linearly polarized light having a major axis in parallel to the transmission axis of the polarizing selective reflecting means, and light incident on the second area from the side in the first direction becomes, on the reflecting means, either elliptically polarized light or circularly polarized light.

26. The display as defined in either claim 24, wherein, the elliptically polarized light or the linearly polarized light on the polarizing selective reflecting means is elliptically polarized light in which ellipticity is not more than 0.3, and the elliptically polarized light or the linearly polarized light on the reflecting means is elliptically polarized light in which ellipticity is not less than 0.7.

27. The display as defined in claim 26, wherein, the elliptically polarized light or the linearly polarized light on the polarizing selective reflecting means is elliptically polarized light in which ellipticity is not more than 0.22.

28. The display as defined in claim 26, wherein, the elliptically polarized light or the linearly polarized light on the reflecting means is elliptically polarized light in which ellipticity is not less than 0.78.

29. The display as defined in either claim 24, wherein, optical compensation means having retardation is provided at least in the first direction of the display medium.

30. The display as defined in claim 29, wherein, optical compensation means having retardation is provided in the second direction of the display medium.

31. The display as defined in claim 29, wherein, the optical compensation means is made up of a plurality of optical compensation elements.

32. The display as defined in claim 26, wherein, the display medium in the second area is a 90° twisted nematic liquid crystal layer whose retardation is in a range of not less than 150 nm and not more than 340 nm.

33. The display as defined in claim 26, wherein, the display medium in the first area is a 90° twisted nematic liquid crystal layer whose retardation is not less than 400 nm.

34. The display as defined in claim 24, wherein, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy $-175\text{ nm} \leq (Rr-R1) \leq -105\text{ nm}$, the director of the liquid crystal molecules is substantially in parallel to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy $190\text{ nm} \leq (Rt-R1+R2) \leq 300\text{ nm}$.

35. The display as defined in claim 25, wherein, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy $-175\text{ nm} \leq (Rr-R1) \leq 105\text{ nm}$, the director of the liquid crystal molecules is substantially in parallel to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy 190 nm≦(Rt−R1+R2)≦300 nm.

36. The display as defined in claim 24, wherein,
first optical compensation means having retardation is disposed between the first polarizing means and the display medium,
second optical compensation means having retardation is disposed between the display medium and the polarizing selective reflecting means,
in the second direction of the polarizing selective reflecting means, second polarizing means, which absorbs a light component in the first polarization state while allows a light component in the second polarization state to pass through, is provided,
the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy −175 nm≦(Rr−R1)≦−105 nm, and when the lowest voltage is applied, in the first area, a value of retardation Rt of the liquid crystal layer, the value of retardation R1 of the first optical compensation means, and a value of retardation R2 of the second optical compensation element satisfy either (i) 25 nm≦(Rt−R1+R2)≦50 nm on a occasion that the director of the liquid crystal molecules is substantially in parallel to a lagging axis of the second optical compensation means, or (ii) −50 nm≦(Rt−R1−R2)≦25 nm on a occasion that the director of the liquid crystal molecules is substantially orthogonal to the lagging axis of the second optical compensation element.

37. The display as defined in claim 25, wherein,
first optical compensation means having retardation is disposed between the first polarizing means and the display medium,
second optical compensation means having retardation is disposed between the display medium and the polarizing selective reflecting means,
in the second direction of the polarizing selective reflecting means, second polarizing means, which absorbs a light component in the first polarization state while allows a light component in the second polarization state to pass through, is provided,
the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy −175 nm≦(Rr−R1)≦−105 nm, the director of the liquid crystal molecules is substantially in parallel to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation element satisfy either (i) 25 nm≦(Rt−R1+R2)≦50 nm on a occasion that the director of the liquid crystal molecules is substantially in parallel to a lagging axis of the second optical compensation means, or (ii) −50 nm≦(Rt−R1−R2)≦25 nm on a occasion that the director of the liquid crystal molecules is substantially orthogonal to the lagging axis of the second optical compensation element.

38. The display as defined in claim 24, wherein,
first optical compensation means having retardation is disposed between the first polarizing means and the display medium,
second optical compensation means having retardation is disposed between the display medium and the polarizing selective reflecting means,
in the second direction of the polarizing selective reflecting means, second polarizing means, which absorbs a light component in the first polarization state while allows a light component in the second polarization state to pass through, is provided,
the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy 190 nm≦(Rt−R1−R2)≦300 nm.

39. The display as defined in claim 25, wherein,
first optical compensation means having retardation is disposed between the first polarizing means and the display medium,
second optical compensation means having retardation is disposed between the display medium and the polarizing selective reflecting means,
in the second direction of the polarizing selective reflecting means, second polarizing means, which absorbs a light component in the first polarization state while allows a light component in the second polarization state to pass through, is provided,
the display medium is a substantially homogeneously-aligned liquid crystal layer, a transmission axis of the first polarizing means is substantially orthogonal to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy 190 nm≦(Rt−R1−R2) ≦300 nm.

40. The display as defined in claim 24, wherein, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the lowest voltage is applied, in the second area, a value of retardation Rr of the liquid crystal layer and a value of retardation R1 of the first optical compensation means satisfy 1000 nm≦(Rr−R1) ≦170 nm, the director of the liquid crystal molecules is substantially orthogonal to a lagging axis of the second optical compensation means, and when the lowest voltage is applied, in the first area, a value of retardation Rt of the liquid crystal layer, the value of retardation R1 of the first optical compensation means, and a value of retardation R2 of the second optical compensation means satisfy −50 nm≦(Rt−R1−R2)≦50 nm.

41. The display as defined in claim 25, wherein, first optical compensation means having retardation is disposed between the first polarizing means and the display medium, second optical compensation means having retardation is disposed between the display medium and the polarizing selective reflecting means, in the second direction of the polarizing selective reflecting means, second polarizing means, which absorbs a light component in the first polarization state while allows a light component in the second polarization state to pass through, is provided, the display medium is a substantially homogeneously-aligned liquid crystal layer, a transmission axis of the first polarizing means is substantially in parallel to a transmission axis of the second polarizing means, a director of liquid crystal molecules is substantially orthogonal to a lagging axis of the first optical compensation means, when the highest voltage is applied, in the second area, a value of retardation Rr of the liquid crystal layer and a value of retardation R1 of the first optical compensation means satisfy 100 nm≦(Rr−R1)≦170 nm, the director of the liquid crystal molecules is substantially orthogonal to a lagging axis of the second optical compensation means, and when the highest voltage is applied, in the first area, a value of retardation Rt of the liquid crystal layer, the value of retardation R1 of the first optical compensation means, and a value of retardation R2 of the second optical compensation means satisfy −50 nm≦(Rt−R1−R2) ≦50 nm.

42. The display as defined in claim 20, wherein, in the first direction of the display medium, light-scattering means having a light-scattering function is provided.

43. The display as defined in claim 42, wherein, an overall haze of the display is not less than 50 and not more than 95.

44. The display as defined in either claim 24, wherein, a transmission axis of the first polarizing means is substantially in conformity to a horizontal direction with respect to a posture of the display in use.

45. The display as defined in claim 1, further comprising light modulation means for switching a traveling state of predetermined incoming or outgoing light in a predetermined manner, the light modulation means being provided at least either on the side in the first direction or on the side in the second direction of the display.

46. The display as defined in claim 45, wherein, the light modulation means switches a traveling direction of the outgoing light exiting from the display, between a transmission direction with respect to the light modulation means and a scattering direction with respect to the light modulating means.

47. The display as defined in claim 46, further comprising light irradiation means for irradiating light for image reproduction by the display, as the incoming light, wherein, the light modulating means is disposed between the light irradiation means and the display medium, and when the traveling direction is set to be the scattering direction, the light modulating means causes light irradiated from the light irradiation means to be in the scattering direction with respect to the light modulation means.

48. The display as defined in claim 45, wherein, the light modulation means switches a traveling direction of the outgoing light exiting the display, between a transmission direction with respect to the light modulation means and a scattering direction with respect to the light modulating means.

49. The display as defined in claim 45, wherein, the light modulation means switches the traveling direction between a direction that both of two types of polarized light orthogonal to each other are transmissive with respect to the light modulating means and a direction that one type of the polarized light is reflected on the light modulation means while the other type of the polarized light is transmissive with respect to the light modulation means.

50. The display as defined in claim 45, wherein, the light modulation means switches the traveling direction of the outgoing light exiting the display, between a direction that a light path which does not change the traveling direction is set in the light modulating means and a direction that a light path which changes the traveling direction is set in the light modulating means.

51. The display as defined in claim 45, wherein, the light modulating means switches the traveling direction of the outgoing light exiting the display, between a transmissive direction with which the light passes through the light modulation means and an absorbing direction with which the light is absorbed by the light modulation means.

52. The display as defined in claim 45, further comprising light irradiation means for irradiating light for image reproduction by the display, the light modulating means also functioning as a protective cover of the light irradiation means.

53. The display as defined in claim 45, wherein, the light modulation means switches the traveling direction, in accordance with a switching between image reproduction on the side in the first direction of the display and image reproduction on the side in the second direction of the display.

54. A device comprising the display as defined in claim 1, the display being foldable in such a manner that an image reproduction surface on the side in the first direction of the display comes on an outside of the display, while an image reproduction surface on the side in the second direction of the display comes on an inside of the display.

55. The device as defined in claim 54, wherein, a member facing the image reproduction surface on the side in the second direction of the display when the device is folded is a light-absorbing member.

56. The device as defined in either claim 54, further comprising an operating button for instructing reversal of tones of an image displayed on the side in the first direction of the display and reversal of tones of an image displayed on the side in the second direction.

57. The device as defined in claim 56, wherein, the operating button is an automatic operating button which is automatically operated and instructs the reversal, in accordance with opening and closing motions of the device.

58. A device comprising:
the display defined in claim 1, and
a light-absorbing member which can be disposed so as to face an image reproduction surface on the side in the second direction of the display.

59. The display of claim 1, further comprising a switching element in at least part of the non-transmitting area as viewed from above.

60. The display of claim 1, further comprising a bus line in at least part of the non-transmitting area.

61. The display of claim 1, wherein the light reflecting means is a reflector.

62. The display of claim 1, wherein the light reflecting means is a tabular reflector.

63. The display of claim 1, wherein the light reflecting means comprises a reflector including light scattering means.

64. The display of claim 1, wherein the light reflecting means consists essentially of one or more of: aluminum, an aluminum alloy including titanium, gold, silver, a silver alloy including palladium, and/or copper.

* * * * *